(12) United States Patent
Johnson et al.

(10) Patent No.: US 11,523,555 B2
(45) Date of Patent: Dec. 13, 2022

(54) PARTICLE DELIVERY SYSTEM OF AN AGRICULTURAL ROW UNIT

(71) Applicant: CNH Industrial America LLC, New Holland, PA (US)

(72) Inventors: Chad Michael Johnson, Arlington Heights, IL (US); Brian John Anderson, Yorkville, IL (US); Trevor Philip Stanhope, Oak Lawn, IL (US); Christopher Schoeny, Minooka, IL (US); Kregg Jerome Raducha, Oak Park, IL (US)

(73) Assignee: CNH Industrial America LLC, New Holland, PA (US)

( * ) Notice: Subject to any disclaimer, the term of this patent is extended or adjusted under 35 U.S.C. 154(b) by 210 days.

(21) Appl. No.: 16/726,404

(22) Filed: Dec. 24, 2019

(65) Prior Publication Data

US 2021/0185896 A1 Jun. 24, 2021

(51) Int. Cl.
*A01C 7/12* (2006.01)
*A01C 7/04* (2006.01)
(Continued)

(52) U.S. Cl.
CPC ............... *A01C 7/127* (2013.01); *A01C 7/04* (2013.01); *A01C 7/102* (2013.01); *A01C 7/163* (2013.01)

(58) Field of Classification Search
CPC .......... A01C 7/127; A01C 7/04; A01C 7/102; A01C 7/163; A01C 7/12; A01C 7/00; A01C 7/10; A01C 7/08; A01C 7/16
See application file for complete search history.

(56) References Cited

U.S. PATENT DOCUMENTS 222,042 A 11/1879 Haworth
285,413 A 9/1883 Johnson
(Continued)

FOREIGN PATENT DOCUMENTS

AU 2012201380 A1 3/2012
BR 122012026494 B1 4/2016
(Continued)

OTHER PUBLICATIONS

Precision Planting, PrecisionMeter a Better Finger Meter, Improve Planter Performance Where it Counts-In the Meter, https://precisionplanting.com/products/product/precisionmeter, Feb. 14, 2019, 8 pages.
(Continued)

*Primary Examiner* — Christopher J. Novosad
(74) *Attorney, Agent, or Firm* — Rebecca Henkel; Rickard DeMille

(57) ABSTRACT

A particle delivery system of an agricultural row unit includes a particle belt having a particle engagement section configured to receive a particle from a particle metering and singulation unit and a particle exit section configured to expel the particle toward a trench in soil. The particle delivery system includes an air flow system configured to establish an air flow toward the particle engagement section of the particle belt to accelerate the particle toward the particle belt, such that a particle speed of the particle reaches a target particle speed, is within a target percentage of a belt speed of the particle belt, or both, as the particle reaches the particle engagement section of the particle belt. The air flow toward the particle engagement section is a substantial portion of a total air flow established by the air flow system relative to other sections of the particle belt.

20 Claims, 30 Drawing Sheets

(51) Int. Cl.
*A01C 7/10* (2006.01)
*A01C 7/16* (2006.01)

(56) References Cited

U.S. PATENT DOCUMENTS

| | | |
|---|---|---|
| 716,408 A | 12/1902 | Graham |
| 2,646,191 A | 7/1953 | Wechsler |
| 2,852,995 A | 9/1958 | Domries |
| 3,176,636 A | 4/1965 | Wilcox et al. |
| 3,343,507 A | 9/1967 | Smith |
| 3,561,380 A | 2/1971 | Adams, Jr. et al. |
| 3,627,050 A | 12/1971 | Hansen et al. |
| 3,659,746 A | 5/1972 | Winslow |
| 3,913,503 A | 10/1975 | Becker |
| 4,023,509 A | 5/1977 | Hanson |
| 4,026,437 A | 5/1977 | Biddle |
| 4,029,235 A | 6/1977 | Grataloup |
| 4,094,444 A | 6/1978 | Willis |
| 4,600,122 A | 7/1986 | Lundie et al. |
| 4,628,841 A | 12/1986 | Powilleit |
| 4,928,607 A | 5/1990 | Luigi et al. |
| 5,231,940 A | 8/1993 | Tjeerdsma |
| 5,842,428 A | 12/1998 | Stufflebeam et al. |
| 5,938,071 A | 8/1999 | Sauder |
| 5,992,338 A | 11/1999 | Romans |
| 6,192,813 B1 | 2/2001 | Memory et al. |
| 6,237,514 B1 | 5/2001 | Romans |
| 6,269,758 B1 | 8/2001 | Sauder |
| 6,283,051 B1 | 9/2001 | Yoss |
| 6,332,413 B1 | 12/2001 | Stufflebeamn et al. |
| 6,564,729 B1 | 5/2003 | Petzoldt |
| 6,564,730 B2 | 5/2003 | Crabb et al. |
| 6,581,535 B2 | 6/2003 | Barry et al. |
| 6,615,754 B2 | 9/2003 | Unruh et al. |
| 6,644,225 B2 | 11/2003 | Keaton et al. |
| 6,681,706 B2 | 1/2004 | Sauder et al. |
| 6,748,885 B2 | 6/2004 | Sauder et al. |
| 6,752,095 B1 | 6/2004 | Rylander et al. |
| 6,827,029 B1 | 12/2004 | Wendte et al. |
| 6,863,006 B2 | 3/2005 | Sandoval et al. |
| 7,162,963 B2 | 1/2007 | Sauder et al. |
| 7,273,016 B2 | 9/2007 | Landphair et al. |
| 7,334,532 B2 | 2/2008 | Sauder et al. |
| 7,343,868 B2 | 3/2008 | Stephens et al. |
| 7,377,221 B1 | 5/2008 | Brockmeier et al. |
| 7,448,334 B2 | 11/2008 | Mariman et al. |
| 7,490,565 B2 | 2/2009 | Holly |
| 7,571,688 B1 | 8/2009 | Friestad et al. |
| 7,617,785 B2 | 11/2009 | Wendte |
| 7,631,606 B2 | 12/2009 | Sauder et al. |
| 7,631,607 B2 | 12/2009 | Vandersnick |
| 7,665,409 B2 | 2/2010 | Johnson |
| 7,669,538 B2 | 3/2010 | Memory et al. |
| 7,699,009 B2 | 4/2010 | Sauder et al. |
| 7,717,048 B2 | 5/2010 | Peterson et al. |
| 7,726,251 B1 | 6/2010 | Peterson et al. |
| 7,735,438 B2 | 6/2010 | Riewerts et al. |
| 7,775,167 B2 | 8/2010 | Stehling et al. |
| 7,918,168 B2 | 4/2011 | Garner et al. |
| 7,938,074 B2 | 5/2011 | Liu |
| 8,074,586 B2 | 12/2011 | Gamer et al. |
| 8,078,367 B2 | 12/2011 | Sauder et al. |
| 8,166,896 B2 | 5/2012 | Shoup |
| 8,275,525 B2 | 9/2012 | Kowalchuk et al. |
| 8,276,529 B2 | 10/2012 | Garner et al. |
| 8,281,725 B2 | 10/2012 | Wendte et al. |
| 8,297,210 B2 | 10/2012 | Spiesberger |
| 8,365,679 B2 | 2/2013 | Landphair et al. |
| 8,418,634 B2 | 4/2013 | Shoup |
| 8,418,636 B2 | 4/2013 | Liu et al. |
| 8,448,587 B2 | 5/2013 | Kowalchuk et al. |
| 8,522,699 B2 | 9/2013 | Garner et al. |
| 8,522,889 B2 | 9/2013 | Adams et al. |
| 8,618,465 B2 | 12/2013 | Tevs et al. |
| 8,671,856 B2 | 3/2014 | Garner et al. |
| 8,677,914 B2 | 3/2014 | Stark |
| 8,746,159 B2 | 6/2014 | Garner et al. |
| 8,770,121 B2 | 7/2014 | Bragatto |
| 8,813,663 B2 | 8/2014 | Garner et al. |
| 8,825,310 B2 | 9/2014 | Kowalchuk |
| 8,825,311 B2 | 9/2014 | Kowalchuk |
| 8,843,281 B2 | 9/2014 | Wilhelmi et al. |
| 8,850,995 B2 | 10/2014 | Garner et al. |
| 8,850,997 B2 | 10/2014 | Silbemagel et al. |
| 8,850,998 B2 | 10/2014 | Garner et al. |
| 8,863,676 B2 | 10/2014 | Brockmann et al. |
| 8,869,629 B2 | 10/2014 | Noble et al. |
| 8,869,719 B2 | 10/2014 | Garner et al. |
| 8,893,630 B2 | 11/2014 | Kowalchuk et al. |
| 8,910,582 B2 | 12/2014 | Mariman et al. |
| 8,925,471 B2 | 1/2015 | Adams et al. |
| 8,928,486 B2 | 1/2015 | Hui et al. |
| 8,942,894 B2 | 1/2015 | Gamer et al. |
| 8,942,896 B2 | 1/2015 | Mayerle |
| 8,948,980 B2 | 2/2015 | Gamer et al. |
| 8,985,037 B2 | 3/2015 | Radtke et al. |
| 9,010,258 B1 | 4/2015 | Richard et al. |
| 9,043,950 B2 | 6/2015 | Wendte et al. |
| 9,119,339 B2 | 9/2015 | Bergere |
| 9,137,942 B2 | 9/2015 | Adams et al. |
| 9,144,190 B2 | 9/2015 | Henry et al. |
| 9,148,992 B2 | 10/2015 | Staeter |
| 9,155,242 B2 | 10/2015 | Adams et al. |
| 9,179,594 B2 | 11/2015 | Graham |
| 9,179,595 B2 | 11/2015 | Kormann et al. |
| 9,198,343 B2 | 12/2015 | Mairman et al. |
| 9,216,860 B2 | 12/2015 | Friestad et al. |
| 9,237,687 B2 | 1/2016 | Sauder et al. |
| 9,265,191 B2 | 2/2016 | Sauder et al. |
| 9,277,688 B2 | 3/2016 | Wilhelmi et al. |
| 9,288,937 B2 | 3/2016 | Sauder et al. |
| 9,313,941 B2 | 4/2016 | Gamer et al. |
| 9,313,943 B2 | 4/2016 | Zumdome et al. |
| 9,326,441 B2 | 5/2016 | Donadon |
| 9,332,688 B2 | 5/2016 | Zumdome et al. |
| 9,345,188 B2 | 5/2016 | Garner et al. |
| 9,345,189 B2 | 5/2016 | Harmelink et al. |
| 9,351,440 B2 | 5/2016 | Sauder |
| 9,357,689 B2 | 6/2016 | Beck et al. |
| 9,357,692 B2 | 6/2016 | Johnson et al. |
| 9,398,739 B2 | 7/2016 | Silbernagel et al. |
| 9,426,939 B2 | 8/2016 | Zumdome |
| 9,426,940 B2 | 8/2016 | Connors et al. |
| 9,445,539 B2 | 9/2016 | Rans |
| 9,451,740 B2 | 9/2016 | Kowalchuk |
| 9,475,497 B2 | 10/2016 | Henson et al. |
| 9,480,199 B2 | 11/2016 | Garner et al. |
| 9,510,502 B2 | 12/2016 | Garner et al. |
| 9,554,503 B2 | 1/2017 | Noer et al. |
| 9,578,799 B2 | 2/2017 | Allgaier et al. |
| 9,585,304 B2 | 3/2017 | Roberge et al. |
| 9,591,800 B2 | 3/2017 | Kowalchuk et al. |
| 9,596,803 B2 | 3/2017 | Wendte et al. |
| 9,603,298 B2 | 3/2017 | Wendte et al. |
| 9,615,504 B2 | 4/2017 | Sauder et al. |
| 9,622,401 B2 | 4/2017 | Stevenson |
| 9,629,298 B2 | 4/2017 | Dienst |
| 9,635,802 B2 | 5/2017 | Rains et al. |
| 9,635,804 B2 | 5/2017 | Carr et al. |
| 9,648,800 B2 | 5/2017 | Gamer et al. |
| 9,648,802 B2 | 5/2017 | Wendte et al. |
| 9,661,799 B2 | 5/2017 | Garner et al. |
| 9,675,002 B2 | 6/2017 | Roszman |
| 9,675,004 B2 | 6/2017 | Landphair et al. |
| 9,686,905 B2 | 6/2017 | Garner et al. |
| 9,686,906 B2 | 6/2017 | Garner et al. |
| 9,693,496 B2 | 7/2017 | Tevs et al. |
| 9,693,498 B2 | 7/2017 | Zumdome et al. |
| 9,699,955 B2 | 7/2017 | Garner et al. |
| 9,706,701 B2 | 7/2017 | Prickel et al. |
| 9,706,702 B2 | 7/2017 | Wendte et al. |
| 9,706,705 B2 | 7/2017 | Czapka et al. |
| 9,723,779 B2 | 8/2017 | Wendte et al. |
| 9,730,377 B2 | 8/2017 | Kowalchuk et al. |

(56) References Cited

U.S. PATENT DOCUMENTS

| | | |
|---|---|---|
| 9,730,379 B2 | 8/2017 | Wendte et al. |
| 9,733,634 B2 | 8/2017 | Prickel et al. |
| 9,750,174 B2 | 9/2017 | Sauder et al. |
| 9,756,778 B2 | 9/2017 | Straeter |
| 9,756,779 B2 | 9/2017 | Wilhelmi et al. |
| 9,763,380 B2 | 9/2017 | Hahn et al. |
| 9,769,978 B2 | 9/2017 | Radtke |
| 9,775,279 B2 | 10/2017 | Garner et al. |
| 9,781,874 B2 | 10/2017 | Johnson et al. |
| 9,795,076 B2 | 10/2017 | Lind et al. |
| 9,795,077 B2 | 10/2017 | Hahn et al. |
| 9,801,332 B2 | 10/2017 | Landphair et al. |
| 9,807,922 B2 | 11/2017 | Garner et al. |
| 9,807,924 B2 | 11/2017 | Garner et al. |
| 9,814,172 B2 | 11/2017 | Achen et al. |
| 9,814,176 B2 | 11/2017 | Kowalchuk |
| 9,820,429 B2 | 11/2017 | Garner et al. |
| 9,826,676 B2 | 11/2017 | Borkgren et al. |
| 9,826,677 B2 | 11/2017 | Gervais et al. |
| 9,832,921 B2 | 12/2017 | Anderson et al. |
| 9,836,036 B2 | 12/2017 | Johnson et al. |
| 9,848,524 B2 | 12/2017 | Sauder et al. |
| 9,848,528 B2 | 12/2017 | Wemer et al. |
| 9,854,732 B2 | 1/2018 | Thompson et al. |
| 9,861,025 B2 | 1/2018 | Schaefer et al. |
| 9,861,030 B2 | 1/2018 | Garner et al. |
| 9,861,031 B2 | 1/2018 | Garner et al. |
| 9,867,328 B2 | 1/2018 | Tevs et al. |
| 9,869,571 B2 | 1/2018 | Hoberge et al. |
| 9,883,625 B2 | 2/2018 | Kock et al. |
| 9,883,626 B2 | 2/2018 | Heim et al. |
| 9,888,624 B2 | 2/2018 | Maniar et al. |
| 9,894,830 B2 | 2/2018 | Horsch |
| 9,902,571 B2 | 2/2018 | Hui et al. |
| 9,918,427 B2 | 3/2018 | Anderson et al. |
| 9,936,625 B2 | 4/2018 | Wendte et al. |
| 9,936,630 B2 | 4/2018 | Johnson et al. |
| 9,936,631 B1 | 4/2018 | Hubner et al. |
| 9,943,027 B2 | 4/2018 | Sauder et al. |
| 9,949,426 B2 | 4/2018 | Radtke et al. |
| 9,949,427 B2 | 4/2018 | Schweitzer et al. |
| 9,955,625 B2 | 5/2018 | Baurer et al. |
| 9,961,825 B2 | 5/2018 | Allgaier et al. |
| 9,964,124 B2 | 5/2018 | Maro |
| 9,968,029 B2 | 5/2018 | Funck et al. |
| 9,969,569 B2 | 5/2018 | Borkgren |
| 9,970,490 B2 | 5/2018 | Henry et al. |
| 9,974,230 B2 | 5/2018 | Sauder et al. |
| 9,979,338 B2 | 5/2018 | Dollinger et al. |
| 9,999,174 B2 | 6/2018 | Funck et al. |
| 9,999,175 B2 | 6/2018 | Baurer et al. |
| 10,004,173 B2 | 6/2018 | Garner et al. |
| 10,010,025 B2 | 7/2018 | Dienst et al. |
| 10,028,427 B2 | 7/2018 | Arnett et al. |
| 10,028,428 B2 | 7/2018 | Moorehead et al. |
| 10,028,436 B2 | 7/2018 | Ricketts et al. |
| 10,045,474 B2 | 8/2018 | Bachman et al. |
| 10,045,478 B2 | 8/2018 | Posselius |
| 10,051,782 B2 | 8/2018 | Wilhelmi et al. |
| 10,064,323 B2 | 9/2018 | Hahn et al. |
| 10,085,375 B2 | 10/2018 | Engel et al. |
| 10,091,926 B2 | 10/2018 | Maro |
| 10,104,830 B2 | 10/2018 | Heathcote |
| 10,117,377 B2 | 11/2018 | Dienst et al. |
| 10,123,524 B2 | 11/2018 | Roberge et al. |
| 10,154,622 B2 | 12/2018 | Thompson |
| 10,159,176 B2 | 12/2018 | Baitinger et al. |
| 10,165,724 B2 | 1/2019 | Nilson et al. |
| 10,172,277 B2 | 1/2019 | Thompson |
| 10,188,027 B2 | 1/2019 | Hahn et al. |
| 10,206,325 B2 | 2/2019 | Schoeny et al. |
| 10,206,326 B2 | 2/2019 | Garner et al. |
| 10,225,978 B1 | 3/2019 | Schoeny et al. |
| 10,227,998 B2 | 3/2019 | Lacher et al. |
| 10,231,376 B1 | 3/2019 | Stanhope et al. |
| 10,257,974 B1 | 4/2019 | Schoeny et al. |
| 10,264,723 B2 | 4/2019 | Gresch et al. |
| 10,278,325 B2 | 5/2019 | Anderson et al. |
| 10,296,017 B2 | 5/2019 | Schoeny et al. |
| 10,299,424 B2 | 5/2019 | Hamilton |
| 10,306,824 B2 | 6/2019 | Nelson et al. |
| 10,308,116 B2 | 6/2019 | Czapka et al. |
| 10,337,645 B2 | 7/2019 | Roberge et al. |
| 10,351,364 B2 | 7/2019 | Green et al. |
| 10,368,478 B2 | 8/2019 | Schoeny et al. |
| 10,375,879 B2 | 8/2019 | Garner et al. |
| 10,379,547 B2 | 8/2019 | Thompson et al. |
| 10,408,667 B2 | 9/2019 | Schoeny et al. |
| 10,426,073 B2 | 10/2019 | Totten et al. |
| 10,433,475 B2 | 10/2019 | Gentili et al. |
| 10,448,561 B2 | 10/2019 | Schoeny et al. |
| 10,455,757 B2 | 10/2019 | Sauder et al. |
| 10,455,758 B2 | 10/2019 | Schoeny et al. |
| 10,455,760 B2 | 10/2019 | Stuber et al. |
| 10,462,956 B2 | 11/2019 | Hamilton |
| 10,462,960 B2 | 11/2019 | Duman |
| 10,470,355 B2 | 11/2019 | Renault et al. |
| 10,477,757 B2 | 11/2019 | Schoeny et al. |
| 10,481,617 B2 | 11/2019 | Engel et al. |
| 10,485,154 B2 | 11/2019 | Connell et al. |
| 10,524,409 B2 | 1/2020 | Posselius et al. |
| 10,524,410 B2 | 1/2020 | Schoeny et al. |
| 10,531,606 B2 | 1/2020 | Posselius |
| 10,537,055 B2 | 1/2020 | Gresch et al. |
| 10,548,259 B2 | 2/2020 | Heathcote |
| 10,555,454 B2 | 2/2020 | Gemer et al. |
| 10,561,052 B2 | 2/2020 | Barrick et al. |
| 10,575,456 B2 | 3/2020 | Schoeny et al. |
| 10,575,459 B2 | 3/2020 | Gervais et al. |
| 10,575,460 B2 | 3/2020 | Davis et al. |
| 10,582,655 B2 | 3/2020 | Kowalchuk |
| 10,602,656 B2 | 3/2020 | Bartelson et al. |
| 10,645,863 B2 | 5/2020 | Grimm et al. |
| 10,653,056 B2 | 5/2020 | Gamer et al. |
| 10,660,261 B2 | 5/2020 | Johnson et al. |
| 10,667,461 B2 | 6/2020 | Kowalchuk et al. |
| 10,709,058 B2 | 7/2020 | Thompson |
| 10,729,054 B2 | 8/2020 | Dekam |
| 10,729,063 B2 | 8/2020 | Gamer et al. |
| 10,743,460 B2 | 8/2020 | Gilbert et al. |
| 10,750,658 B2 | 8/2020 | Schoeny et al. |
| 10,750,662 B2 | 8/2020 | Gamer et al. |
| 10,750,663 B2 | 8/2020 | Gamer et al. |
| 10,757,854 B2 | 9/2020 | Stanhope |
| 10,765,057 B2 | 9/2020 | Radtke et al. |
| 10,768,331 B2 | 9/2020 | Koch et al. |
| 10,772,256 B2 | 9/2020 | Stuber |
| 10,779,456 B2 | 9/2020 | Kowalchuk |
| 10,779,460 B2 | 9/2020 | Pirkenseer |
| 10,779,462 B2 | 9/2020 | Gresch et al. |
| 10,806,062 B2 | 10/2020 | Zemenchik |
| 10,806,070 B2 | 10/2020 | Gamer et al. |
| 10,806,071 B2 | 10/2020 | Kowalchuk |
| 10,813,276 B2 | 10/2020 | Heathcote |
| 10,820,464 B2 | 11/2020 | Kowalchuk et al. |
| 10,820,465 B2 | 11/2020 | Kowalchuk et al. |
| 10,820,483 B2 | 11/2020 | Gervais et al. |
| 10,820,485 B2 | 11/2020 | Swanson et al. |
| 10,820,488 B2 | 11/2020 | Schoeny et al. |
| 10,820,489 B2 | 11/2020 | Gamer et al. |
| 10,820,490 B2 | 11/2020 | Schoeny et al. |
| 10,823,748 B2 | 11/2020 | Allgaier |
| 10,827,663 B2 | 11/2020 | Gresch et al. |
| 10,827,666 B2 | 11/2020 | Schoeny et al. |
| 10,827,671 B2 | 11/2020 | Kowalchuk et al. |
| 10,827,740 B2 | 11/2020 | Wonderlich et al. |
| 10,842,068 B2 | 11/2020 | Czapka et al. |
| 10,842,072 B2 | 11/2020 | Wilhelmi et al. |
| 10,842,073 B2 | 11/2020 | Gamer et al. |
| 10,860,189 B2 | 12/2020 | Allgaier et al. |
| RE48,572 E | 6/2021 | Gamer et al. |
| 2009/0292426 A1 | 11/2009 | Nelson et al. |
| 2010/0224110 A1 | 9/2010 | Mariman |
| 2011/0067260 A1 | 3/2011 | Kim et al. |

(56) References Cited

U.S. PATENT DOCUMENTS

| | | |
|---|---|---|
| 2012/0265410 A1 | 10/2012 | Graham et al. |
| 2013/0032363 A1 | 2/2013 | Cuny et al. |
| 2014/0277959 A1 | 9/2014 | Wagers et al. |
| 2015/0223392 A1 | 8/2015 | Wilhelmi et al. |
| 2015/0237793 A1 | 8/2015 | Rans |
| 2016/0229575 A1 | 8/2016 | Lapointe |
| 2017/0000008 A1 | 1/2017 | Anderson et al. |
| 2017/0049040 A1 | 2/2017 | Kinzenbaw |
| 2017/0142891 A1 | 5/2017 | Lucas et al. |
| 2017/0156256 A1 | 6/2017 | Allgaier et al. |
| 2017/0339819 A1 | 11/2017 | Kowalchuk et al. |
| 2017/0359949 A1 | 12/2017 | Garner et al. |
| 2018/0014457 A1 | 1/2018 | Mertlich et al. |
| 2018/0035603 A1 | 2/2018 | Kremmer et al. |
| 2018/0035622 A1 | 2/2018 | Gresch et al. |
| 2018/0049367 A1 | 2/2018 | Garner et al. |
| 2018/0110186 A1 | 4/2018 | Bovee |
| 2018/0116102 A1 | 5/2018 | Taylor et al. |
| 2018/0153094 A1 | 6/2018 | Radtke et al. |
| 2018/0168104 A1 | 6/2018 | Johnson et al. |
| 2018/0192577 A1 | 7/2018 | Smith et al. |
| 2018/0224537 A1 | 8/2018 | Taylor et al. |
| 2018/0249621 A1 | 9/2018 | Horsch |
| 2018/0259979 A1 | 9/2018 | Schoeny et al. |
| 2018/0263177 A1 | 9/2018 | Heathcote |
| 2018/0310468 A1 | 11/2018 | Schoeny et al. |
| 2019/0029165 A1 | 1/2019 | Leimkuehler et al. |
| 2019/0075714 A1 | 3/2019 | Koch et al. |
| 2019/0098828 A1 | 4/2019 | Wilhelmi et al. |
| 2019/0116721 A1 | 4/2019 | Donadon et al. |
| 2019/0116722 A1 | 4/2019 | Donadon et al. |
| 2019/0124824 A1 | 5/2019 | Hubner et al. |
| 2019/0141880 A1 | 5/2019 | Zemenchik et al. |
| 2019/0150350 A1 | 5/2019 | Engel et al. |
| 2019/0159398 A1 | 5/2019 | McMenamy et al. |
| 2019/0162164 A1 | 5/2019 | Funk et al. |
| 2019/0183036 A1 | 6/2019 | Leimkuehler et al. |
| 2019/0223372 A1 | 7/2019 | Koch et al. |
| 2019/0230845 A1 | 8/2019 | Buchner et al. |
| 2019/0230846 A1 | 8/2019 | Koch et al. |
| 2019/0230847 A1 | 8/2019 | Forrest et al. |
| 2019/0239425 A1 | 8/2019 | Gamer et al. |
| 2019/0246551 A1 | 8/2019 | Campbell et al. |
| 2019/0246552 A1 | 8/2019 | Sauder et al. |
| 2019/0254222 A1 | 8/2019 | Rhodes et al. |
| 2019/0289774 A1 | 9/2019 | Stupa et al. |
| 2019/0289776 A1 | 9/2019 | Rempel et al. |
| 2019/0289778 A1 | 9/2019 | Koch et al. |
| 2019/0289779 A1 | 9/2019 | Koch et al. |
| 2019/0343037 A1 | 11/2019 | Werner et al. |
| 2019/0343038 A1 | 11/2019 | Wilhelmi |
| 2019/0364724 A1 | 12/2019 | Radtke et al. |
| 2019/0373797 A1 | 12/2019 | Schoeny et al. |
| 2019/0373801 A1 | 12/2019 | Schoeny et al. |
| 2019/0380259 A1 | 12/2019 | Frank et al. |
| 2019/0387663 A1 | 12/2019 | Wang et al. |
| 2020/0000003 A1 | 1/2020 | Kowalchuk et al. |
| 2020/0000009 A1 | 1/2020 | Henry et al. |
| 2020/0000011 A1 | 1/2020 | Hebner et al. |
| 2020/0000012 A1 | 1/2020 | Hubner et al. |
| 2020/0000013 A1 | 1/2020 | Rylander et al. |
| 2020/0000016 A1 | 1/2020 | Hubner et al. |
| 2020/0008340 A1 | 1/2020 | Stanhope |
| 2020/0015405 A1 | 1/2020 | Kowalchuk et al. |
| 2020/0015406 A1 | 1/2020 | Wright et al. |
| 2020/0022300 A1 | 1/2020 | Gervais et al. |
| 2020/0045869 A1 | 2/2020 | Stanhope et al. |
| 2020/0045877 A1 | 2/2020 | Riffel et al. |
| 2020/0053955 A1 | 2/2020 | Borkgren et al. |
| 2020/0068778 A1 | 3/2020 | Schoeny et al. |
| 2020/0068788 A1 | 3/2020 | Frank et al. |
| 2020/0100421 A1 | 4/2020 | Wang |
| 2020/0100423 A1 | 4/2020 | Dienst |
| 2020/0107487 A1 | 4/2020 | Antich |
| 2020/0107492 A1 | 4/2020 | Antich |
| 2020/0107493 A1 | 4/2020 | Straeter |
| 2020/0107498 A1 | 4/2020 | Anderson et al. |
| 2020/0113118 A1 | 4/2020 | Stanhope |
| 2020/0113169 A1 | 4/2020 | Jelenkovic et al. |
| 2020/0128724 A1 | 4/2020 | Stoller et al. |
| 2020/0128725 A1 | 4/2020 | Rhodes et al. |
| 2020/0132654 A1 | 4/2020 | Pomedli |
| 2020/0146200 A1 | 5/2020 | Schoeny et al. |
| 2020/0156470 A1 | 5/2020 | Stanhope et al. |
| 2020/0196515 A1 | 6/2020 | Engel |
| 2020/0196520 A1 | 6/2020 | Schoeny et al. |
| 2020/0205337 A1 | 7/2020 | Millie et al. |
| 2020/0214193 A1 | 7/2020 | Shivak |
| 2020/0236842 A1 | 7/2020 | Buehler |
| 2020/0245529 A1 | 8/2020 | Thompson et al. |
| 2020/0245535 A1 | 8/2020 | Schilling et al. |
| 2020/0253107 A1 | 8/2020 | Madison et al. |
| 2020/0260630 A1 | 8/2020 | Stanhope et al. |
| 2020/0260633 A1 | 8/2020 | Kovach et al. |
| 2020/0260634 A1 | 8/2020 | Kovach et al. |
| 2020/0260637 A1 | 8/2020 | Thompson et al. |
| 2020/0267355 A1 | 8/2020 | Mentzer |
| 2020/0267882 A1 | 8/2020 | Mcluckie et al. |
| 2020/0281111 A1 | 9/2020 | Walter et al. |
| 2020/0281112 A1 | 9/2020 | Salowitz et al. |
| 2020/0281182 A1 | 9/2020 | Kiefer et al. |
| 2020/0296882 A1 | 9/2020 | Madison et al. |
| 2020/0315081 A1 | 10/2020 | Plattner |
| 2020/0329627 A1 | 10/2020 | Johnson et al. |
| 2020/0329628 A1 | 10/2020 | Mcluckie et al. |
| 2020/0329631 A1 | 10/2020 | Johnson et al. |
| 2020/0337200 A1 | 10/2020 | Smith |
| 2020/0337209 A1 | 10/2020 | Kowalchuk |
| 2020/0337213 A1 | 10/2020 | Schoeny |
| 2020/0337218 A1 | 10/2020 | Puhalla et al. |
| 2020/0337222 A1 | 10/2020 | Anderson et al. |
| 2020/0337223 A1 | 10/2020 | Snipes et al. |
| 2020/0344943 A1 | 11/2020 | Gamer et al. |
| 2020/0344944 A1 | 11/2020 | Wonderlich et al. |
| 2020/0352081 A1 | 11/2020 | Arnett et al. |
| 2020/0352087 A1 | 11/2020 | Gamer et al. |
| 2020/0355667 A1 | 11/2020 | Schoeny et al. |
| 2020/0359551 A1 | 11/2020 | Donadon et al. |
| 2020/0359557 A1 | 11/2020 | Utz |
| 2020/0359559 A1 | 11/2020 | Koch et al. |
| 2020/0375079 A1 | 12/2020 | Smith et al. |
| 2020/0375088 A1 | 12/2020 | Utz |
| 2020/0375090 A1 | 12/2020 | Morgan et al. |
| 2020/0383262 A1 | 12/2020 | Schoeny et al. |
| 2020/0387720 A1 | 12/2020 | Stanhope |
| 2020/0390022 A1 | 12/2020 | Stanhope |
| 2020/0390025 A1 | 12/2020 | Schoeny et al. |
| 2020/0390026 A1 | 12/2020 | Walter et al. |
| 2020/0396888 A1 | 12/2020 | Steinke et al. |
| 2020/0396889 A1 | 12/2020 | Kowalchuk |
| 2020/0396896 A1 | 12/2020 | Donadon et al. |
| 2020/0396897 A1 | 12/2020 | Stoller et al. |
| 2020/0404831 A1 | 12/2020 | Kowalchuk et al. |
| 2020/0404832 A1 | 12/2020 | Schoeny et al. |
| 2020/0404833 A1 | 12/2020 | Stanhope et al. |
| 2020/0404837 A1 | 12/2020 | Thompson et al. |
| 2021/0007271 A1 | 1/2021 | Schoeny et al. |
| 2021/0007272 A1 | 1/2021 | Schoeny et al. |

FOREIGN PATENT DOCUMENTS

| | | |
|---|---|---|
| BR | 202016000413 U2 | 10/2017 |
| BR | 202016001378 U2 | 10/2017 |
| BR | 102019000833 A2 | 7/2020 |
| CA | 22915980 | 2/2007 |
| CN | 2857433 Y | 1/2007 |
| CN | 102763507 A | 11/2012 |
| CN | 203233664 U | 10/2013 |
| CN | 203801244 U | 9/2014 |
| CN | 104956815 A | 10/2015 |
| CN | 105850308 A | 8/2016 |
| CN | 205755411 U | 12/2016 |
| CN | 205993088 U | 3/2017 |
| CN | 106612772 A | 5/2017 |

(56) References Cited

FOREIGN PATENT DOCUMENTS

| | | | |
|---|---|---|---|
| CN | 107087462 A | 8/2017 |
| CN | 108064507 A | 5/2018 |
| CN | 107667630 B | 7/2018 |
| CN | 108243683 A | 7/2018 |
| CN | 207573891 U | 7/2018 |
| CN | 108353582 A | 8/2018 |
| CN | 108650948 A | 10/2018 |
| CN | 108781647 A | 11/2018 |
| CN | 109168453 A | 1/2019 |
| CN | 208317369 U | 1/2019 |
| CN | 109451928 A | 3/2019 |
| CN | 109451931 A | 3/2019 |
| CN | 209314270 U | 8/2019 |
| CN | 209314271 U | 8/2019 |
| CN | 111406477 A | 7/2020 |
| CN | 111630983 A | 9/2020 |
| CN | 111886974 A | 11/2020 |
| CN | 212393213 U | 1/2021 |
| DE | 3003919 A1 | 8/1981 |
| DE | 3441704 A1 | 5/1986 |
| DE | 202005002495 U1 | 5/2005 |
| DE | 202005005276 U1 | 6/2005 |
| DE | 202008008487 U1 | 8/2008 |
| DE | 102015101256 A1 | 7/2016 |
| DE | 102015121600 A1 | 6/2017 |
| DE | 102016207510 A1 | 11/2017 |
| DE | 102017203854 A1 | 9/2018 |
| DE | 102017109042 A1 | 10/2018 |
| DE | 102016218859 A1 | 11/2019 |
| DE | 102018111584 A1 | 11/2019 |
| DE | 102018112948 A1 | 12/2019 |
| DE | 102018120184 A1 | 2/2020 |
| DE | 202020102846 U1 | 6/2020 |
| DE | 202020104231 U1 | 7/2020 |
| DE | 102019108987 A1 | 10/2020 |
| DE | 102019118149 A1 | 1/2021 |
| EP | 0237766 A1 | 9/1987 |
| EP | 2374342 B1 | 5/2013 |
| EP | 3127415 A1 | 2/2017 |
| EP | 3135089 A1 | 3/2017 |
| EP | 2853141 B1 | 6/2017 |
| EP | 2974582 B1 | 9/2017 |
| EP | 2901838 B1 | 11/2017 |
| EP | 2832200 B1 | 5/2018 |
| EP | 3065529 B1 | 5/2018 |
| EP | 3332624 A1 | 6/2018 |
| EP | 3338524 A1 | 6/2018 |
| EP | 2932818 B1 | 8/2018 |
| EP | 3366098 A1 | 8/2018 |
| EP | 3219186 B1 | 11/2018 |
| EP | 3440910 A1 | 2/2019 |
| EP | 3440911 A1 | 2/2019 |
| EP | 2959762 B1 | 5/2019 |
| EP | 3305054 B1 | 7/2019 |
| EP | 3284332 B1 | 10/2019 |
| EP | 3278649 B1 | 11/2019 |
| EP | 3281509 B1 | 11/2019 |
| EP | 3372064 B1 | 2/2020 |
| EP | 3360403 A1 | 4/2020 |
| EP | 3372065 B1 | 4/2020 |
| EP | 3417689 B1 | 4/2020 |
| EP | 3440909 B1 | 4/2020 |
| EP | 3127414 B1 | 5/2020 |
| EP | 3530095 B1 | 9/2020 |
| EP | 3501250 B1 | 11/2020 |
| EP | 3520592 B1 | 12/2020 |
| FR | 2961058 A1 | 12/2011 |
| GB | 1253688 A | 11/1971 |
| GB | 2057835 A | 4/1981 |
| JP | 2005333895 A | 12/2005 |
| JP | 2013027389 A | 2/2013 |
| JP | 6523898 B2 | 6/2019 |
| JP | 6545240 B2 | 7/2019 |
| JP | 6546363 B2 | 7/2019 |
| JP | 2019150070 A | 9/2019 |
| JP | 2019165712 A | 10/2019 |
| RU | 2230446 C1 | 6/2004 |
| RU | 2649332 C1 | 4/2018 |
| WO | 1994026090 A2 | 11/1994 |
| WO | WO2004017712 A1 | 3/2004 |
| WO | 2010088703 A1 | 8/2010 |
| WO | WO2015048867 A1 | 4/2015 |
| WO | WO2016071269 A1 | 5/2016 |
| WO | WO2017004074 A1 | 1/2017 |
| WO | 2017040533 A1 | 3/2017 |
| WO | 2017117638 A1 | 7/2017 |
| WO | 2018013859 A1 | 1/2018 |
| WO | WO2018054624 A1 | 3/2018 |
| WO | WO2018054625 A1 | 3/2018 |
| WO | 2018093568 A2 | 5/2018 |
| WO | WO2019050944 A1 | 3/2019 |
| WO | WO2019079205 A | 4/2019 |
| WO | WO2019091732 A1 | 5/2019 |
| WO | WO2019108881 A1 | 6/2019 |
| WO | WO2019197963 A1 | 10/2019 |
| WO | WO2020001964 A1 | 1/2020 |
| WO | WO2020011386 A1 | 1/2020 |
| WO | WO2020016047 A1 | 1/2020 |
| WO | WO2020035337 A1 | 2/2020 |
| WO | WO2020039322 A1 | 2/2020 |
| WO | WO2020046586 A1 | 3/2020 |
| WO | WO2020049387 A1 | 3/2020 |
| WO | WO2020109881 A1 | 6/2020 |
| WO | WO2020161566 A1 | 8/2020 |
| WO | WO2020187380 A1 | 9/2020 |
| WO | WO2020194150 A1 | 10/2020 |
| WO | WO2020227608 A1 | 11/2020 |
| WO | WO2020240301 A1 | 12/2020 |
| WO | WO2020247985 A1 | 12/2020 |
| WO | WO2021014231 A1 | 1/2021 |

OTHER PUBLICATIONS

Precision Planting, Precision Planting From County Line AG Services, Keeton Seed Firmers, http://countylineag.ohag4u.com/preclsion_planting.htm, Feb. 8, 2019, 2 pages.

Lamb and Webster, PrecisionMeter, Improve Planter Performance Where it Counts-ln the Meter, http://www.lambandwebster.com/precision-planting/precisionmeter/, 2017, 4 pages.

Planterology, SpeedTube, https://planterology.com/solutions/speedtube/, Feb. 12, 2019, 5 pages.

John Deere, John Deere Exactmerge Planter Trench Delivery System and Brushbelt Delivery System, Cross Implement, https://crossimplement.com/news-and-updates/article/2015/06/john-deere-exactemerge-planter-trench-deiivery-system-and-brushbelttm-delivery-system, Jun. 11, 2015, 6 pages.

Lamb and Webster, SpeedTube, Focused on the Perfect Plant—and Speed., http://www.lambandwebster.com/precision-planting/speedtube/, 2017, 6 pages.

Precision Planting, PrecisionMeter a Better Finger Meter, Improve Planter Performance Where it Counts-ln the Meter, https://www.precisionplanting.com/products/product/precisionmeter, Mar. 7, 2019, 15 pages.

U.S. Appl. No. 16/726,346, filed Dec. 24, 2019, Chad Michael Johnson.

U.S. Appl. No. 16/726,388, filed Dec. 24, 2019 Chad Michael Johnson.

U.S. Appl. No. 16/726,345, filed Dec. 24, 2019 Chad Michael Johnson.

U.S. Appl. No. 16/726,470, filed Dec. 24, 2019 Chad Michael Johnson.

U.S. Appl. No. 16/726,501, filed Dec. 24, 2019 Chad Michael Johnson.

U.S. Appl. No. 16/726,528, filed Dec. 24, 2019 Chad Michael Johnson.

U.S. Appl. No. 16/726,588, filed Dec. 24, 2019 Chad Michael Johnson.

U.S. Appl. No. 16/726,598, filed Dec. 24, 2019 Chad Michael Johnson.

(56) References Cited

OTHER PUBLICATIONS

U.S. Appl. No. 16/726,619, filed Dec. 24, 2019 Chad Michael Johnson.
U.S. Appl. No. 16/726,648, filed Dec. 24, 2019 Chad Michael Johnson.
U.S. Appl. No. 16/726,670, filed Dec. 24, 2019 Chad Michael Johnson.

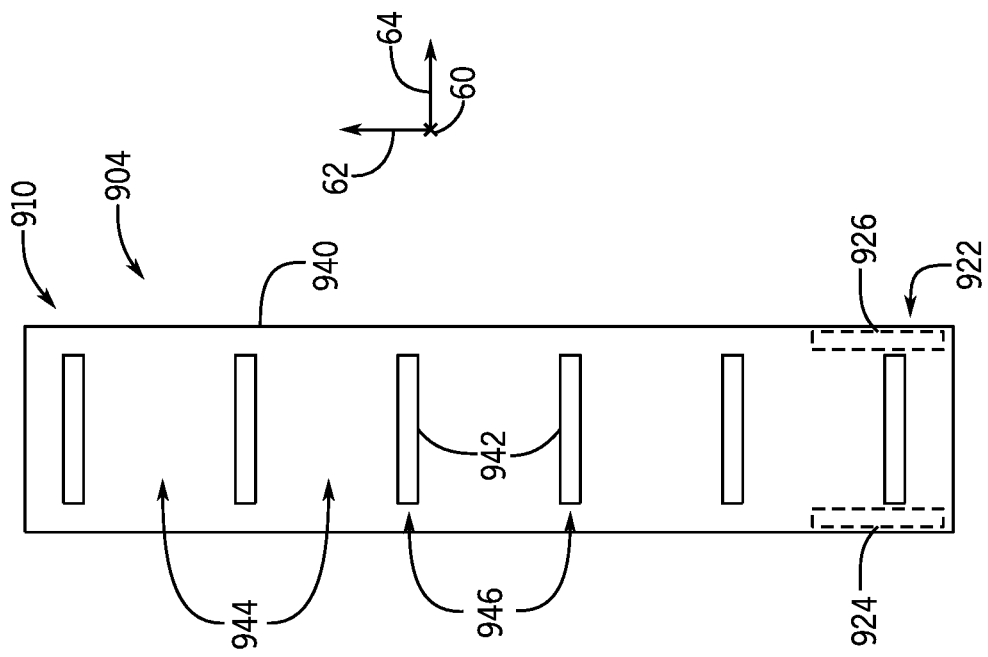
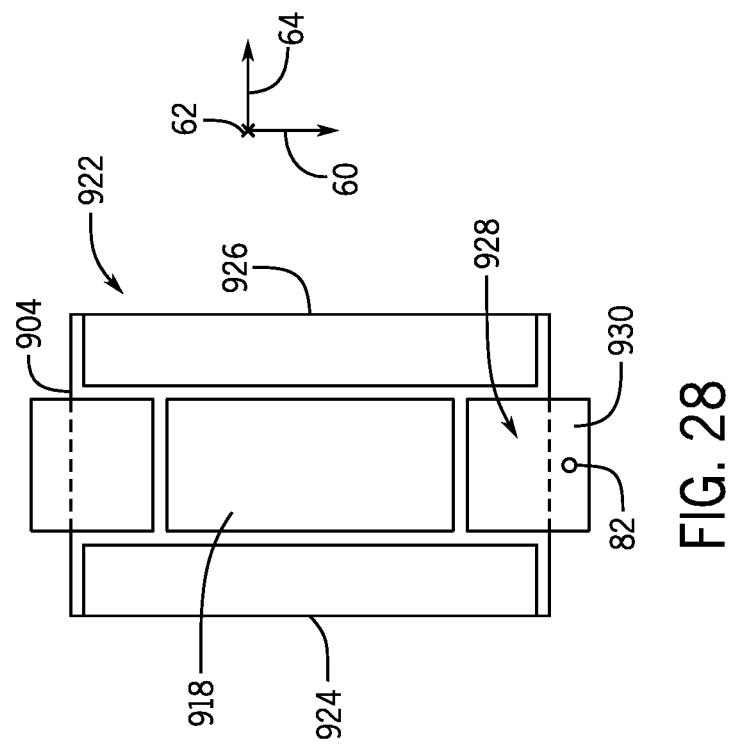

PARTICLE DELIVERY SYSTEM OF AN AGRICULTURAL ROW UNIT

BACKGROUND

The present disclosure relates generally to a particle delivery system of an agricultural row unit.

Generally, planting implements (e.g., planters) are towed behind a tractor or other work vehicle via a mounting bracket secured to a rigid frame of the implement. Planting implements typically include multiple row units distributed across a width of the implement. Each row unit is configured to deposit seeds at a desired depth beneath the soil surface of a field, thereby establishing rows of planted seeds. For example, each row unit typically includes a ground engaging tool or opener that forms a seeding path (e.g., trench) for seed deposition into the soil. An agricultural product delivery system (e.g., including a metering system and a seed tube) is configured to deposit seeds and/or other agricultural products (e.g., fertilizer) into the trench. The opener/agricultural product delivery system is followed by closing discs that move displaced soil back into the trench and/or a packer wheel that packs the soil on top of the deposited seeds/other agricultural products.

Certain row units, or planting implements generally, include a seed storage area configured to store the seeds. The agricultural product delivery system is configured to transfer the seeds from the seed storage area into the trench. For example, the agricultural product delivery system may include a metering system that meters the seeds from the seed storage area into a seed tube for subsequent delivery to the trench. Certain types of seeds may benefit from a particular spacing along the trench. Additionally, the planting implement having the row units may travel at varying speeds based on the type of seed being deposited into the soil, the type and structure of the soil within the field, and other factors. Typically, the row units output the seeds to the trench at the speed that the implement is traveling through the field, which may affect the spacing between the seeds and may cause the seeds to move relative to a target location in the trench.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a particle delivery system of an agricultural row unit includes a particle belt having a particle engagement section configured to receive a particle from a particle metering and singulation unit and a particle exit section configured to expel the particle toward a trench in soil. The particle delivery system includes an air flow system configured to establish an air flow toward the particle engagement section of the particle belt to accelerate the particle toward the particle belt, such that a particle speed of the particle reaches a target particle speed, is within a target percentage of a belt speed of the particle belt, or both, as the particle reaches the particle engagement section of the particle belt. The air flow toward the particle engagement section is a substantial portion of a total air flow established by the air flow system relative to other sections of the particle belt.

DRAWINGS

These and other features, aspects, and advantages of the present disclosure will become better understood when the following detailed description is read with reference to the accompanying drawings in which like characters represent like parts throughout the drawings, wherein:

FIG. 28 is a cross-sectional view of wheels and particle belts of the particle delivery system of FIG. 27, in accordance with an aspect of the present disclosure;

FIG. 29 is a front view of a particle belt of the particle delivery system of FIG. 27, in accordance with an aspect of the present disclosure;

DETAILED DESCRIPTION

Figure 1:
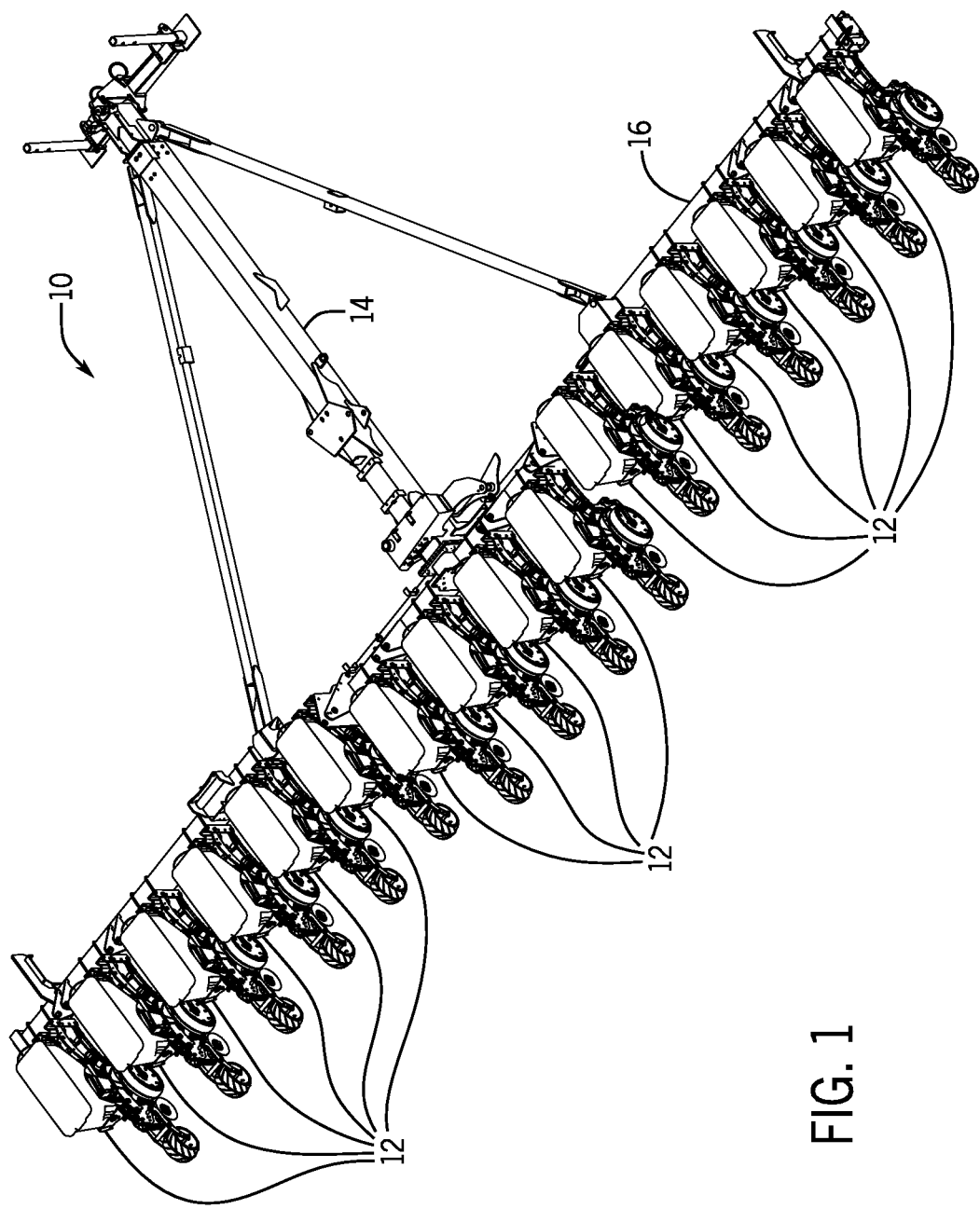
FIG. 1 is a perspective view of an embodiment of an agricultural implement having multiple row units distributed across a width of the agricultural implement, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Certain embodiments of the present disclosure include a particle delivery system for a row unit of an agricultural implement. Certain agricultural implements include row units configured to deliver particles (e.g., seeds) to trenches in soil. For example, a particle distribution system may transport the particles from a storage tank of the agricultural implement to the row units (e.g., to a hopper assembly of each row unit or directly to a particle delivery system of each row unit), and/or the particles may be delivered from a hopper assembly of each row unit to a respective particle delivery system. Each particle delivery system may output the particles to a respective trench as the agricultural implement travels over the soil. Certain agricultural implements are configured to travel at particular speeds (e.g., between four kilometers per hour (kph) and thirty kph) while delivering the particles to the trenches. Additionally, a particular spacing between the particles when disposed within the soil may enhance plant development and/or yield.

Accordingly, in certain embodiments, at least one row unit of the agricultural implement includes a particle delivery system configured to deliver the particles to the respective trench in the soil at a particular spacing while reducing the relative ground speed of the particles (e.g., the speed of the particles relative to the ground). The particle delivery system includes a particle metering and singulation unit (e.g., including a metering wheel, a metering disc, etc.) configured to meter individual particles, thereby establishing the particular spacing between particles. The particle metering and singulation unit is configured to deliver the particles from a release point of the particle metering and singulation unit to a particle engagement section (e.g., to a particle engagement section of the particle engagement section) of a particle belt assembly, which includes a particle belt (e.g., an endless member). The particle belt includes a base and flights coupled to the base. Each pair of opposing flights is configured to receive a respective particle from the particle metering and singulation unit. For example, each pair of opposing flights may receive the respective particle at a particle transfer section of the particle delivery system. The particle transfer section may include the release point of the particle metering and singulation unit and/or the particle engagement section of the particle belt. The particle belt is configured to transport the particles from the particle transfer section toward a particle exit section of the particle belt assembly. At the particle exit section, the particle belt is configured to deliver and/or propel the particles into the trench in the soil. For example, the particle belt may accelerate the particles to a speed greater than a speed resulting from gravitational acceleration alone. As such, the particle belt assembly may enable the row unit to travel faster than traditional row units that utilize seed tubes, which rely on gravity to accelerate the particles (e.g., seeds) for delivery to soil.

In certain embodiments, the particle metering and singulation unit and/or the particle belt assembly may be controlled to achieve a desired ground speed and/or the particular spacings of the particles. For example, the particle delivery system may include a controller configured to control a particle speed of particles moving between the particle metering and singulation unit and the particle belt (e.g., through/along the particle transfer section) and/or a particle exit speed of particles exiting the particle belt assembly. The controller may be configured to control a distance between the particle metering and singulation unit and the particle belt, a force applied by a particle removal system to each particle at the particle metering and singulation unit, a rotational speed of a disc of the particle metering and singulation unit, an air flow configured to accelerate each particle from the particle metering and singulation unit toward the particle belt, or a combination thereof, to control the particle speed between the particle metering and singulation unit and the particle belt of the particle belt assembly. Additionally or alternatively, the controller may be configured to control a protrusion configured to cause the flights of the particle belt to flex and/or pivot to accelerate the particles from the particle belt toward the trench in soil to control the particle exit speed from the particle belt assembly.

With the foregoing in mind, the present embodiments relating to particle delivery systems may be utilized within any suitable agricultural implement. For example, FIG. 1 is a perspective view of an embodiment of an agricultural implement 10 having multiple row units 12 distributed across a width of the agricultural implement 10. The implement 10 is configured to be towed through a field behind a work vehicle, such as a tractor. As illustrated, the implement 10 includes a tongue assembly 14, which includes a hitch configured to couple the implement 10 to an appropriate tractor hitch (e.g., via a ball, clevis, or other coupling). The tongue assembly 14 is coupled to a tool bar 16 which supports multiple row units 12. Each row unit 12 may include one or more opener discs configured to form a particle path (e.g., trench) within soil of a field. The row unit 12 may also include a particle delivery system (e.g., including a particle metering and singulation unit and a particle belt assembly) configured to deposit particles (e.g., seeds, fertilizer, and/or other agricultural product(s)) into the particle path/trench. In addition, the row unit 12 may include closing disc(s) and/or a packer wheel positioned behind the particle delivery system. The closing disc(s) are configured to move displaced soil back into the particle path/trench, and the packer wheel is configured to pack soil on top of the deposited particles.

During operation, the agricultural implement 10 may travel at a particular speed along the soil surface while depositing the particles to the trenches. For example, a speed of the agricultural implement may be selected and/or controlled based on soil conditions, a type of the particles delivered by the agricultural implement 10 to the soil, a size (e.g., a nominal and/or an average size) of the particles, weather conditions, a size/type of the agricultural implement, or a combination thereof. Additionally or alternatively, a particular spacing between the particles when disposed within the soil may enhance plant development and/or yield. Accordingly, in certain embodiments, at least one row unit 12 may include a particle delivery system configured to deposit the particles at the particular spacing while reducing the ground speed of the particles (e.g., as compared to a row unit that employs a particle tube to delivery particles to the soil). As discussed in detail below, the particle delivery system may include a particle metering and singulation unit configured to meter individual particles to a particle belt assembly to establish the spacing between the particles. Additionally, the particle belt assembly may include a particle belt configured to receive the particles from the particle metering and singulation unit and to accelerate the particles toward the trench in the soil. The particle belt may accelerate the particles to a speed greater than a speed resulting from gravitational acceleration alone. As such, the particle belt assembly may enable the row unit 12 to travel faster than traditional row units that utilize seed tubes, which rely on gravity to accelerate the particles (e.g., seeds) for delivery to soil. As a result, the agricultural implement 10 may travel faster through the field and more accurately place each particle within the soil of the field.

Figure 2:
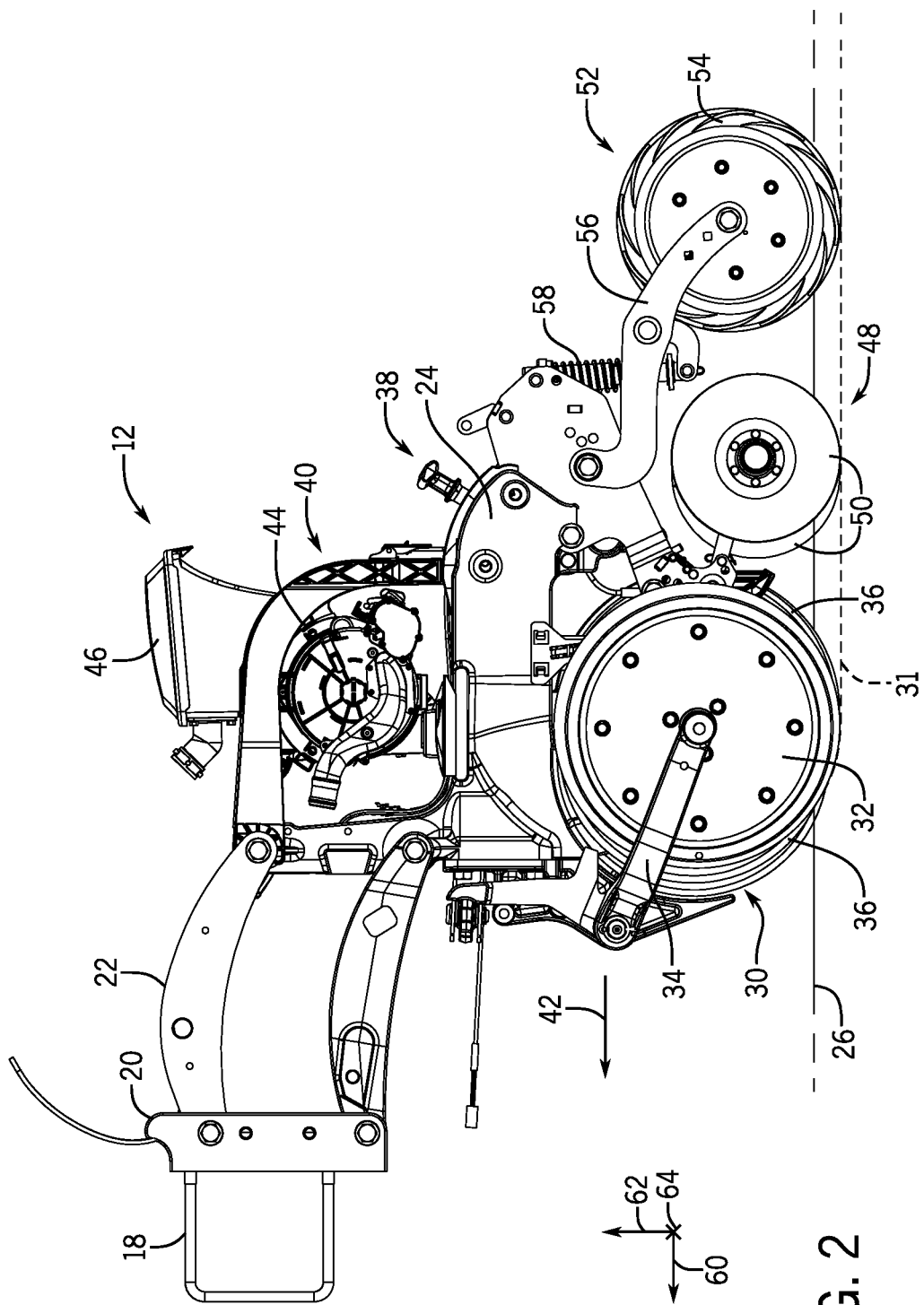
FIG. 2 is a side view of an embodiment of a row unit that may be employed on the agricultural implement of FIG. 1, in accordance with an aspect of the present disclosure.

FIG. 2 is a side view of an embodiment of a row unit 12 (e.g., agricultural row unit) that may be employed on the agricultural implement of FIG. 1. The row unit 12 includes a mount 18 configured to secure the row unit 12 to the tool bar of the agricultural implement. In the illustrated embodiment, the mount 18 includes a U-bolt that secures a bracket 20 of the row unit 12 to the tool bar. However, in alternative embodiments, the mount may include another suitable device that couples the row unit to the tool bar. A linkage assembly 22 extends from the bracket 20 to a frame 24 of the row unit 12. The linkage assembly 22 is configured to enable vertical movement of the frame 24 relative to the tool bar in response to variations in a soil surface 26. In certain embodiments, a down pressure system (e.g., including a hydraulic actuator, a pneumatic actuator, etc.) may be coupled to the linkage assembly 22 and configured to urge the frame 24 toward the soil surface 26. While the illustrated linkage assembly 22 is a parallel linkage assembly (e.g., a four-bar linkage assembly), in alternative embodiments, another suitable linkage assembly may extend between the bracket and the frame.

The row unit 12 includes an opener assembly 30 that forms a trench 31 in the soil surface 26 for particle deposition into the soil. In the illustrated embodiment, the opener assembly 30 includes gauge wheels 32, arms 34 that pivotally couple the gauge wheels 32 to the frame 24, and opener discs 36. The opener discs 36 are configured to excavate the trench 31 into the soil, and the gauge wheels 32 are configured to control a penetration depth of the opener discs 36 into the soil. In the illustrated embodiment, the row unit 12 includes a depth control system 38 configured to control the vertical position of the gauge wheels 32 (e.g., by blocking rotation of the arms in the upward direction beyond a selected orientation), thereby controlling the penetration depth of the opener discs 36 into the soil.

The row unit 12 includes a particle delivery system 40 configured to deposit particles (e.g., seeds, fertilizer, and/or other agricultural product(s)) into the trench 31 at a desired depth beneath the soil surface 26 as the row unit 12 traverses the field along a direction of travel 42. As illustrated, the particle delivery system 40 includes a particle metering and singulation unit 44 configured to receive the particles (e.g., seeds) from a hopper assembly 46 (e.g., a particle storage area). In certain embodiments, the hopper assembly may be integrally formed with a housing of the particle metering and singulation unit. The hopper assembly 46 is configured to store the particles for subsequent metering by the particle metering and singulation unit 44 and delivery to the soil by a particle belt assembly of the particle delivery system 40. As will be described in greater detail below, in some embodiments, the particle metering and singulation unit 44 includes a disc configured to rotate to transfer the particles from the hopper assembly 46 toward a particle belt of the particle belt assembly. The particle belt assembly may generally extend from the particle metering and singulation unit 44 toward the trench 31 formed in the soil and may transfer the particles received from the particle metering and singulation unit 44 to the trench 31.

The opener assembly 30 and the particle delivery system 40 are followed by a closing assembly 48 that moves displaced soil back into the trench 31. In the illustrated embodiment, the closing assembly 48 includes two closing discs 50. However, in alternative embodiments, the closing assembly may include other closing devices (e.g., a single closing disc, etc.). In addition, in certain embodiments, the closing assembly may be omitted. In the illustrated embodiment, the closing assembly 48 is followed by a packing assembly 52 configured to pack soil on top of the deposited particles. The packing assembly 52 includes a packer wheel 54, an arm 56 that pivotally couples the packer wheel 54 to the frame 24, and a biasing member 58 configured to urge the packer wheel 54 toward the soil surface 26, thereby enabling the packer wheel to pack soil on top of the deposited particles (e.g., seeds and/or other agricultural product(s)). While the illustrated biasing member 58 includes a spring, in alternative embodiments, the biasing member may include another suitable biasing device, such as a hydraulic cylinder or a pneumatic cylinder, among others. For purposes of discussion, reference may be made to a longitudinal axis or direction 60, a vertical axis or direction 62, and a lateral axis or direction 64. For example, the direction of travel 42 of the row unit 12 may be generally along the longitudinal axis 60.

Figure 3:
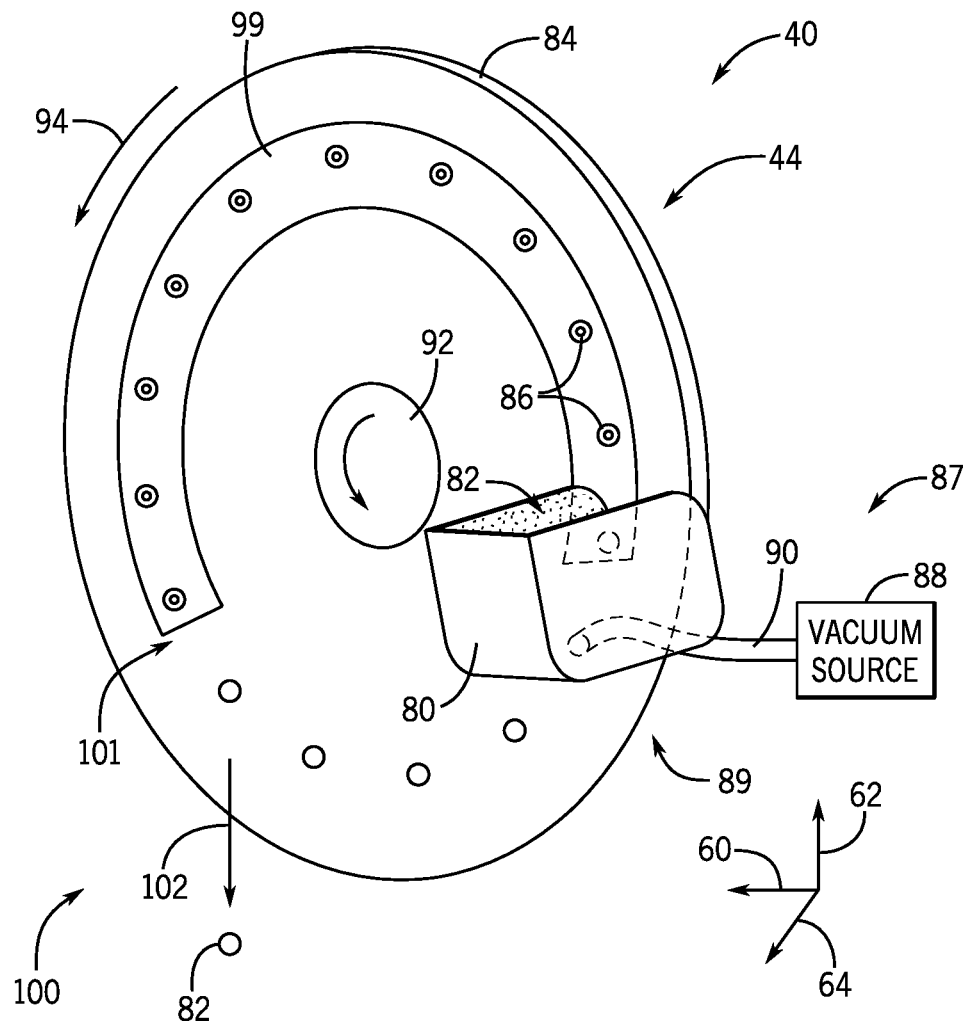
FIG. 3 is a perspective view of an embodiment of a particle metering and singulation unit and a particle hopper of a particle delivery system that may be employed within the row unit of FIG. 2, in accordance with an aspect of the present disclosure.

FIG. 3 is a perspective view of an embodiment of the particle metering and singulation unit 44 and a particle hopper 80 of the particle delivery system 40 that may be employed within the row unit of FIG. 2. The particle hopper 80 is a particle storage area configured to store particles 82 (e.g., seeds, fertilizer, other particulate material, or a combination thereof) for subsequent metering by the particle metering and singulation unit 44. In certain embodiments, the particle hopper 80 may be coupled to and/or included as part of a housing of the particle metering and singulation unit 44. In some embodiments, the hopper assembly may feed the particles 82 into and/or may be coupled to the particle hopper 80.

The particle metering and singulation unit 44 includes a disc 84 having apertures 86 configured to receive the particles 82 from the particle hopper 80. For example, each aperture 86 may receive a single particle 82. As illustrated, the particle metering and singulation unit 44 includes an air flow system 87 having a vacuum source 88 (e.g., a fan) configured to generate an air flow through the apertures 86 (e.g., generally along the lateral axis 64) at a particle reception section 89 adjacent to the particle hopper 80. The air flow is configured to form a vacuum (e.g., a vacuum pressure) at the apertures 86, thereby drawing the particles 82 from the particle hopper 80 toward and into the apertures 86. As illustrated, an air tube 90 of the air flow system 87 extends generally from the vacuum source 88 to the disc 84. The vacuum source 88 is configured to generate the air flow from the particle hopper 80, through the apertures 86 and the air tube 90, and toward the vacuum source 88. The particle metering and singulation unit 44 also includes a vacuum passage 99 extending generally from the particle hopper 80 to a particle transfer section 100 of the particle delivery system 40, where the particles 82 are transferred from the particle metering and singulation unit 44 to the particle belt. The vacuum source 88 is configured to form the vacuum at the apertures 86 generally at a first end of the vacuum passage 99 generally adjacent to the particle hopper 80. As described below, the particle metering and singulation unit 44 is configured to transfer the particles 82 generally at a second end of the vacuum passage 99 by removing and/or occluding the vacuum at the apertures 86. The vacuum is applied at the particle metering and singulation unit 44 only at/along the vacuum passage 99. Additionally or alternatively, the apertures of the disc may be configured to receive the particles via other suitable methods. For example, the disc may include a scoop at each aperture configured to scoop a respective particle from the particle hopper as the aperture rotates by the particle hopper in the particle reception section. In some embodiments, the particle delivery system may include other systems configured to form a pressure differential at the apertures of the disc, such as an air source configured to push the particles into/against the disc and into the apertures of the disc. As illustrated, the particle hopper 80 and the particle reception section 89 are generally opposite of the particle transfer section 100 along the disc 84. In certain embodiments, the particle hopper and/or the particle reception section may be substantially closer and/or adjacent to the particle transfer section of the particle delivery system. As used herein, "vacuum" refers to an air pressure that is less than the ambient atmospheric air pressure, and not necessarily 0 pa.

As illustrated, the particle metering and singulation unit 44 includes a gear 92 coupled to the disc 84 and configured to drive the disc 84 to rotate in a rotational direction 94 (e.g., generally about the lateral axis 64). For example, as the disc 84 rotates in the rotational direction 94, the apertures 86 collect respective particles 82 from the particle hopper 80 and move the particles 82 from the particle reception section 89 to the particle transfer section 100. The gear 92 may drive rotation of the disc 84, such that a tangential speed of the particles 82 exiting the disc 84 is generally between one tenth kph to twenty kph. At the particle transfer section 100, the particles 82 are released from the particle metering and singulation unit 44 at a release point 101 of the particle metering and singulation unit 44 toward the particle belt of the particle belt assembly along a flow path 102 (e.g., a release trajectory). For example, the vacuum passage 99 extends generally between the particle hopper 80 and the release point 101. The particle transfer section 100 may include the particle metering and singulation unit 44, portion(s) of the particle metering and singulation unit 44 (e.g., the release point 101), a particle tube extending between the particle metering and singulation unit 44 and the particle belt, portion(s) of the particle tube, the particle belt, portion(s) of the particle belt (e.g., a particle engagement section of the particle belt where the particle belt is configured to receive the particles 82), or a combination thereof. As described in greater detail below, the particle delivery system may include systems and/or methods configured to remove the particles 82 from the apertures 86 of the particle metering and singulation unit 44 at the particle transfer section 100.

The disc 84 having the apertures 86 may be any suitable shape configured to rotate/move to transfer the particles 82 from the particle hopper 80 to the release point 101. For example, the disc 84 may be generally flat, may have a curved portion and a flat portion, may be entirely curved, may be a drum, or may include other suitable shapes, geometries, and/or configurations. In certain embodiments, an inner portion of the disc 84 may curved/raised related to an outer portion of the disc 84 having the apertures 86 (e.g., the disc 84 may be generally bowl-shaped), such that the particles 82 may be directed toward the apertures 86 (e.g., away from the raised inner portion and/or toward the flat outer portion) as the disc 84 rotates. In some embodiments, the disc 84 may be a drum having the apertures 86 disposed along an outer portion and/or an exterior of the drum.

Figure 4:
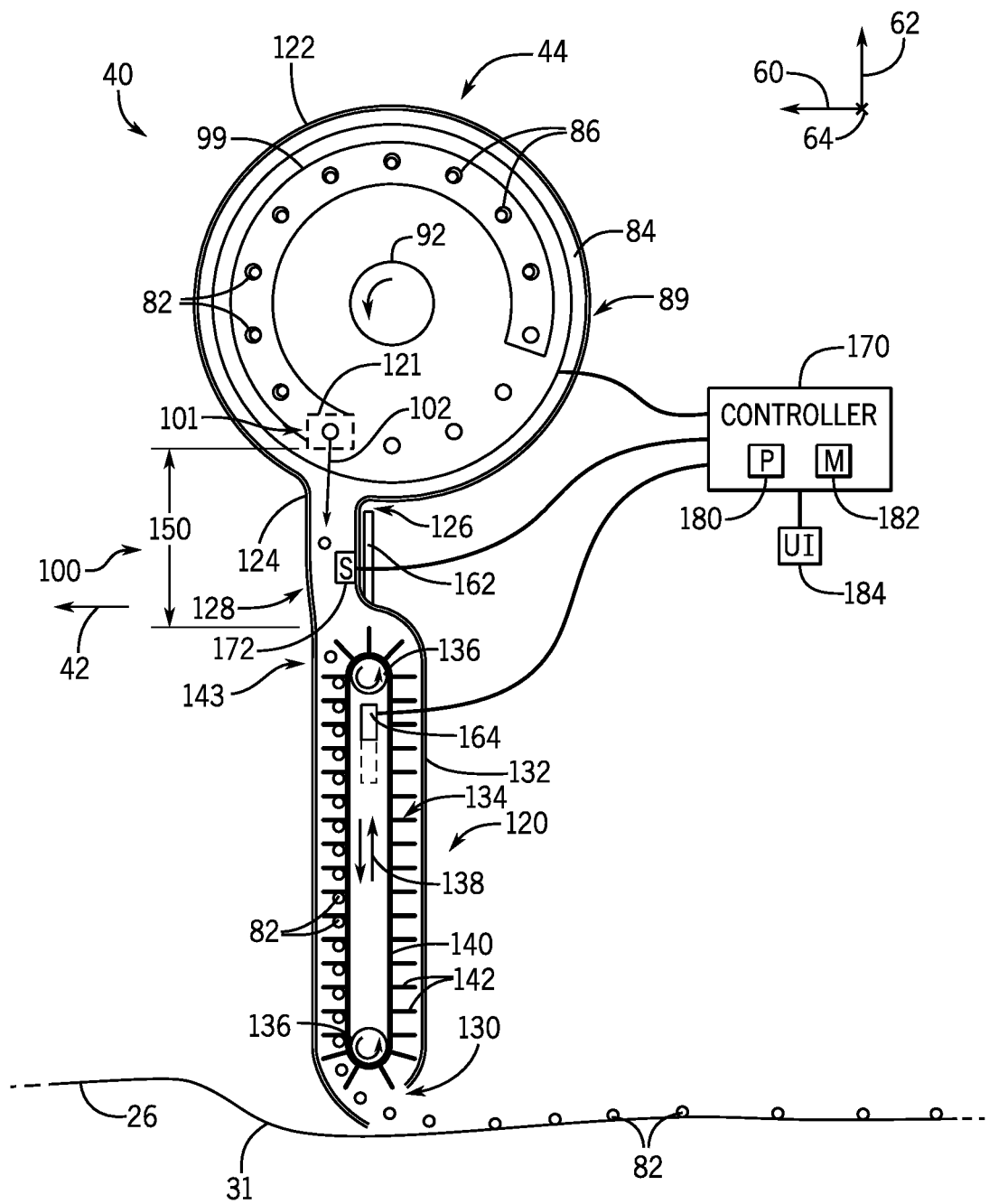
FIG. 4 is a cross-sectional view of an embodiment of a particle delivery system that may be employed within the row unit of FIG. 2, in accordance with an aspect of the present disclosure.

FIG. 4 is a cross-sectional view of the particle delivery system 40 that may be employed within the row unit of FIG. 2. As described above, the particle metering and singulation unit 44 is configured to transfer the particles 82 from the particle reception section 89 toward the particle transfer section 100. At the particle transfer section 100, the particles 82 are transferred from the particle metering and singulation unit 44 (e.g., from a release point 101 of the particle metering and singulation unit 44) toward a particle belt assembly 120 of the particle delivery system 40 along the flow path 102.

The particle metering and singulation unit 44, via the air flow system, is configured to maintain the vacuum within each aperture 86 along the vacuum passage 99 (e.g., from the particle reception section 89 to the particle transfer section 100). At the particle transfer section 100, the vacuum within each aperture 86 is removed and/or occluded, such that the particle 82 within the aperture 86 may fall downwardly along the flow path 102 under the influence of gravity. For example, a vacuum removal system 121 of the particle delivery system 40 disposed at an end of the vacuum passage 99 adjacent to the particle transfer section 100 is configured to remove the vacuum at each aperture 86 as each aperture 86 passes by the vacuum removal system 121 at the release point 101 (e.g., remove the vacuum established by the air flow generated by the vacuum source at the particle reception section 89). The vacuum removal system 121 may remove the vacuum at each aperture 86 by providing a positive air flow toward the particle 82 and/or by end the vacuum passage 99 (e.g., by introducing a positive air pressure configured to overcome the vacuum at the aperture 86). In certain embodiments, the particle delivery system may include other systems configured to remove the particles from the particle metering and singulation unit at the particle transfer section.

As illustrated, the particle metering and singulation unit 44 includes a particle metering and singulation unit housing 122 configured to house the disc 84. The particle delivery system 40 includes a particle tube 124 having a first end 126 at the particle metering and singulation unit 44 (e.g., coupled to the particle metering and singulation unit housing 122 and disposed adjacent to the release point 101 of the particle metering and singulation unit 44) and a second end 128 at the particle belt assembly 120 (e.g., coupled to the particle belt assembly 120). The particles 82 are configured to flow from the particle metering and singulation unit 44, through the particle tube 124, and toward the particle belt assembly 120. The particle tube may include any suitable shape and/or configuration configured to at least particle direct the particles, such as a channel, a cylindrical tube, a rectangular tube, and/or other suitable shapes/configurations.

The particle belt assembly 120 is configured to transfer the particles 82 from the particle transfer section 100 toward a particle exit section 130 of the particle delivery system 40 and toward the trench 31. The particle belt assembly 120 includes a particle belt housing 132, a particle belt 134 (e.g., an endless member) disposed within the particle belt housing 132, and wheels 136 (e.g., gears, pulleys, etc.) configured to drive/enable the particle belt 134 to turn/rotate, as indicated by arrows 138. The particle belt housing 132 is coupled to the second end 128 of the particle tube 124. The particle belt 134 includes a base 140 and flights 142 coupled to the base 140. Each pair of opposing flights 142 along the particle belt 134 is configured to receive and/or capture a respective particle 82 from the particle metering and singulation unit 44 at a particle engagement section 143 of the particle belt 134 and of the particle transfer section 100. As illustrated, the flights 142 are generally disposed at a right angle relative to the base 140. In some embodiments, at least one flight may be oriented at another suitable angle relative to the base (e.g., at an acute angle between the flight and the base). The second end 128 of the particle tube 124 is disposed adjacent to the particle engagement section 143 of the particle belt 134. As such, the particle tube 124 extends generally from the release point 101 of the particle metering and singulation unit 44 to the particle engagement section 143 of the particle belt 134.

As generally described above, during operation of the row unit of the agricultural implement, the particle metering and singulation unit 44 is configured to meter the particles 82 to provide a spacing between the particles 82. At the release point 101, the particle metering and singulation unit 44 is configured to release each particle 82, which may travel through the particle tube 124 and toward the particle belt 134. The particle belt 134 is configured to receive each particle 82 at the particle engagement section 143 and to move the particle 82 toward the particle exit section 130 and toward the trench 31. The disc 84 of the particle metering and singulation unit 44 and the particle belt 134 may move (e.g., rotate) at different speeds. For example, the particle belt 134 may move generally faster than the disc 84 (e.g., the particle belt 134 may rotate faster than the disc 84 and/or a tangential speed of the particle belt 134 may be greater than a tangential speed of the disc 84 at the apertures 86), such that the particle belt 134 may accelerate the particles 82 received from the disc 84 toward the trench 31. The particle belt 134 may accelerate the particles 82 to a speed greater than a speed resulting from gravitational acceleration alone. As such, the particle belt assembly 120 may enable the row unit to travel faster than traditional row units that utilize seed tubes, which rely on gravity to accelerate the particles 82 (e.g., seeds) for delivery to soil.

To facilitate transfer of the particles 82 from the particle metering and singulation unit 44 to the particle belt 134, the particle metering and singulation unit 44 and the particle belt 134 are separated by a distance 150 (e.g., a selected distance). The distance 150 extends from the release point 101 of the particle metering and singulation unit 44 and of the particle transfer section 100 to the particle engagement section 143 of the particle belt 134 and of the particle transfer section 100. The distance 150 is a vertical distance that enables the particles 82 to accelerate under the influence of gravity from the particle metering and singulation unit 44 to the particle belt 134. The distance 150 may be any suitable distance configured to sufficiently accelerate the particles 82, such that the particle speed of the particles entering the particle belt 134 (e.g., at the particle engagement section 143) is closer to the belt speed of the particle belt 134. As such, the acceleration of the particles 82 along the particle transfer section 100 (e.g., from the release point 101 to the particle engagement section 143) may facilitate the receipt of the particles 82 by the particle belt 134. For example, the distance 150 may be between two one centimeter (cm) and one meter (m), between ten cm and fifty cm, between twenty cm and thirty cm, and other suitable distances. Additionally, the distance 150 may be selected to bring the particle speed of the particles 82 at the particle engagement section 143 to within a target percentage of the belt speed.

In the illustrated embodiment, the particle belt assembly 120 includes a track 162, and the wheels 136 (e.g., gears, pulleys, etc.) are movably coupled to the track 162. The particle belt assembly 120 is configured to move generally vertically (e.g., along the vertical axis 62) via movement of the wheels 136 along the track 162 and within the particle belt housing 132. As illustrated, an actuator 164 of the particle delivery system 40 is configured to drive the wheels 136 along the track 162. To increase the distance 150, the actuator 164 may move the particle belt 134 downwardly along the track 162. To decrease the distance 150, the actuator 164 may move the particle belt 134 upwardly along the track 162. In certain embodiments, the particle belt housing may be coupled to the track and configured to move generally vertically along the track to adjust the distance between the release point and the particle engagement section. For example, the particle tube may be flexible and/or may telescope, such that the particle tube may remain coupled to the particle metering and singulation unit housing and the particle belt housing as the particle belt housing moves generally vertically relative the particle metering and singulation unit housing. Additionally or alternatively, to adjust the distance between the particle metering and singulation unit and the particle belt (e.g., between the release point of the particle metering and singulation unit and the particle engagement section of the particle belt), the particle delivery system may include a track or other mechanism configured to enable the particle metering and singulation unit to move generally vertically with respect to the particle belt assembly. In some embodiments, only a single wheel coupled to the track may be configured to move along the track (e.g., the wheel closer to the particle metering and singulation unit), such that the particle belt may stretch/retract as the single wheel moves along the track.

A controller 170 of the particle delivery system 40 may control the distance 150 between the particle metering and singulation unit 44 and the particle belt 134 to control the speed at which each particle 82 engages the particle belt 134 (e.g., the distance 150 may be a selected/controlled distance). For example, the controller 170 may control the distance 150 (e.g., control movement of the particle belt assembly 120 with respect to the particle metering and singulation unit 44) to control the particle speed of each particle 82 at the particle engagement section 143 of the particle belt 134 (e.g., such that the particle speed at the particle belt 134 is within a target percentage of a belt speed of the particle belt 134). The target percentage may be determined by the controller 170 based on a type of the particles 82, a size of each particle 82 of the particles 82 (e.g., a nominal and/or an average size), a ground speed of the row unit, a spacing between the flights 142 of the particle belt 134, a length of the particle belt 134, the belt speed of the particle belt 134, or a combination thereof. The target percentage may be any suitable percentage, such as ten percent, twenty percent, thirty percent, forty percent, fifty percent, sixty percent, seventy percent, eighty percent, ninety percent, between ten percent and one hundred percent, between fifty and one hundred percent, between fifty and ninety percent, between sixty percent and eighty percent, between seventy percent and eighty percent, etc.

To control the distance 150, the controller 170 may receive an input signal indicative of the particle speed of the particle 82 at the particle engagement section 143 of the particle belt 134. For example, the controller 170 may receive the input signal from a particle sensor 172 of the particle delivery system 40 disposed within the particle tube 124 adjacent to the particle belt 134. The particle sensor 172 may include an infrared sensor or another suitable type of sensor configured to output the input signal indicative of the particle speed of each particle 82 at the particle belt 134. The particle sensor 172 may remain a fixed distance from the particle engagement section 143 of the particle belt 134, such that the controller 170 may determine the particle speed of the particle 82 at the particle engagement section 143 based on the fixed distance and the input signal indicative of the particle speed received from the particle sensor 172 (e.g., based on gravitational acceleration of the particle 82 traveling the fixed distance from the particle sensor 172 to the particle engagement section 143 of the particle belt 134). The controller 170 may also receive an input signal indicative of the belt speed of the particle belt 134 and/or may determine the belt speed of the particle belt 134. For example, the controller 170 may control the belt speed of the particle belt 134 (e.g., output an output signal indicative of instructions to adjust the belt speed of the particle belt 134 to a target belt speed) based on the type of the particles 82, the size of the particles 82, the ground speed of the row unit, the spacing between the flights 142 of the particle belt 134, a length of the particle belt 134, or a combination thereof. In certain embodiments, the particle delivery system may include a belt sensor configured to output a signal indicative of the belt speed of the particle belt. In certain embodiments, the controller 170 may determine other information related to the particles 82 based on feedback from the sensor 172, such as skips of the particles 82 (e.g., the particle 82 not being present during an expected time period), multiple particles 82 (e.g., multiple particles 82 being present when only a single particle 82 is expected), an amount of particles 82 deposited over a given area (e.g., an amount of particles 82 deposited per acre), and other information related to the particles 82. In some embodiments, the controller 170 may control the particle delivery system based on such determinations.

The controller 170 may compare the particle speed of the particle 82 at the particle belt 134 to the belt speed of the particle belt 134 to determine whether the particle speed is within the target percentage of the belt speed. In response to a determination that the particle speed at the particle belt 134 is less than the belt speed and is not within the target percentage of the belt speed, the controller 170 may output an output signal indicative of instructions to increase the distance 150 between the particle metering and singulation unit 44 and the particle belt 134. For example, the controller 170 may output the output signal to the actuator 164 to cause the actuator 164 to move the particle belt 134 downwardly to increase the distance 150. The increase in the distance 150 may increase the particle speed of the particle 82 at the particle belt 134, such that the particle speed may be within the target percentage of the belt speed of the particle belt 134.

In response to a determination that the particle speed at the particle belt 134 is greater than the belt speed and is not within the target percentage of the belt speed, the controller 170 may output an output signal indicative of instructions to decrease the distance 150 between the particle metering and singulation unit 44 and the particle belt 134. For example, the controller 170 may output the output signal to the actuator 164 to cause the actuator to move the particle belt 134 upwardly to decrease the distance 150. The decrease in the distance 150 may decrease the particle speed of the particle 82 at the particle belt 134, such that the particle speed may be within the target percentage of the belt speed of the particle belt 134.

As illustrated, the controller 170 of the particle delivery system 40 includes a processor 180 and a memory 182. The processor 180 (e.g., a microprocessor) may be used to execute software, such as software stored in the memory 182 for controlling the particle delivery system 40 (e.g., for controlling position(s) of the particle metering and singulation unit and/or the particle belt). Moreover, the processor 180 may include multiple microprocessors, one or more "general-purpose" microprocessors, one or more special-purpose microprocessors, and/or one or more application specific integrated circuits (ASICS), or some combination thereof. For example, the processor 180 may include one or more reduced instruction set (RISC) or complex instruction set (CISC) processors.

The memory device 182 may include a volatile memory, such as random access memory (RAM), and/or a nonvolatile memory, such as read-only memory (ROM). The memory device 182 may store a variety of information and may be used for various purposes. For example, the memory device 182 may store processor-executable instructions (e.g., firmware or software) for the processor 180 to execute, such as instructions for controlling the particle delivery system 40. In certain embodiments, the controller 170 may also include one or more storage devices and/or other suitable components. The storage device(s) (e.g., nonvolatile storage) may include ROM, flash memory, a hard drive, or any other suitable optical, magnetic, or solid-state storage medium, or a combination thereof. The storage device(s) may store data (e.g., the target percentage of the belt speed), instructions (e.g., software or firmware for controlling the particle delivery system 40), and any other suitable data. The processor 180 and/or the memory device 182, and/or an additional processor and/or memory device, may be located in any suitable portion of the system. For example, a memory device for storing instructions (e.g., software or firmware for controlling portions of the particle delivery system 40) may be located in or associated with the particle delivery system 40.

Additionally, the particle delivery system 40 includes a user interface 184 that is communicatively coupled to the controller 170. The user interface 184 may be configured to inform an operator of the particle speed of the particles 82, to inform the operator of information related to the particles 82 and determined by the controller 170 (e.g., the skips of the particles 82, multiple particles 82, etc.), to enable the operator to adjust the belt speed of the particle belt 134, to provide the operator with selectable options of the type of particles 82, to enable the operator to set minimum and maximum values of the distance 150, and to enable other operator interactions. For example, the user interface 184 may include a display and/or other user interaction devices (e.g., buttons) configured to enable operator interactions.

In certain embodiments, the distance 150 between the release point 101 and the particle engagement section 143 may be fixed. In some embodiments, the particle tube 124, the actuator 164, the controller 170, the sensor 172, the user interface 184, other portion(s) of the particle delivery system 40, or a combination thereof may be omitted from the particle delivery system 40.

Figure 5:
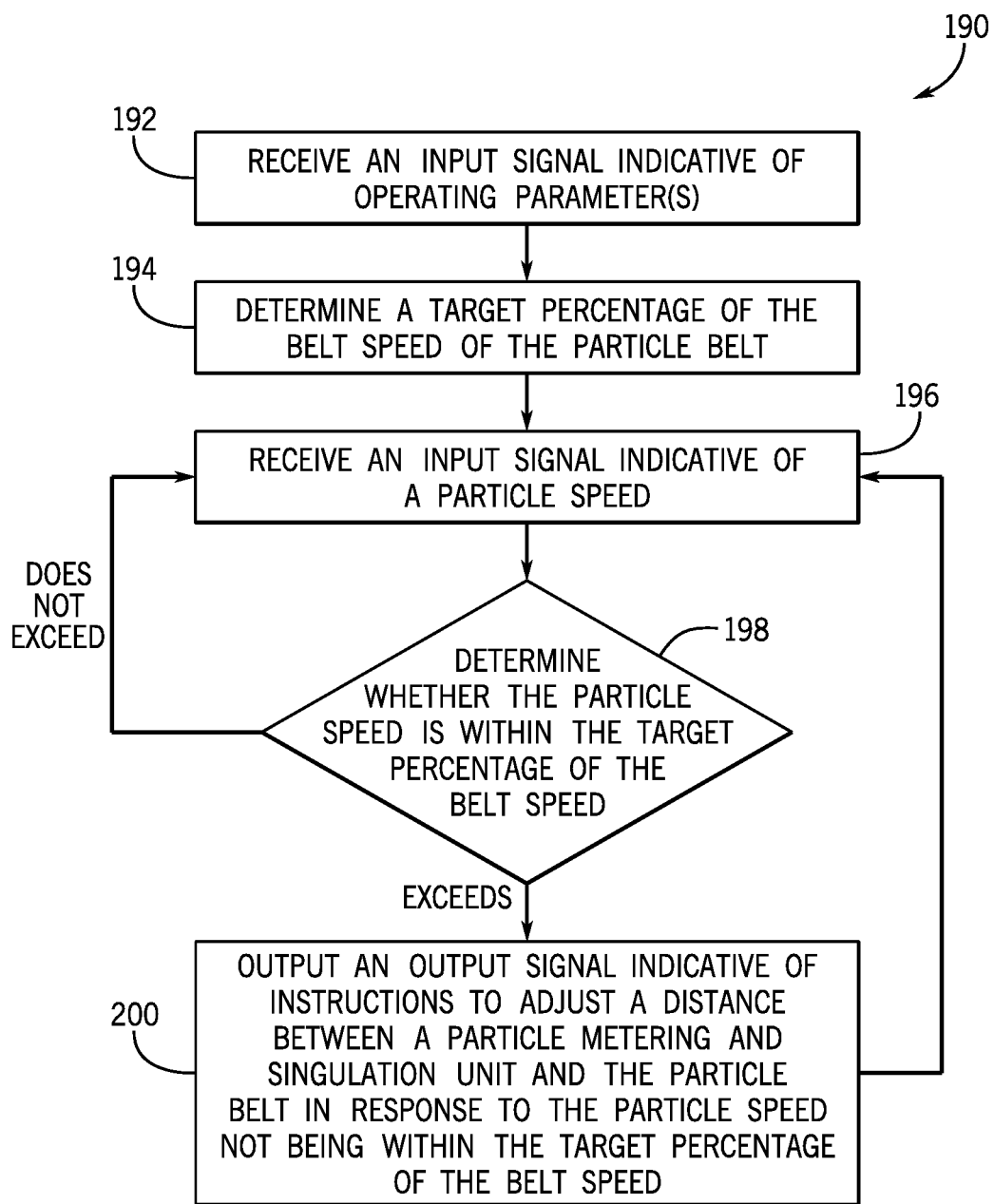
FIG. 5 is a flow diagram of an embodiment of a process for controlling a particle delivery system, in accordance with an aspect of the present disclosure.

FIG. 5 is a flow diagram of an embodiment of a process 190 for controlling the particle delivery system. For example, the process 190, or portions thereof, may be performed by the controller of the particle delivery system. The process 190 begins at block 192, in which an input signal indicative of operating parameter(s) is received. For example, the operating parameters may include the type of the particles, the size of the particles, the ground speed of the row unit, the spacing between opposing flights of the particle belt, the length of the particle belt, the belt speed of the particle belt, or a combination thereof. The input signal may be received via the user interface communicatively coupled to the controller, may be stored in the memory of the controller, may be received via sensor(s) of the row unit and/or the agricultural implement, may be received from a transceiver, or a combination thereof.

At block 194, the target percentage of the belt speed of the particle belt is determined. For example, the controller may determine the target percentage of the belt speed based on the type of the particles, the size of the particles, the ground speed of the row unit, the spacing between opposing flights of the particle belt, the length of the particle belt, or a combination thereof.

At block 196, an input signal indicative of the particle speed of each particle at the particle engagement section of the particle belt is received. For example, the controller may receive the input signal indicative of the particle speed from the particle sensor disposed generally between the particle metering and singulation unit and the particle belt and generally along the flow path. In certain embodiments, the controller may receive multiple input signals from the particle sensor, in which each input signal is indicative of a particle speed of a respective particle. The controller may determine an average of the multiple particle speeds to determine the average particle speed of the particles at the particle belt. As such, the controller may account for variance among the particle speeds of multiple particles passing along the flow path to reduce excessive control actions (e.g., adjustments to the distance between the particle metering and singulation unit and the particle belt).

At block 198, a determination of whether the particle speed is within the target percentage of the belt speed is made (e.g., by the controller). For example, the controller may compare the particle speed of the particle at the particle belt to the belt speed to determine whether the particle speed is within the target percentage of the belt speed. Additionally or alternatively, the controller may determine whether the particle speed is less than or greater than the belt speed. In response to the particle speed not being within the target percentage of the belt speed, the process 190 proceeds to block 200. In response to the particle speed being within the target percentage of the belt speed, the process 190 returns to block 196 and receives the next input signal indicative of the particle speed.

At block 200, in response to the particle speed not being within the target percentage of the belt speed, an output signal indicative of instructions to adjust the distance between the particle metering and singulation unit and the particle belt is output to the actuator to move the particle belt and/or the particle metering and singulation unit to adjust the distance between the particle belt and the particle metering and singulation unit. As such, the distance between the particle belt and the particle metering and singulation unit is a selected distance (e.g., a distance selected and/or adjusted by the controller). For example, the controller may output an output signal indicative of instructions to increase the distance based on a determination that the particle speed at the particle belt is less than the belt speed and is not within the target percentage of the belt speed. Additionally or alternatively, the controller may output an output signal indicative of instructions to decrease the distance based on a determination that the particle speed at the particle belt is greater than the belt speed and is not within the target percentage of the belt speed.

After completing block 200, the process 190 returns to block 196 and receives the next input signal indicative of the particle speed of the particle at the particle engagement section of the particle belt. The next determination is made of whether the particle speed is within the target percentage of the belt speed (e.g., block 198), and the distance between the particle metering and singulation unit and the particle belt is adjusted in response to the particle speed not being within the target percentage of the belt speed. As such, blocks 196-200 of the process 190 may be iteratively performed (e.g., by the controller of the particle delivery system and/or by another suitable controller) to facilitate transfer of the particles from the particle metering and singulation unit to the particle belt. In some embodiments, certain blocks of the blocks 192-200 may be omitted from the process 190 and/or the order of the blocks 192-200 may be different.

Figure 6:
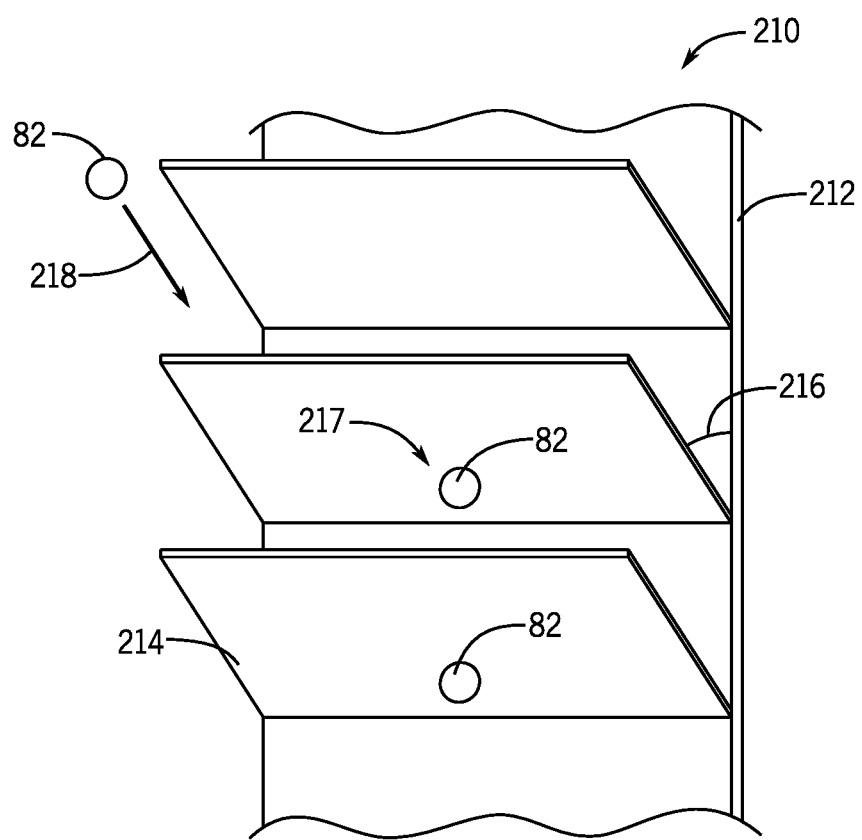
FIG. 6 is a perspective view of a portion of an embodiment of a particle belt of a particle delivery system that may be employed within the row unit of FIG. 2, in accordance with an aspect of the present disclosure.

FIG. 6 is a perspective view of a portion of an embodiment of a particle belt 210 of a particle delivery system that may be employed within the row unit of FIG. 2. As illustrated, the particle belt 210 includes a base 212 and flights 214 coupled to the base 212. Each flight 214 is disposed at an angle 216 relative to the base 212, thereby forming the illustrated angled flights 214. The angle 216 may be between fifteen degrees and eighty-five degrees, between thirty degrees and seventy-five degrees, between forty degrees and sixty degrees, between forty-five degrees and eighty degrees, between sixty and eighty degrees, about fifty degrees, or other suitable angles. The angle 216 may be the same for each flight 214 or may different for some flights 214. The angle 216 of the flights 214 relative to the base 212 may facilitate transfer of the particles 82 from the particle metering and singulation unit to a particle engagement section 217 of the particle belt 210 (e.g., between opposing flights 214 of the particle belt 210). For example, the flights 214 disposed at the angle 216 may be generally parallel to and/or oriented along a flow path 218 of the particles 82 from the particle metering and singulation unit to the particle belt 210. As such, the flights 214 disposed at the angle 216 may facilitate particle transfer at the particle transfer section of the particle delivery system (e.g., facilitate transfer to the particle engagement section 217 of the particle belt 210).

Figure 7:
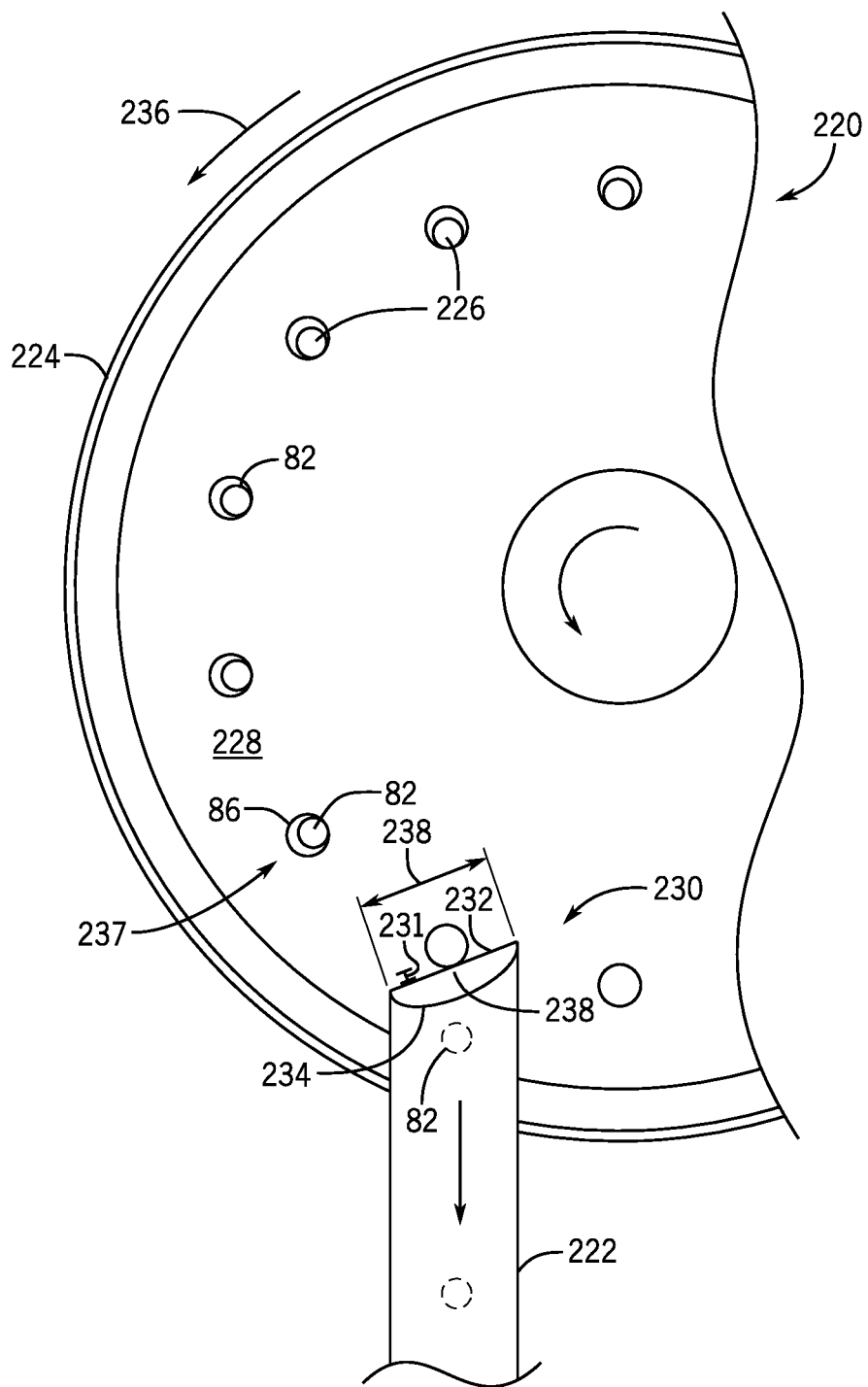
FIG. 7 is a perspective view of an embodiment of a particle metering and singulation unit and a particle tube of a particle delivery system that may be employed within the row unit of FIG. 2, in accordance with an aspect of the present disclosure.

FIG. 7 is a perspective view of an embodiment of a particle metering and singulation unit 220 and a particle tube 222 of a particle delivery system that may be employed within the row unit of FIG. 2. The particle metering and singulation unit 220 includes a disc 224 having apertures 226 formed along a side 228 (e.g., a lateral side location) of the disc 224 and configured to carry and transport the particles 82 toward the particle tube 222. The particle tube 222 includes an end 230 disposed adjacent to the side 228 of the disc 224. The end 230 of the particle tube 222 is disposed a distance 231 apart from the side 228 of the disc 224. The distance 231 may be about one tenth of a millimeter (mm), one mm, about two mm, about five mm, or another suitable distance. As illustrated, the side 228 of the disc 224 is generally flat. Additionally, the cross-sectional shape of the particle tube 222 (e.g., the cross-sectional shape within a plane perpendicular to the longitudinal axis of the particle tube 222), at least at the end 230, has a flat portion 232 and a curved portion 234, thereby forming a "D-shaped" end 230. The flat portion 232 extends generally parallel to the side 228 of the disc 224 and is configured to be aligned with the side 228, as illustrated. As the disc 224 rotates in a rotational direction 236, the flat portion 232 of the particle tube 222 is disposed the distance 231 apart from the side 228 of the disc 224 generally at the apertures 86. The distance 231 (e.g., the relatively small/narrow distance) between the particle tube 222 and the disc 224 may remove the particles 82 from the apertures 86. For example, the flat portion 232 may contact the particles 82 and/or the side 228 to dislodge and removes the particles 82 from the apertures 226 of the disc 224 (e.g., from a release point 237 of the particle metering and singulation unit 220). In certain embodiments, the flat portion of the particle tube may be disposed on an opposite side of the disc relative to the curved portion of the particle tube, such that the disc extends into/through a slot of the particle tube (e.g., a slot formed between the flat portion and the curved portion of the particle tube). Additionally or alternatively, the flat portion of the particle tube may be omitted. The movement of the disc 224 in the rotational direction 236 may propel the particles 82 into the particle tube 222. Additionally or alternatively, a device may be attached to the end of the particle tube adjacent to the disc that is configured to remove (e.g. knock, scrape, etc.) the particles from the disc, such as a paddle, a hook, or a brush. The curved portion 234 of the particle tube 222 may direct the particles 82 downwardly toward the particle belt of the particle delivery system.

As illustrated, the flat portion 232 of the particle tube 222 extends a width 238 adjacent to the disc 224. The width 238 may be about one half cm, one cm, two cm, four cm, or other suitable widths. In certain embodiments, the width 238 of the particle tube 222 along the flat portion 232 may be less than the illustrated embodiment. For example, the width may be slightly greater than the maximum expected extent (e.g., maximum expected diameter) of the particles flowing from the disc. As a result, movement of the particles from the particle metering and singulation unit toward the particle belt may be facilitated by reducing tumbling of the particles within the particle tube.

In some embodiments, a cross-sectional shape of the particle tube (e.g., the cross-sectional shape within a plane perpendicular to the longitudinal axis of the particle tube) may be different at certain longitudinal portions of the particle tube. For example, at the first end of the particle tube adjacent to the particle metering and singulation unit, the particle tube may have the D-shaped cross-section. As the particle tube extends downwardly toward the particle belt, the cross-sectional shape may change to be square or circular, for example. Additionally or alternatively, a size of the cross-section of the particle tube (e.g., the cross-sectional area of the particle tube within a plane perpendicular to the longitudinal axis of the particle tube) may be different at certain longitudinal portions of the particle tube. For example, at the first end of the particle tube adjacent to the particle metering and singulation unit, the particle tube may have a first cross-sectional area. As the particle tube extends downwardly toward the particle belt, the cross-sectional area may decrease such that the cross-sectional area at a second end of the particle tube adjacent to the particle belt is less than the cross-sectional area at the first end. The narrowing of the cross-section of the particle tube may direct the particles flowing from the particle metering and singulation unit toward a particular portion of the particle belt. The cross-sectional area at the second end of the particle tube may be about ninety percent, eight percent, seventy percent, sixty percent, fifty percent, twenty-five percent, ten percent, or other suitable percentages of the cross-sectional area at the first end of the particle tube.

Figure 8:
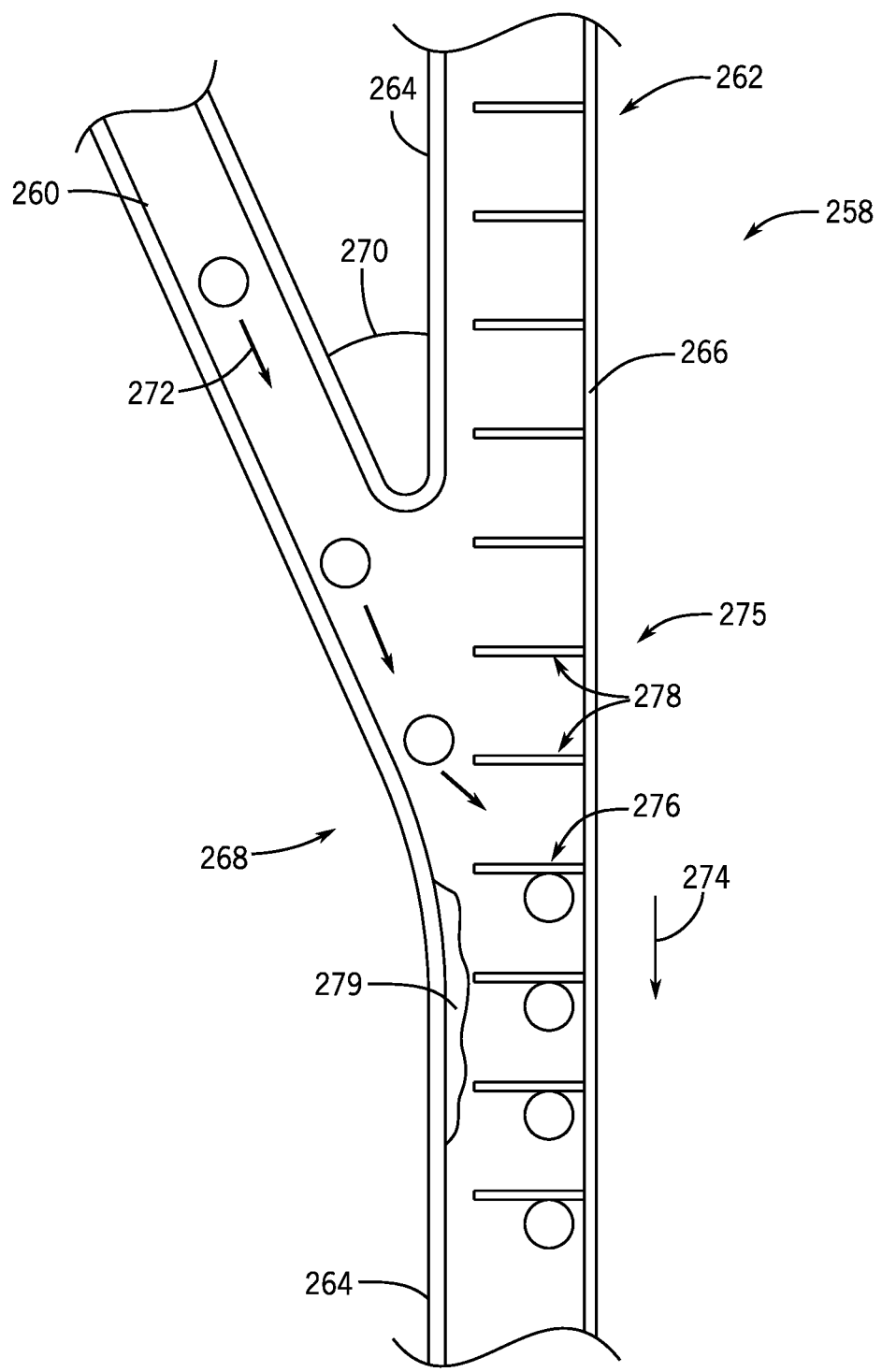
FIG. 8 is a cross-sectional view of a portion of an embodiment of a particle delivery system, which may be employed within the row unit of FIG. 2, having a particle tube and a particle belt, in accordance with an aspect of the present disclosure.

FIG. 8 is a cross-sectional view of a portion of an embodiment of a particle delivery system 258, which may be employed within the row unit of FIG. 2, having a particle tube 260 and a particle belt assembly 262. As illustrated, the particle belt assembly 262 includes a particle belt housing 264 and a particle belt 266 disposed within the particle belt housing 264. The particle tube 260 is coupled to the particle belt housing 264 at a second end 268 of the particle tube 260. The particle tube 260 is disposed at an angle 270 relative to the particle belt housing 264. A flow path 272 of the particles 82 traveling through the particle tube 260 extends at the angle 270 relative to a travel path 274 of the particle belt 266, such that the particles 82 may flow toward the particle belt 266 at the angle 270. The angle 270 may be an acute angle configured to facilitate transfer of the particles 82 from the particle tube 260 to the particle belt 266. For example, the angle 270 may be between five degrees and eighty-five degrees, between fifteen degrees and seventy degrees, between twenty-five degrees and sixty degrees, about thirty degrees, about forty degrees, or other suitable angles. The particle delivery system 258 is configured to flow the particles 82 to a side portion 275 of the particle belt 266 (e.g., to a particle engagement section 276 of the particle belt 266 where the particle belt 266 is traveling along a generally straight path), rather than an end portion of the particle belt 266 where the particle belt 266 is traveling along a curved path around a wheel/pulley. Delivering the particles 82 to the side portion 275 of the particle belt 266 may facilitate receipt of the particles 82 by flights 278 of the particle belt 266, because the flow path 272 of the particles 82 may be in a generally similar direction as the travel path 274 of the flights 278 (e.g., the flow path 272 of the particles 82 directionally differs from the travel path 274 of the particle belt 266 only by the angle 270).

The particle delivery system 258 includes a particle indexing unit 279 coupled to the particle belt housing 264 adjacent or proximate to the second end 268 of the particle tube 260. The particle indexing unit 279 is configured to facilitate particle transfer/indexing from the particle tube 260 to the particle belt 266. For example, the particle indexing unit 279 may guide each particle 82 between respective opposing flights 278 of the particle belt 266 as the particle 82 flows through the second end 268 of the particle tube 260 into the particle belt housing 264. In certain embodiments, the particle indexing unit may extend into and/or may be coupled to the particle tube. As illustrated, the particle indexing unit 279 is a rumble strip (e.g., a strip formed of rubber, plastic, and/or other materials having ridges) configured to cause the particles 82 to roll and/or to alter the direction of the particles 82 to cause the particles 82 to move between opposing flights 278 of the particle belt 266. In some embodiments, the particle indexing unit may include other features configured to alter the direction of the particles to cause the particles to move between the opposing flights. In some embodiments, the particle indexing unit may be omitted.

Figure 9:
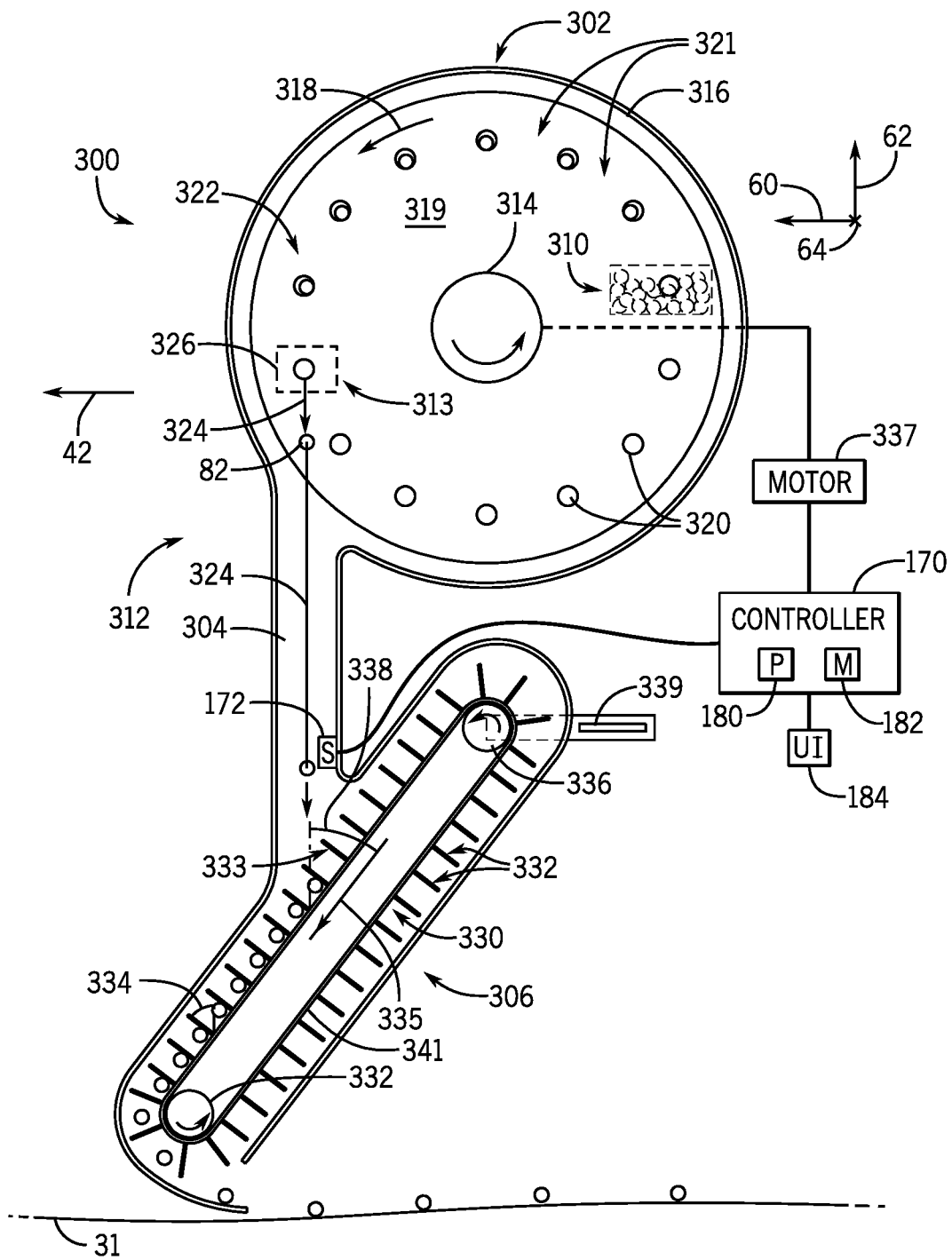
FIG. 9 is a cross-sectional view of an embodiment of a particle delivery system that may be employed within the row unit of FIG. 2, in accordance with an aspect of the present disclosure.

FIG. 9 is a cross-sectional view of an embodiment of a particle delivery system 300 that may be employed within the row unit of FIG. 2. As illustrated, the particle delivery system 300 includes a particle metering and singulation unit 302, a particle tube 304, and a particle belt assembly 306 coupled to the particle metering and singulation unit 302 via the particle tube 304. The particle metering and singulation unit 302 is configured to meter and transfer the particles 82 from a particle storage area 310 and toward a particle transfer section 312. At the particle transfer section 312, the particle delivery system 300 is configured to transfer the particles 82 from the particle metering and singulation unit 302 (e.g., from a release point 313 of the particle metering and singulation unit 302 and of the particle transfer section 312) to the particle belt assembly 306.

The particle metering and singulation unit 302 includes a gear 314 and a disc 316 coupled to the gear 314. The gear 314 is configured to drive the disc 316 to rotate in a rotational direction 318. The disc 316 includes a side surface 319 having apertures 320 formed along a periphery 321 of the disc 316 and configured to carry and transport the particles 82. As the disc 316 rotates in the rotational direction 318, the apertures 320 are configured to collect respective particles 82 from the particle storage area 310 and to move the particles 82 from the particle storage area 310 toward a side location 322 (e.g., a lateral side location) of the side surface 319 of the disc 316. At the side location 322 and at the release point 313, the particle delivery system 300 is configured to release the particles 82 along a release trajectory 324. For example, a particle removal system 326 of the particle delivery system 300 may release the particles 82 from the apertures 320 by removing a vacuum pressure configured to secure the particles 82 within the apertures 320. In certain embodiments, the particle removal system may include other systems/means configured to remove and/or release the particles from the apertures. After releasing the particles 82 from the apertures 320, the particles 82 are configured to flow along the release trajectory 324 from the disc 316 toward a particle belt 330 of the particle belt assembly 306. Flights 332 of the particle belt 330 are configured to receive the particles 82 from the particle metering and singulation unit 302 at a particle engagement section 333 of the particle belt 330 and of the particle transfer section 312. As illustrated, the flights 332 are disposed at an angle 334 relative to the release trajectory 324 and are coupled to a base 341 of the particle belt 330. The angle 334 may be an acute angle generally between five and forty-five degrees, about fifteen degrees, about twenty-five degrees, about thirty-five degrees, or other suitable angles. In certain embodiments, the flights of the particle belt may extend generally along the release trajectory such that the particles may flow to the particle belt between opposing flights and along the flights. The particle belt 330 is configured to rotate along a travel path 335, via wheels 336 of the particle belt assembly 306, to deliver the particles 82 to the trench 31. As illustrated, the travel path 335 is a linear direction of movement of the base 341 at the particle engagement section 333 of the particle belt 330.

In certain embodiments, the particle belt 330 may rotate generally faster than the rotational speed of the disc 316, such that the particle belt 330 may accelerate the particles 82 received from the disc 316 toward the trench 31. To facilitate transfer of the particles 82 from the particle metering and singulation unit 302 to the particle belt 330 (e.g., from the release point 313 to the particle engagement section 333), the particle metering and singulation unit 302 is configured to release the particles 82 at the side location 322 such that a tangential speed of the disc 316 at the side location 322 is imparted to each particle 82, thereby causing the particle 82 to move downwardly in a direction toward the particle belt 330. Additionally, the release trajectory 324 may extend generally along the vertical axis 62 and/or within a selected angle of the vertical axis 62, which may cause the particles 82 to accelerate under the influence of gravity toward the particle belt 330. Accordingly, as the particle 82 reaches the particle belt 330, the speed of the particle 82 may be substantially equal to the sum of the tangential speed of the disc 316 at the side location 322 and the speed caused by gravitational acceleration between the release point 313 and the particle engagement section 333. As the particle 82 accelerates downwardly toward the particle belt 330, the particle speed of the particle 82 increases and a difference between the particle speed and the belt speed of the particle belt 330 decreases. The decrease in the speed difference may facilitate receipt of the particles 82 at the particle engagement section 333 of the particle belt 330, because the flights 332 and the particles 82 may be moving at generally similar speeds. The release trajectory 324 may be within forty-five degrees of the vertical axis 62, within thirty-five degrees of the vertical axis 62, within twenty-five degrees of the vertical axis 62, within fifteen degrees of the vertical axis 62, within five degrees of the vertical axis 62, within one degree of the vertical axis 62, or within another suitable angle of the vertical axis 62.

To facilitate transfer of the particles 82 from the particle metering and singulation unit 302 to the particle belt 330 along the release trajectory 324, the controller 170 of the particle delivery system 300 is configured control the speed of the particles 82 by adjusting the rotational speed of the disc 316 of the particle metering and singulation unit 302. For example, the controller 170 may control a motor 337 coupled to and configured to drive rotation of the gear 314 to control the rotational speed of the disc 316, thereby controlling the exit speed of each particle 82 from the disc 316 along the release trajectory 324. The controller 170 may control the rotational speed of the disc 316 such that a particle speed of each particle 82 at the particle belt 330 (e.g., the speed substantially corresponding to the sum of the tangential speed of the disc 316 at the side location 322 and the speed of the particle 82 caused by gravitational acceleration) reaches a target particle speed and/or is within a target percentage of a belt speed of the particle belt 330. The target particle speed and/or target percentage may be determined by the controller 170 based on a type of the particles 82, a size (e.g., a nominal and/or an average size) of the particles 82, a ground speed of the row unit, a spacing between flights of the particle belt 330, a length of the particle belt 330, the belt speed of the particle belt 330, or a combination thereof. The target particle speed may be any suitable particle speed, such as one kph, two kph, three kph, four kph, five kph, seven kph, ten kph, fifteen kph, twenty kph, between one kph and twenty kph, between five kph and fifteen kph, etc.

To control the rotational speed of the disc 316 and, thus, the particle speed of the particles 82, the controller 170 may receive an input signal indicative of the particle speed of the particle 82 at the particle engagement section 333 of the particle belt 330. For example, the controller 170 may receive the input signal from a particle sensor 172 of the particle delivery system 300 disposed within the particle tube 304 adjacent to the particle belt 330. The controller 170 may also receive an input signal indicative of the belt speed of the particle belt 330, and/or the controller 170 may determine the belt speed of the particle belt 330. In certain embodiments, the particle delivery system may include a belt sensor configured to output the input signal indicative of the belt speed of the particle belt. The controller 170 may set the belt speed of the particle belt 330 (e.g., output an output signal indicative of instructions to adjust the belt speed of the particle belt 330 to a target belt speed) based on the type of particles 82, the ground speed of the row unit, the spacing between the flights of the particle belt 330, a length of the particle belt 330, or a combination thereof. The controller 170 may determine the target particle speed at least partially based on the set belt speed of the particle belt 330 and/or based on feedback from the belt sensor.

The controller 170 may compare the particle speed of the particles 82 at the particle belt 330 to the belt speed of the particle belt 330 to determine whether the particle speed is within the target percentage of the belt speed of the particle belt 330. Based on a determination that the particle speed is not within the target percentage of the belt speed of the particle belt 330, the controller 170 may output an output signal indicative of instructions to adjust the rotational speed of the disc 316 (e.g., may output the output signal to the motor 337 coupled to the gear 314 coupled to the disc 316). For example, based on a determination that the particle speed is less than the belt speed and not within the target percentage of the belt speed, the controller 170 may output the output signal to the motor 337 to cause the gear 314 to rotate the disc 316 faster (e.g., to increase the rotational speed of the disc 316). The increase in the rotational speed of the disc 316 may increase the particle speed of the particles 82 at the particle belt 330, such that the particle speed may increase to within the target percentage of the belt speed of the particle belt 330.

Based on a determination that the particle speed is greater than the belt speed and the particle speed is not within the target percentage of the belt speed, the controller 170 may output the output signal to the motor 337 to cause the gear 314 to rotate the disc 316 slower (e.g., to decrease the rotational speed of the disc 316). The decrease in the rotational speed of the disc 316 may decrease the particle speed of the particles 82 at the particle belt 330, such that the particle speed may decrease to within the target percentage of the belt speed of the particle belt 330.

Additionally or alternatively, in certain embodiments, the controller 170 may determine whether a difference between the particle speed of the particles 82 at the particle engagement section 333 of the particle belt 330 and the target particle speed exceeds a threshold value. Based on a determination that the difference between the particle speed and the target particle speed exceeds the threshold value, the controller 170 may adjust the rotational speed of the disc 316 such that the difference between the particle speed and the target particle speed does not exceed the threshold value. For example, based on the particle speed being less than the target particle speed and the difference being greater than the threshold value, the controller 170 may increase the rotational speed of the disc 316 (e.g., by outputting the output signal to the motor 337 indicative of instructions to increase the rotational speed of the disc 316). Based on the particle speed being greater than the target particle speed and the difference being greater than the threshold value, the controller 170 may decrease the rotational speed of the disc 316 (e.g., by outputting the output signal to the motor 337 indicative of instructions to decrease the rotational speed of the disc 316). The controller 170 may control the rotational speed of the disc 316 such that the particle speed reaches the target particle speed (e.g., is within a threshold range of the target particle speed, where the threshold range is equal to the target particle speed plus or minus the threshold value).

As illustrated, the travel path 335 of the particle belt assembly 306 is oriented at an angle 338 relative to the release trajectory 324. Additionally, the angle 338 is formed between the travel path 335 and the release trajectory 324 at the particle engagement section 333 of the particle belt 330. The angle 338 of the travel path 335 of the particle belt assembly 306 relative to the release trajectory 324 may facilitate particle transfer from the particle metering and singulation unit 302 to the particle belt 330. For example, a greater angle 338 may enable each particle 82 to flow more easily between a respective pair of opposing flights 332 of the particle belt 330 (e.g., as the particle belt 330 rotates about the lateral axis 64). In certain embodiments, a lesser angle 338 may facilitate the particle belt 330 accelerating the particles 82 toward the trench 31. In some embodiments, the controller 170 may control the angle 338 based on a ground speed of the respective row unit. For example, as the ground speed (e.g., travel speed) increases, the controller 170 of the particle delivery system 300 may instruct an actuator 339 coupled to the wheel 336 to move to increase the angle 338 such that particle belt 330 extends more horizontally. The actuator 339 may move generally horizontally (e.g., generally along the longitudinal axis 60) to cause the particle belt 330 to rotate (e.g., generally about the lateral axis 64) and to adjust the position of the particle belt 330. In certain embodiments, as the ground speed increases, the controller 170 may instruct the actuator 339 coupled to the wheel 336 to move to decrease the angle 338. As the ground speed decreases, the particle delivery system 300 may generally decrease the angle 338 such that particle belt 330 extends more vertically. In some embodiments, as the ground speed decreases, the controller 170 may instruct the actuator 339 coupled to the wheel 336 to move to increase the angle 338. The adjustments to the angle 338 based on the ground speed of the row unit may facilitate deposition of the particles 82 by the particle delivery system 300. In certain embodiments, the angle 338 may a fixed angle. The angle 338 may be an acute angle generally between five and forty-five degrees, about five degrees, about fifteen degrees, about twenty-five degrees, about thirty-five degrees, or other suitable angles.

Figure 10:
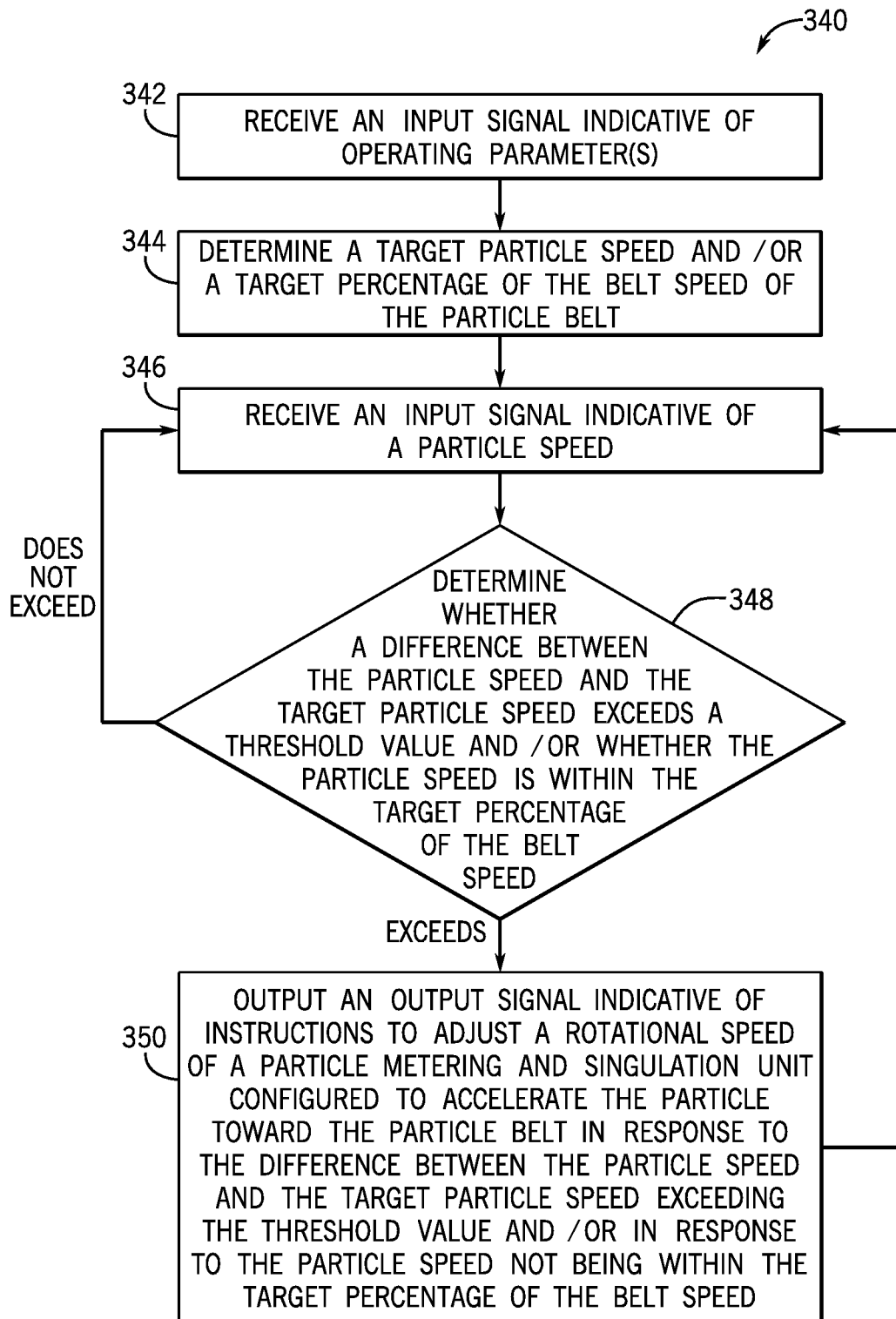
FIG. 10 is a flow diagram of an embodiment of a process for controlling a particle delivery system, in accordance with an aspect of the present disclosure.

FIG. 10 is a flow diagram of an embodiment of a process 340 for controlling the particle delivery system. For example, the process 340, or portions thereof, may be performed by the controller of the particle delivery system. The process 340 begins at block 342, in which an input signal indicative of operating parameter(s) is received. For example, the operating parameters may include the type of the particles, the size of the particles, the ground speed of the row unit, the spacing between opposing flights of the particle belt, the length of the particle belt, the belt speed of the particle belt, or a combination thereof. The input signal may be received via the user interface communicatively coupled to the controller, may be stored in the memory of the controller, may be received via sensors of the row unit and/or the agricultural implement, may be received from a transceiver, or a combination thereof.

At block 344, the target particle speed and/or the target percentage of the belt speed of the particle belt is determined. For example, the controller may determine the target particle speed and/or the target percentage of the belt speed based on the type of the particle, the ground speed of the row unit, the spacing between opposing flights of the particle belt, the length of the particle belt, or a combination thereof.

At block 346, an input signal indicative of the particle speed of each particle at the particle engagement section of the particle belt is received. For example, the controller may receive the input signal indicative of the particle speed from the particle sensor disposed generally between the particle metering and singulation unit and the particle belt and generally along the release trajectory. In certain embodiments, the controller may receive multiple input signals from the particle sensor, in which each input signal is indicative of a particle speed of a respective particle. The controller may determine an average of the multiple particle speeds to determine the average particle speed of the particles at the particle belt. As such, the controller may account for variance among the particle speeds of multiple particles passing along the release trajectory to reduce excessive control actions (e.g., adjustments to the rotational speed of the disc of the particle metering and singulation unit).

At block 348, a determination of whether a difference between the particle speed and the target particle speed exceeds a threshold value and/or whether the particle speed is within the target percentage of the belt speed is made (e.g., by the controller). Additionally, a determination of whether the particle speed is less than or greater than the target particle speed and/or less than or greater than the belt speed is made (e.g., by the controller). The threshold value may be determined based on the type of the particles, the size of the particles, the ground speed of the row unit, the spacing between opposing flights of the particle belt, the length of the particle belt, or a combination thereof. In response to the difference exceeding the threshold value and/or the particle speed not being within the target percentage of the belt speed, the process 340 proceeds to block 350. In response to the difference not exceeding the threshold value and/or the particle speed being within the target percentage of the belt speed, the process 340 returns to block 346 and receives the next input signal indicative of the particle speed.

At block 350, in response to the difference between the particle speed and the target particle speed exceeding the threshold value and/or in response to the particle speed not being within the target percentage of the belt speed, an output signal indicative of instructions to adjust the rotational speed of the disc of the particle metering and singulation unit is output to the motor coupled to the gear of the particle metering and singulation unit, which is coupled to the disc of the particle metering and singulation unit. For example, the controller may output an output signal indicative of instructions to increase the rotational speed of the disc based on a determination that the particle speed is less than the target particle speed and the difference between the particle speed and the target particle speed exceeds the threshold value. Additionally or alternatively, the controller may output the output signal indicative of instructions to increase the rotational speed of the disc based on a determination that the particle speed is less than the belt speed and is not within the target percentage of the belt speed. Further, the controller may output an output signal indicative of instructions to decrease the rotational speed of the disc based on a determination that the particle speed is greater than the target particle speed and the difference between the particle speed and the target particle speed exceeds the threshold value. Additionally or alternatively, the controller may output the output signal indicative of instructions to decrease the rotational speed of the disc based on a determination that the particle speed is greater than the belt speed and is not within the target percentage of the belt speed.

After completing block 350, the process 340 returns to block 346 and receives the next input signal indicative of the particle speed of the particle at the particle engagement section of the particle belt. The next determination is made of whether the difference between the particle speed and the target particle speed exceeds the threshold value and/or whether the particle speed is within the target percentage of the belt speed (e.g., block 348), and the rotational speed of the disc of the particle metering and singulation unit is adjusted in response to the determination(s). As such, blocks 346-350 of the process 340 may be iteratively performed (e.g., by the controller of the particle delivery system and/or by another suitable controller) to facilitate transfer of the particles from the particle metering and singulation unit to the particle belt. In some embodiments, certain blocks of the blocks 342-350 may be omitted from the process 340 and/or the order of the blocks 342-350 may be different.

Figure 11:
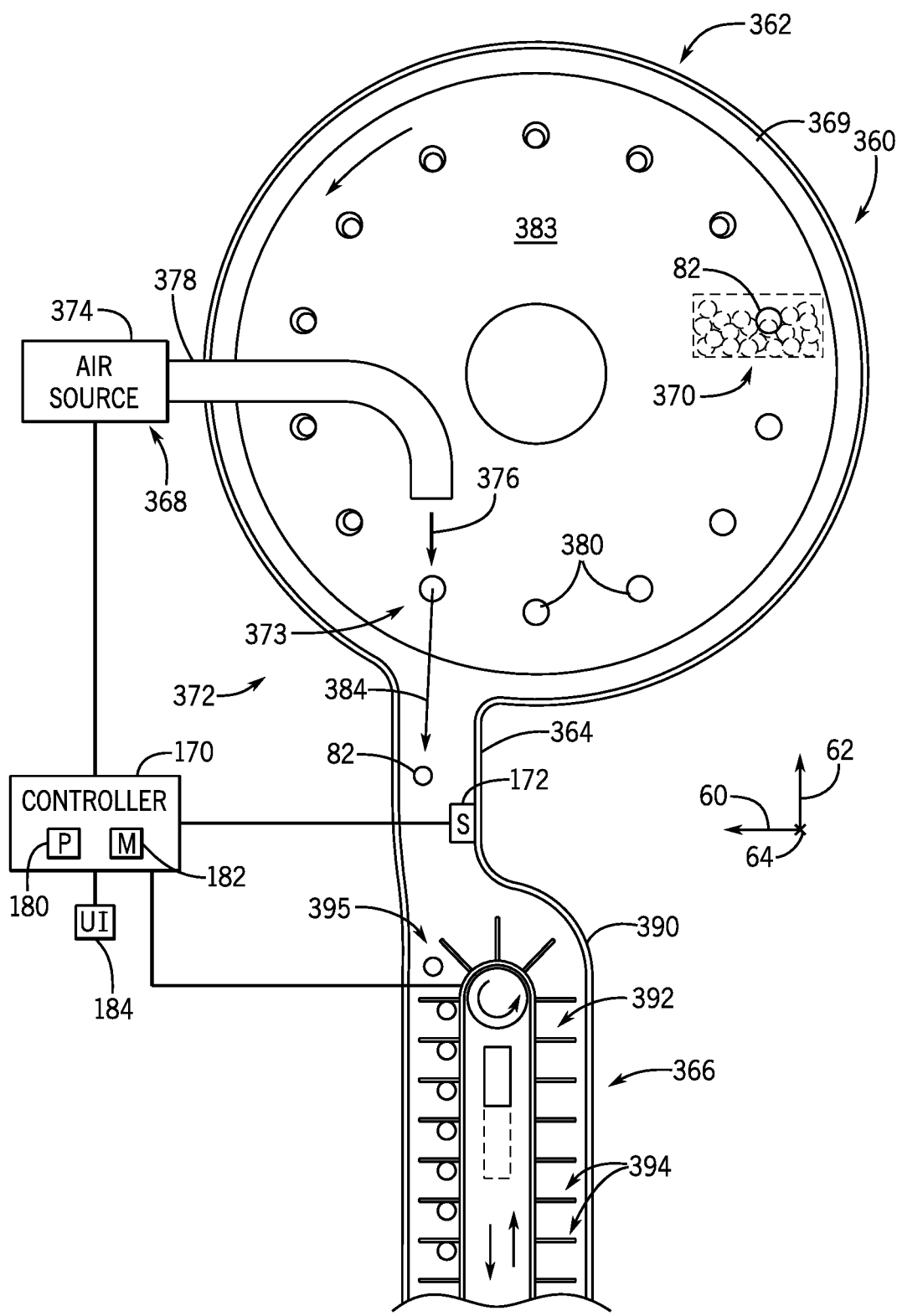
FIG. 11 is a cross-sectional view of an embodiment of a particle delivery system that may be employed within the row unit of FIG. 2, in accordance with an aspect of the present disclosure.

FIG. 11 is a cross-sectional view of an embodiment of a particle delivery system 360 that may be employed within the row unit of FIG. 2. As illustrated, the particle delivery system 360 includes a particle metering and singulation unit 362, a particle tube 364, and a particle belt assembly 366 coupled to the particle metering and singulation unit 362 via the particle tube 364. Additionally, the particle delivery system 360 includes a particle acceleration system 368 configured to accelerate and/or to remove the particles 82 from a disc 369 of the particle metering and singulation unit 362. For example, the particle metering and singulation unit 362 is configured to meter and transfer the particles 82 from a particle storage area 370 and toward a particle transfer section 372 of the particle delivery system 360. At the particle transfer section 372, the particle acceleration system 368 may accelerate each particle 82 from the particle metering and singulation unit 362 at a release point 373 of the particle metering and singulation unit 362 and/or to propel the particle 82 toward the particle belt assembly 366. In some embodiments, the particle acceleration system 368 may also remove each particle 82 from the particle metering and singulation unit 362 at the release point 373 of the particle metering and singulation unit 362. In certain embodiments, the particle tube 364 may be omitted from the particle delivery system 360.

As illustrated, the particle acceleration system 368 (e.g., air flow system) includes an air source 374 configured to provide an air flow 376 (e.g., compressed air) from an air flow tube 378 coupled to the air source 374. The air source 374 may be an air compressor or blower configured to generate and provide the air flow 376 from the air flow tube 378. The air flow tube 378 extends from the air source 374 toward the particle transfer section 372 (e.g., toward the release point 373). The air flow 376 from the air flow tube 378 is configured to flow across each aperture 380 of the disc 369 of the particle metering and singulation unit 362 while the aperture 380 is aligned with the outlet of the air flow tube 378 (e.g., while the aperture 380 is aligned with the release point 373 of the particle metering and singulation unit 362 adjacent to the outlet of the air flow tube 378). In certain embodiments, the air flow 376 may be pulsed and/or the air flow 376 may be cyclically interrupted (e.g., by a valve), such that the air flow 376 is provided as each aperture 380 aligns with the outlet of the air flow tube 378. The pulsed air flow 376 may conserve energy, because the air source 374 would only supply the air flow 376 while the aperture 380 is aligned with the outlet.

As illustrated, the disc 369 includes a surface 383 with the apertures 380 formed along the surface 383. The particle acceleration system 368 is configured to provide the air flow 376 generally along the surface 383 and across the aperture 380 to accelerate the respective particle 82 from the aperture 380. After acceleration and/or removal by the air flow 376, the particle 82 may move along a release trajectory 384. As illustrated, the air flow 376 and the release trajectory 384 extend in generally similar directions and generally along the vertical axis 62. In certain embodiments, the air flow generated by the particle acceleration system and/or the release trajectory of the particles may be oriented at an acute angle relative to the vertical axis (e.g., between five degrees and forty-five degrees, between fifteen degrees and thirty five degrees, about twenty degrees, about twenty-five degrees, or other suitable angles). In some embodiments, the particle metering and singulation unit may include a vacuum source configured to form and maintain the vacuum at each aperture to secure the respective particle to the aperture. The air flow provided by the particle acceleration system across each aperture may be sufficient to overcome the force provided by the vacuum at the aperture, thereby removing and accelerating the particle along the release trajectory. In certain embodiments, the particle acceleration system may be included with the vacuum passage described above, such that the particle acceleration system functions only to accelerate the particles toward a particle engagement section of the particle belt (e.g., the vacuum removal system may remove the vacuum at the end of the vacuum passage, and the particle acceleration system may accelerate the particles toward the particle belt after removal of the vacuum).

The particle belt assembly 366 includes a particle belt housing 390 and a particle belt 392 disposed within the particle belt housing 390. The particle belt 392 includes flights 394 configured to receive the particles 82 from the particle metering and singulation unit 362 at a particle engagement section 395 of the particle belt 392 (e.g., each pair of opposing flights 394 is configured to receive a respective particle 82 at the particle engagement section 395). In certain embodiments, the particle belt 392 may move generally faster than a rotational speed of the disc 369, such that the particle belt 392 may accelerate the particles 82 received from the disc 369 toward the trench. To facilitate transfer of the particles 82 from the particle metering and singulation unit 362 to the particle belt 392, the particle acceleration system 368 of the particle delivery system 360 is configured to apply a force to each particle 82, via the air flow 376 at the release point 373, to accelerate the particle 82 downwardly along the release trajectory 384. As illustrated, the air flow 376 and the release trajectory 384 are directed toward the flights 394 of the particle belt 392 to facilitate transfer of the particles 82 to the flights 394.

To facilitate transfer of the particles 82 from the particle metering and singulation unit 362 to the particle belt 392 along the release trajectory 384, the controller 170 of the particle delivery system 360 is configured control the acceleration and/or the speed of the particles 82 by adjusting the force (e.g., the air flow 376) applied by the particle acceleration system 368 to the particles 82. For example, the controller 170 may control the particle acceleration system 368 to control the force applied by the air flow 376 to each particle 82 at the release point 373, thereby controlling the particle speed of the particle 82 at the particle engagement section 395 of the particle belt 392. The controller 170 may control the particle acceleration system 368 such that a particle speed of each particle 82 reaches a target particle speed and/or is within a target percentage of the belt speed of the particle belt 392 at the particle engagement section 395 of the particle belt 392. The target percentage may be determined by the controller 170 based on a type of the particles 82, a size (e.g., a nominal and/or an average size) of the particles 82, a ground speed of the row unit, a spacing between the flights 394 of the particle belt 392, a length of the particle belt 392, the belt speed of the particle belt 392, or a combination thereof.

To control the force applied by the air flow 376 to the particles 82 and, thus, the particle speed of the particles 82 at the particle engagement section 395 of the particle belt 392, the controller 170 may receive an input signal indicative of the particle speed of the particles 82 at the particle engagement section 395. For example, the controller 170 may receive the input signal from the particle sensor 172 of the particle delivery system 360 disposed within the particle tube 364 adjacent to the particle belt 392. The controller 170 may also receive an input signal indicative of the belt speed of the particle belt 392, and/or the controller 170 may determine the belt speed of the particle belt 392. In certain embodiments, the particle delivery system may include a belt sensor configured to output the input signal indicative of the belt speed of the particle belt. The controller 170 may set the belt speed of the particle belt 392 (e.g., output an output signal indicative of instructions to adjust the belt speed of the particle belt 392 to a target belt speed) based on the type of the particles 82, the size of the particles 82, the ground speed of the row unit, the spacing between the flights 394 of the particle belt 392, a length of the particle belt 392, or a combination thereof. The controller 170 may determine the target particle speed at least partially based on the set belt speed of the particle belt 392 and/or based on feedback from the belt sensor.

The controller 170 may compare the particle speed of the particles 82 at the particle belt 392 to determine whether the particle speed is within a target percentage of a belt speed of the particle belt 392. Based on a determination that the particle speed is not within the target percentage of a belt speed of the particle belt 392, the controller 170 may output an output signal to the particle acceleration system 368 indicative of instructions to adjust the air flow 376, thereby adjusting the force applied to each particle 82. For example, based on a determination that the particle speed is less than the belt speed and is not within the target percentage of the belt speed, the controller 170 may output the output signal to the particle acceleration system 368 (e.g., to the air source 374 of the particle acceleration system 368) indicative of instructions to increase the air flow 376, thereby increasing the force applied to the particles 82. The increase in the force applied by the particle acceleration system 368 may increase the particle speed of each particle 82 at the particle belt 392, such that the particle speed may increase to within the target percentage of the belt speed of the particle belt 392.

Based on a determination that the particle speed is greater than the belt speed and the particle speed is not within the target percentage of the belt speed, the controller 170 may output the output signal to the particle acceleration system 368 indicative of instructions to decrease the force applied to the particles 82 (e.g., output the output signal to the air source 374 indicative of instructions to decrease the air flow 376). The decrease in the force applied by the particle acceleration system 368 may decrease the particle speed of the particles 82 at the particle engagement section 395 of the particle belt 392, such that the particle speed may be within the target percentage of the belt speed of the particle belt 392.

Additionally or alternatively, in certain embodiments, the controller 170 may determine whether a difference between the particle speed of the particles 82 at the particle engagement section 395 of the particle belt 392 and the target particle speed exceeds a threshold value. Based on a determination that the difference between the particle speed and the target particle speed exceeds the threshold value, the controller 170 may adjust the force applied by the particle acceleration system 368 to the particles 82, such that the difference between the particle speed and the target particle speed does not exceed the threshold value. For example, based on the particle speed being less than the target particle speed and the difference exceeding the threshold value, the controller 170 may increase the force applied by the particle acceleration system 368 to the particles 82. Based on the particle speed being greater than the target particle speed and the difference exceeding the threshold value, the controller 170 may decrease the force applied by the particle acceleration system 368 to the particles 82. The controller 170 may control the force applied by the particle acceleration system 368 to the particles 82 such that the particle speed reaches the target particle speed (e.g., is within a threshold range of the target particle speed, where the threshold range is equal to the target particle speed plus or minus the threshold value).

Figure 12:
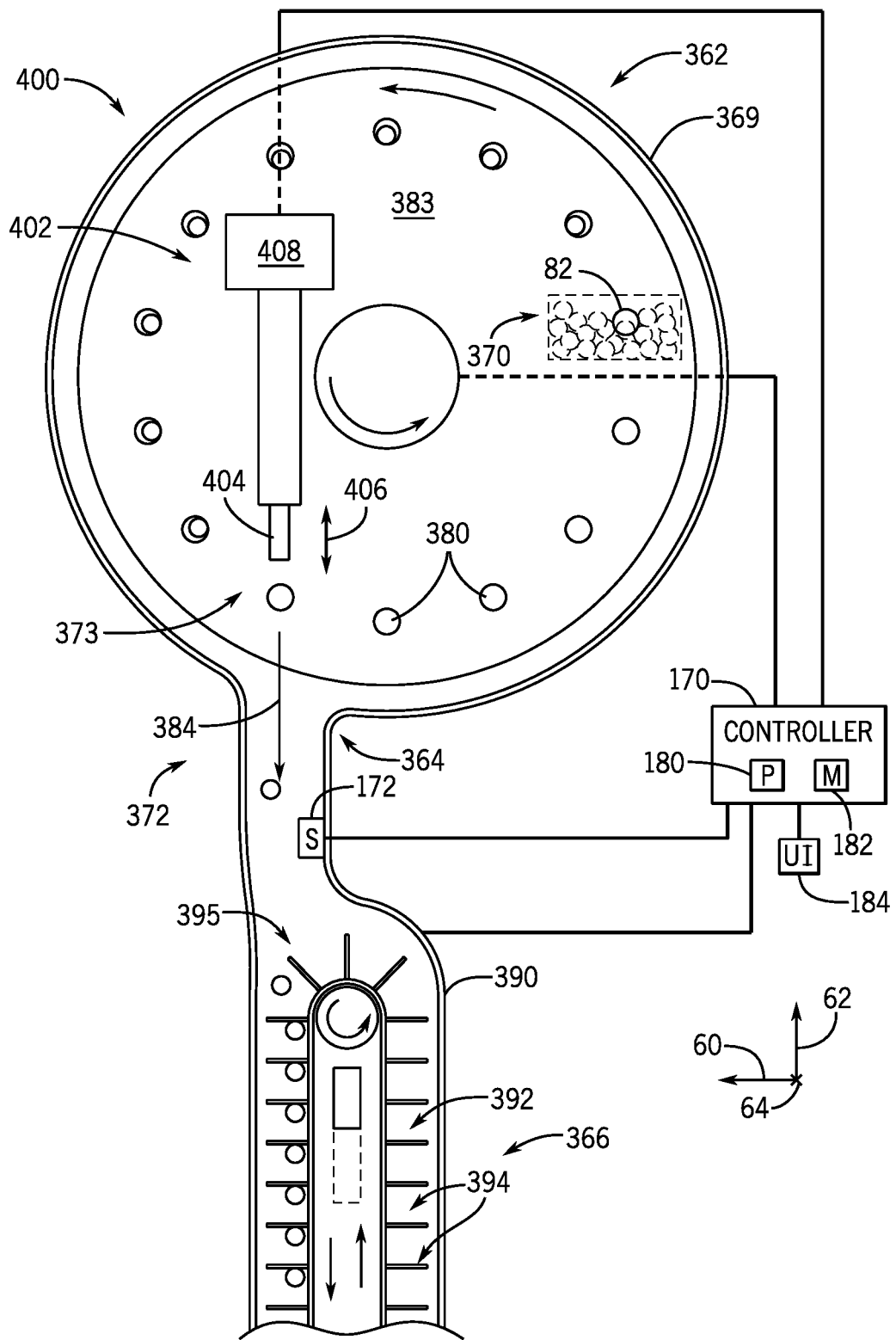
FIG. 12 is a cross-sectional view of an embodiment of a particle delivery system that may be employed within the row unit of FIG. 2, in accordance with an aspect of the present disclosure.

FIG. 12 is a cross-sectional view of an embodiment of a particle delivery system 400 that may be employed within the row unit of FIG. 2. The particle delivery system 400 includes a particle acceleration system 402 configured to accelerate the particles 82 from the disc 369 of the particle metering and singulation unit 362. As illustrated, the particle acceleration system 402 includes a pin 404 configured to move generally toward the particle belt 392, as indicated by arrow 406 (e.g., generally vertically). The particle acceleration system 402 also includes a drive system 408 configured to drive movement of the pin 404 generally toward the particle belt 392. For example, the drive system 408 may include a pneumatic actuator, a hydraulic actuator, an electromechanical actuator (e.g., solenoid), or other suitable system configured to drive movement of the pin 404. The pin 404 is configured to contact each particle 82 at the release point 373 to accelerate and/or to remove the particle 82 from the aperture 380 and to accelerate the particle 82 along the release trajectory 384 toward the particle belt 392. As illustrated, both the movement of the pin 404 (e.g., indicated by arrow 406) and the release trajectory 384 extend in generally similar directions and generally along the vertical axis 62. As illustrated, the particle delivery system 400 includes the particle tube 364. In certain embodiments, the particle tube may be omitted from the particle delivery system.

In certain embodiments, the direction of movement of the pin and/or the direction of the release trajectory of the particles may be oriented at an acute angle relative to the vertical axis. In some embodiments, the particle acceleration system may be included with the vacuum passage described above, such that the particle acceleration system functions only to accelerate the particles toward the particle engagement section of the particle belt (e.g., the vacuum removal system may remove the vacuum at the end of the vacuum passage, and the particle acceleration system may accelerate the particles toward the particle belt after removal of the vacuum).

To facilitate transfer of the particles 82 from the particle metering and singulation unit 362 to the particle belt 392, the particle acceleration system 402 of the particle delivery system 400 is configured to apply a force to each particle 82, via the pin 404, to accelerate the particle 82 downwardly along the release trajectory 384. As illustrated, the movement of the pin 404 and the release trajectory 384 are directed toward the flights 394 of the particle belt 392 to facilitate transfer of the particles 82 to the flights 394. In certain embodiments, the particle acceleration system may include other suitable mechanical system(s) configured to apply the force to the particles to accelerate the particles from the apertures of the disc and/or to accelerate the particles toward the particle belt. For example, the particle acceleration system may include a brush or other suitable device configured to rotate proximate to the release point (e.g., generally about the longitudinal axis or generally about the lateral axis) to remove the particles from the apertures and/or to accelerate the particles toward the particle belt.

To facilitate transfer of the particles 82 from the particle metering and singulation unit 362 to the particle belt 392 along the release trajectory 384, the controller 170 of the particle delivery system 400 is configured control the acceleration and/or the speed of the particles 82 by adjusting the force applied by the particle acceleration system 402 (e.g., the pin 404 of the particle acceleration system 402) to the particles 82. For example, the controller 170 may control the particle acceleration system 402 to control the force applied by the pin 404 to each particle 82, thereby controlling the particle speed of the particle 82 at the particle engagement section 395 on the particle belt 392. The controller 170 may control the particle acceleration system 402 such that a particle speed of each particle 82 reaches a target particle speed and/or is within a target percentage of the belt speed of the particle belt 392.

To control the force applied by the pin 404 to the particles 82 and, thus, the particle speed of the particles 82 at the particle engagement section 395 of the particle belt 392, the controller 170 may receive an input signal indicative of the particle speed of the particles 82 at the particle engagement section 395. For example, the controller 170 may receive the input signal from the particle sensor 172 of the particle delivery system 360 disposed within the particle tube 364 adjacent to the particle belt 392. The controller 170 may also receive an input signal indicative of the belt speed of the particle belt 392, and/or the controller 170 may determine the belt speed of the particle belt 392. In certain embodiments, the particle delivery system may include the belt sensor configured to output the input signal indicative of the belt speed of the particle belt. The controller 170 may set the belt speed of the particle belt 392 (e.g., output an output signal indicative of instructions to adjust the belt speed of the particle belt 392 to a target belt speed) based on the type of the particles 82, the size of the particles 82, the ground speed of the row unit, the spacing between the flights 394 of the particle belt 392, a length of the particle belt 392, or a combination thereof. The controller 170 may determine the target particle speed at least partially based on the set belt speed of the particle belt 392 and/or based on feedback from the belt sensor.

The controller 170 may compare the particle speed of the particles 82 at the particle belt 392 to determine whether the particle speed is within a target percentage of a belt speed of the particle belt 392. Based on a determination that the particle speed is not within the target percentage of a belt speed of the particle belt 392, the controller 170 may output an output signal to the particle acceleration system 402 indicative of instructions to adjust the force applied to the particles 82 by the particle acceleration system 402 via the pin 404. For example, based on a determination that the particle speed is less than the belt speed and is not within the target percentage of the belt speed, the controller 170 may output the output signal to the particle acceleration system 402 (e.g., to the drive system 408 of the particle acceleration system 402) indicative of instructions to increase the force applied to the particles 82 (e.g., by the pin 404). The increase in the force applied by the particle acceleration system 402 may increase the particle speed of the particles 82 at the particle belt 392, such that the particle speed may increase to be within the target percentage of the belt speed of the particle belt 392.

Based on a determination that the particle speed is greater than the belt speed and the particle speed is not within the target percentage of the belt speed, the controller 170 may output the output signal to the particle acceleration system 402 indicative of instructions to decrease the force applied to the particles 82 (e.g., output the output signal to the drive system 408 indicative of instructions to decrease the movement of the pin 404). The decrease in the force applied by the particle acceleration system 402 may decrease the particle speed of the particles 82 at the particle engagement section 395 of the particle belt 392, such that the particle speed may be within the target percentage of the belt speed of the particle belt 392.

Additionally or alternatively, in certain embodiments, the controller 170 may determine whether a difference between the particle speed of the particles 82 at the particle engagement section 395 of the particle belt 392 and the target particle speed exceeds a threshold value. Based on a determination that the difference between the particle speed and the target particle speed exceeds the threshold value, the controller 170 may adjust the force applied by the particle acceleration system 402 to the particles 82, such that the difference between the particle speed and the target particle speed does not exceed the threshold value. For example, based on the particle speed being less than the target particle speed and the difference exceeding the threshold value, the controller 170 may increase the force applied by the particle acceleration system 402 to the particles 82. Based on the particle speed being greater than the target particle speed and the difference exceeding the threshold value, the controller 170 may decrease the force applied by the particle acceleration system 402 to the particles 82. The controller 170 may control the force applied by the particle acceleration system 402 to the particles 82 such that the particle speed reaches the target particle speed (e.g., is within a threshold range of the target particle speed, where the threshold range is equal to the target particle speed plus or minus the threshold value).

Figure 13:
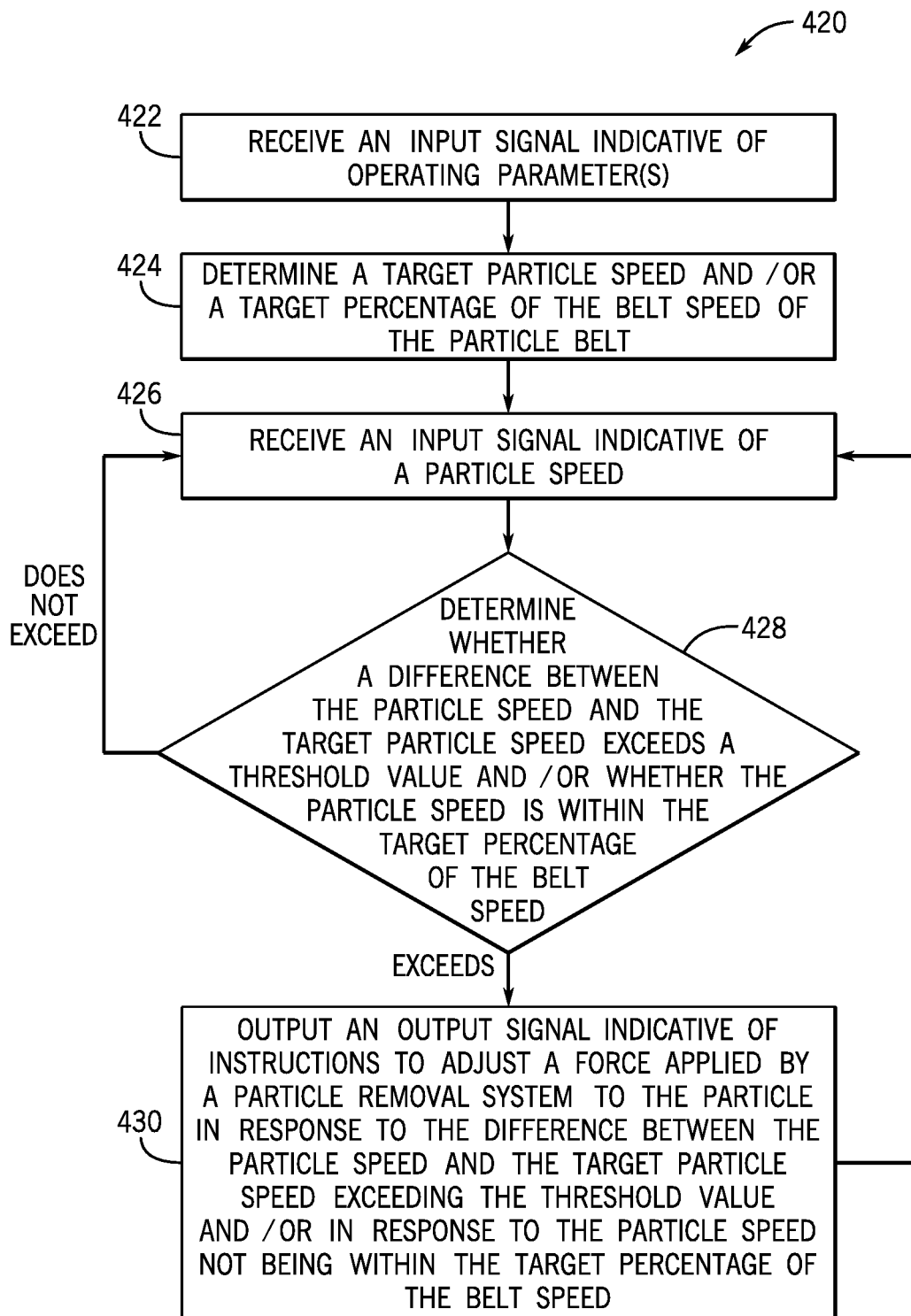
FIG. 13 is a flow diagram of an embodiment of a process for controlling a particle delivery system, in accordance with an aspect of the present disclosure.

FIG. 13 is a flow diagram of an embodiment of a process 420 for controlling a particle delivery system. For example, the process 420, or portions thereof, may be performed by the controller of the particle delivery system. The process 420 begins at block 422, in which an input signal indicative of operating parameter(s) is received. For example, the operating parameters may include the type of the particle, the ground speed of the row unit, the spacing between opposing flights of the particle belt, the length of the particle belt, the belt speed of the particle belt, or a combination thereof. The input signal may be received via the user interface communicatively coupled to the controller, may be stored in the memory of the controller, may be received via sensors of the row unit and/or the agricultural implement, may be received from a transceiver, or a combination thereof.

At block 424, the target particle speed and/or the target percentage of the belt speed of the particle belt is determined. For example, the controller may determine the target particle speed and/or the target percentage of the belt speed based on the type of the particles, the size of the particles, the ground speed of the row unit, the spacing between opposing flights of the particle belt, the length of the particle belt, or a combination thereof.

At block 426, an input signal indicative of the particle speed of each particle at the particle engagement section of the particle belt is received. For example, the controller may receive the input signal indicative of the particle speed from the particle sensor disposed generally between the particle metering and singulation unit and the particle belt and generally along the release trajectory. In certain embodiments, the controller may receive multiple input signals from the particle sensor, in which each input signal is indicative of a particle speed of a respective particle. The controller may determine an average of the multiple particle speeds to determine the average particle speed of the particles at the particle belt. As such, the controller may account for variance among the particle speeds of multiple particles passing along the release trajectory to reduce excessive control actions (e.g., adjustments to the force applied by the particle acceleration system to the particles at the release point of the particle metering and singulation unit).

At block 428, a determination of whether a difference between the particle speed and the target particle speed exceeds a threshold value and/or whether the particle speed is within the target percentage of the belt speed is made. Additionally, a determination of whether the particle speed is less than or greater than the target particle speed and/or less than or greater than the belt speed is made (e.g., by the controller). The threshold value may be determined based on the type of the particles, the size of the particles, the ground speed of the row unit, the spacing between opposing flights of the particle belt, the length of the particle belt, or a combination thereof. In response to the difference exceeding the threshold value and/or the particle speed not being within the target percentage of the belt speed, the process 420 proceeds to block 430. In response to the difference not exceeding the threshold value and/or the particle speed being within the target percentage of the belt speed, the process 420 returns to block 426 and receives the next input signal indicative of the particle speed.

At block 430, in response to the difference between the particle speed and the target particle speed exceeding the threshold value and/or in response to the particle speed not being within the target percentage of the belt speed, an output signal indicative of instructions to adjust the force applied by the particle acceleration system (e.g., the force applied by the air flow from the air flow system, the force applied by the pin, or the force applied by the brush) to each particle at the release point is output. For example, the controller may output an output signal indicative of instructions to increase the force applied by the particle acceleration system to each particle based on a determination that the particle speed at the particle belt is less than the target particle speed and the difference between the particle speed and the target particle speed exceeds the threshold value. Additionally or alternatively, the controller may output the output signal indicative of instructions to increase the force applied by the particle acceleration system to each particle based on a determination that the particle speed at the particle belt is less than the belt speed and is not within the target percentage of the belt speed. Further, the controller may output an output signal indicative of instructions to decrease the force applied by the particle acceleration system to each particle based on a determination that the particle speed at the particle belt is greater than the target particle speed and the difference between the particle speed and the target particle speed exceeds the threshold value. Additionally or alternatively, the controller may output the output signal indicative of instructions to decrease the force applied by the particle acceleration system to each particle based on a determination that the particle speed at the particle belt is greater than the belt speed and is not within the target percentage of the belt speed.

After completing block 430, the process 420 returns to block 426 and receives the next input signal indicative of the particle speed of the particle at the particle engagement section of the particle belt. The next determination is made of whether the difference between the particle speed and the target particle speed exceeds the threshold value and/or whether the particle speed is within the target percentage of the belt speed (e.g., block 428), and the force applied by the particle acceleration system to each particle is adjusted in response to the determination(s). As such, blocks 426-430 of the process 420 may be iteratively performed (e.g., by the controller of the particle delivery system and/or by another suitable controller) to facilitate transfer and/or acceleration of the particles from the particle metering and singulation unit to the particle belt. In some embodiments, certain blocks of the blocks 422-430 may be omitted from the process 420 and/or the order of the blocks 422-430 may be different.

Figure 14:
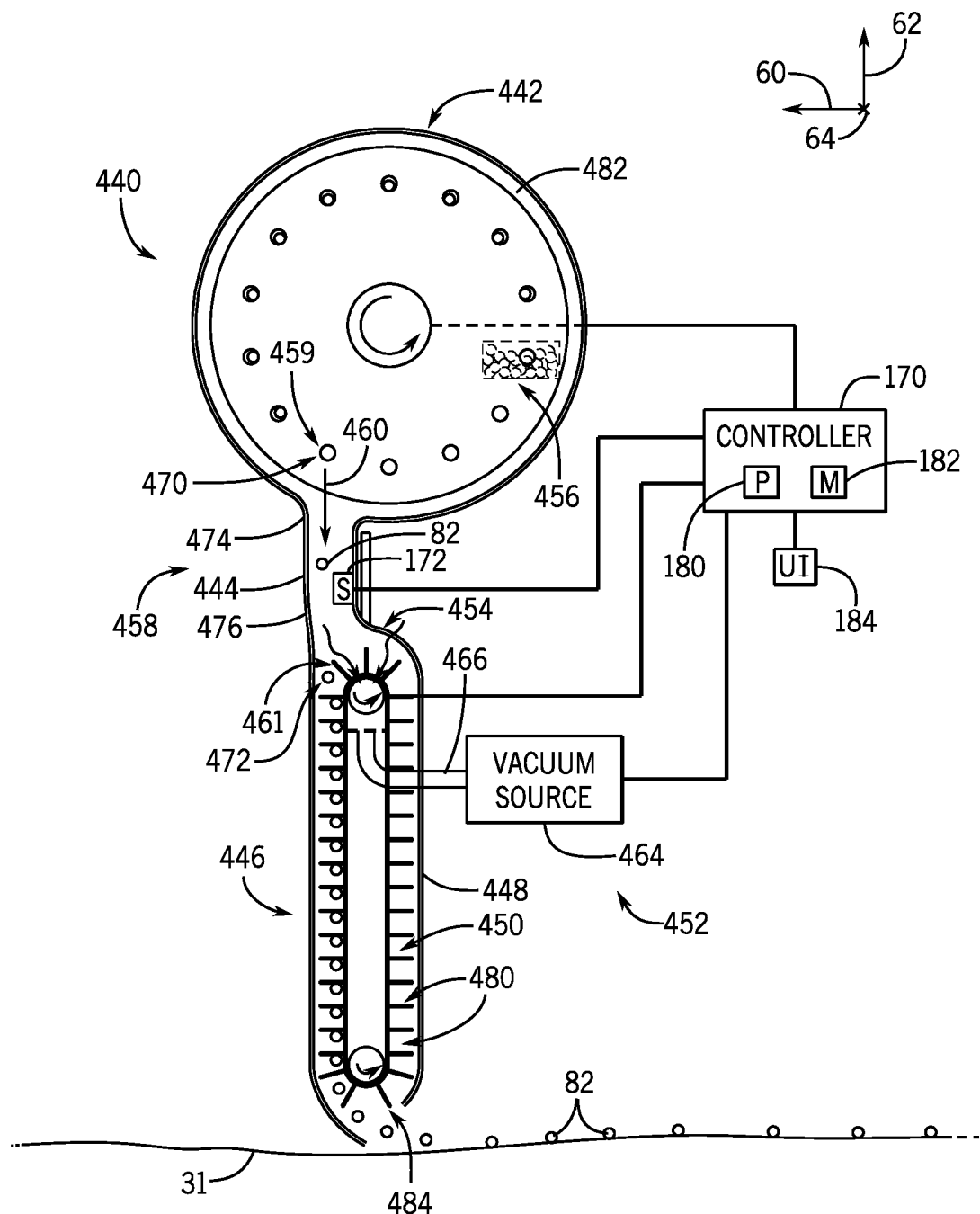
FIG. 14 is a cross-sectional view of an embodiment of a particle delivery system that may be employed within the row unit of FIG. 2, in accordance with an aspect of the present disclosure.

FIG. 14 is a cross-sectional view of an embodiment of a particle delivery system 440 that may be employed within the row unit of FIG. 2. As illustrated, the particle delivery system 440 includes a particle metering and singulation unit 442, a particle tube 444, and a particle belt assembly 446 coupled to the particle metering and singulation unit 442 via the particle tube 444. The particle belt assembly 446 includes a particle belt housing 448 coupled to the particle tube 444 and a particle belt 450 disposed within the particle belt housing 448. Additionally, the particle delivery system 440 includes an air flow system 452 configured to establish an air flow 454 toward the particle belt 450 of the particle belt assembly 446. The air flow 454 may direct the particles 82 from the particle metering and singulation unit 442 toward the particle belt 450. For example, the particle metering and singulation unit 442 is configured to meter and transfer the particles 82 from a particle storage area 456 toward a particle transfer section 458 of the particle delivery system 440. At a release point 459 of the particle transfer section 458 and of the particle metering and singulation unit 442, the particle metering and singulation unit 442 is configured to release each particle 82 (e.g., by terminating a vacuum applied to the particle 82 at the aperture), thereby enabling the particle 82 to move downwardly under the influence of gravity along a release trajectory 460 toward an engagement point 461 of the particle transfer section 458 and of the particle belt 450. Further, at the release point 459, the air flow system 452 is configured to establish the air flow 454, which directs the particle 82 from the particle metering and singulation unit 442 toward the particle belt 450. In certain embodiments, the particle tube 444 may be omitted from the particle delivery system 440.

As illustrated, the air flow system 452 includes a vacuum source 464 and an air flow tube 466. The air flow tube 466 is coupled to the particle belt assembly 446 at the particle transfer section 458 and to the vacuum source 464. The vacuum source 464 is configured to generate an air flow through the air flow tube 466, thereby establishing the air flow 454 toward the particle belt 450. For example, the vacuum source 464 may include a vacuum pump, a blow, or an air compressor configured to draw air into the air flow tube 466.

The particle transfer section 458 of the particle delivery system 440 includes a particle release section 470 of the particle metering and singulation unit 442, where the particle metering and singulation unit 442 is configured to release the particles 82 toward the particle belt 450. For example, the release point 459 is positioned within the particle release section 470. Additionally, the particle transfer section 458 includes a particle engagement section 472 of the particle belt 450, where the particle belt 450 is configured to receive the particles 82. For example, the engagement point 461 is positioned within the particle engagement section 472. Further, the particle tube 444 is disposed within the particle transfer section 458. For example, a particle tube inlet 474 of the particle tube 444 is disposed adjacent to the particle release section 470 and is configured to receive the particles 82 from the release point 459, and a particle tube outlet 476 of the particle tube 444 is positioned adjacent to the particle engagement section 472 and is configured to deliver the particles 82 to the engagement point 461.

The air flow system 452 is configured to establish the air flow 454 at the particle engagement section 472 of the particle belt 450, such that the air flow 454 is a substantial portion of a total air flow established by the air flow system 452 toward the particle belt 450. For example, the air flow system 452 is configured to establish the air flow 454 from the particle release section 470 of the particle metering and singulation unit 442 (e.g., at the release point 459), through the particle tube 444, and toward the particle engagement section 472 of the particle belt 450 (e.g., toward the engagement point 461). In certain embodiments, the air flow system 452 may establish air flow(s) at other portions of the particle belt 450 and/or at other portions of the particle delivery system 440 generally. For example, the air flow system 452 may establish the other air flows due to the other portions of the particle delivery system not having an air-tight seal. In some embodiments, the air flow 454 at the particle engagement section 472 may induce an air flow through a portion of the particle belt housing 448, through the particle tube 444, through a coupling/joint between the particle tube 444 and the particle belt housing 448, and/or through other portions of the particle delivery system 440.

As described herein, the air flow 454 established by the air flow system 452 toward the particle engagement section 472 being a substantial portion of the total air flow established by the air flow system 452 toward the particle belt 450 may include the air flow 454 being at least a majority percentage (e.g., a substantial portion) of the total air flow, such as at least fifty-one percent of the total air flow, at least sixty percent of the total air flow, at least seventy-five percent of the total air flow, at least eighty-five percent of the total air flow, at least ninety percent of the total air flow, at least ninety-five percent of the total air flow, at least ninety-nine percent of the total air flow, or other percentages of the total air flow. In certain embodiments, the air flow system 452 may be configured to provide the air flow 454 toward the particle engagement section 472 as the only air flow established toward the particle belt 450. In some embodiments, the air flow 454 established by the air flow system 452 toward the particle engagement section 472 may be the only air flow established by the air flow system 452 toward the particle belt 450 that is strong enough to attach (e.g., adhere, hold, etc.) the particles 82 to the particle belt 450.

The particle belt 450 includes flights 480 configured to receive the particles 82 from the particle metering and singulation unit 442 (e.g., each pair of opposing flights 480 is configured to receive a respective particle 82). In certain embodiments, the particle belt 450 may rotate generally faster than the rotational speed of a disc 482 of the particle metering and singulation unit 442, such that the particle belt 450 may accelerate the particles 82 received from the disc 482 toward the trench 31. To facilitate transfer of the particles 82 from the particle metering and singulation unit 442 to the particle belt 450, the air flow 454 established by air flow system 452 is configured to accelerate the particles 82 toward the particle belt 450. As illustrated, the air flow 454 is directed toward the flights 480 of the particle belt 450 to facilitate receipt of each particle 82 by a respective pair of flights 480. The flights 480 are configured to transfer the particles 82 from the particle engagement section 472 of the particle belt 450 toward a particle exit section 484 of the particle belt 450, where the particle belt 450 is configured to expel the particles 82 toward the trench 31 in soil. In certain embodiments, the air flow system 452 is configured to establish the air flow 454 at the particle engagement section 472 of the particle belt 450 (e.g., as a substantial portion of the total air flow established by the air flow system 452) and not at the particle exit section 484 or at other portions of the particle belt 450.

Additionally, to facilitate transfer of the particles 82 from the particle metering and singulation unit 442 to the particle belt 450, the controller 170 of the particle delivery system 440 is configured control the speed of the particles 82 by adjusting the air flow 454 provided by the air flow system 452. For example, the controller 170 may control the air flow system 452 to control the force applied by the air flow 454 to each particle 82, thereby controlling the particle speed of the particles 82 at the engagement point 461 on the particle belt 450. The controller 170 may control the air flow system 452 such that a particle speed of each particle 82 reaches a target particle speed and/or is within a target percentage of the belt speed of the particle belt 450 at the engagement point 461 on the particle belt 450. The target percentage may be determined by the controller 170 based on a type of the particles 82, a size (e.g., a nominal and/or an average size) of the particles 82, a ground speed of the row unit, a spacing between the flights 480 of the particle belt 450, a length of the particle belt 450, the belt speed of the particle belt 450, or a combination thereof.

To control the air flow 454 and, thus, the particle speed of the particles 82 at the at the particle engagement section 472 and at the engagement point 461 of the particle belt 450, the controller 170 may receive an input signal indicative of the particle speed of the particles 82 at the engagement point 461. For example, the controller 170 may receive the input signal from the particle sensor 172 of the particle delivery system 440 disposed within the particle tube 444 adjacent to the particle belt 450. The controller 170 may also receive an input signal indicative of the belt speed of the particle belt 450, and/or the controller 170 may determine the belt speed of the particle belt 450. In certain embodiments, the particle delivery system may include the belt sensor configured to output the input signal indicative of the belt speed of the particle belt. The controller 170 may set the belt speed of the particle belt 450 (e.g., output an output signal indicative of instructions to adjust the belt speed of the particle belt 450 to a target belt speed) based on the type of the particles 82, the size of the particles, the ground speed of the row unit, the spacing between the flights 480 of the particle belt 450, the length of the particle belt 450, or a combination thereof. The controller 170 may determine the target particle speed at least partially based on the set belt speed of the particle belt 450 and/or based on feedback from the belt sensor.

The controller 170 may compare the particle speed of the particles 82 at the engagement point 461 of the particle belt 450 to the belt speed of the particle belt 450 to determine whether the particle speed is within a target percentage of the belt speed. Based on a determination that the particle speed is not within the target percentage of the belt speed, the controller 170 may output an output signal indicative of instructions to adjust the air flow 454 provided by the air flow system 452. For example, based on a determination that the particle speed is less than the belt speed and is not within the target percentage of the belt speed, the controller 170 may output the output signal to the air flow system 452 indicative of instructions to increase the air flow 454 (e.g., to increase a rate of the air flow 454 toward the particle belt 450). The increase in the air flow 454 may increase the particle speed of the particles 82 at the engagement point 461 of the particle belt 450, such that the particle speed may increase to within the target percentage of the belt speed of the particle belt 450.

Based on a determination that the particle speed is greater than the belt speed and the particle speed is not within the target percentage of the belt speed, the controller 170 may output the output signal to the air flow system 452 indicative of instructions to decrease the air flow 454 (e.g., to decrease the rate of the air flow 454 toward the particle belt 450). The decrease in the air flow 454 may decrease the particle speed of the particles 82 at the engagement point 461 of the particle belt 450, such that the particle speed may be within the target percentage of the belt speed of the particle belt 450.

Additionally or alternatively, in certain embodiments, the controller 170 may determine whether a difference between the particle speed of the particles 82 at the engagement point 461 of the particle belt 450 and the target particle speed exceeds a threshold value. Based on a determination that the difference between the particle speed and the target particle speed exceeds the threshold value, the controller 170 may adjust the air flow 454 provided by the air flow system 452, such that the difference between the particle speed and the target particle speed does not exceed the threshold value. For example, based on the particle speed being less than the target particle speed and the difference exceeding the threshold value, the controller 170 may increase the air flow 454 provided by the air flow system 452. Based on the particle speed being greater than the target particle speed and the difference exceeding the threshold value, the controller 170 may decrease the air flow 454 provided by the air flow system 452. The controller 170 may control the air flow 454 provided by the air flow system 452 such that the particle speed reaches the target particle speed (e.g., is within a threshold range of the target particle speed, where the threshold range is equal to the target particle speed plus or minus the threshold value).

Figure 15:
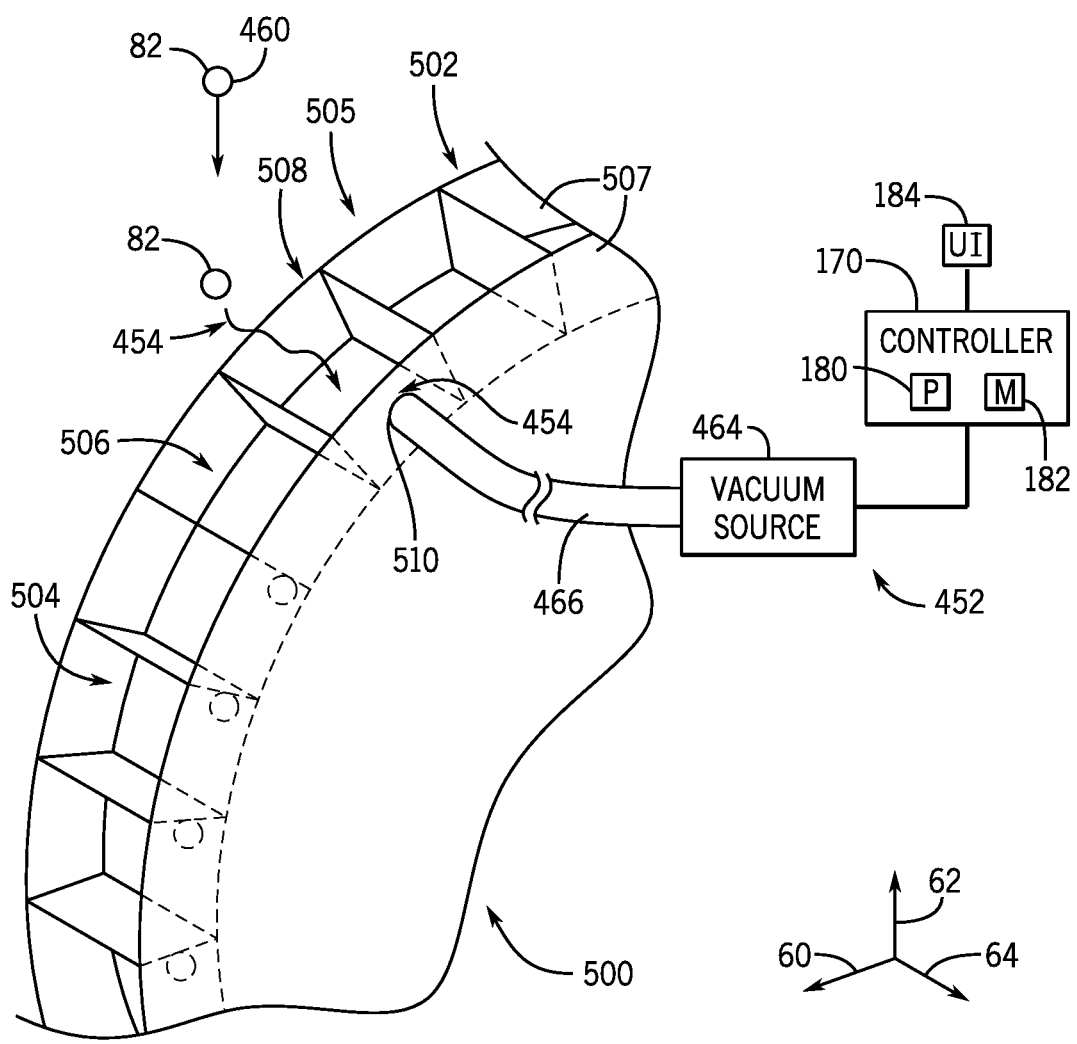
FIG. 15 is a perspective view of a portion of an embodiment of a particle delivery system, which may be employed within the row unit of FIG. 2, having an air flow system and a particle belt disposed within a particle belt housing, in accordance with an aspect of the present disclosure.

FIG. 15 is a perspective view of a portion of an embodiment of a particle delivery system, which may be employed within the row unit of FIG. 2, having the air flow system 452 and a particle belt assembly 500. The particle belt assembly 500 includes a particle belt housing 502 and a particle belt 504 disposed within the particle belt housing 502. The air flow system 452 of the particle delivery system is configured to establish the air flow 454 that urges each particle 82 toward a particle engagement section 505 of the particle belt 504. For example, each particle 82 may flow along the release trajectory 460 and may be driven toward an engagement point 506 of the particle engagement section 505 of the particle belt 504 by the air flow 454 generated by the air flow system 452.

As illustrated, the particle belt housing 502 includes side panels 507, and each side panel 507 is disposed on a respective lateral side of the particle belt 504 (e.g., each lateral side along the lateral axis 64). The particle belt housing 502 forms an aperture 508 between the side panels 507 at the particle transfer section of the particle delivery system (e.g., adjacent to the particle engagement section 505 of the particle belt 504). The aperture 508 forms a lateral gap between the side panels 507 and has approximately the same width as the particle belt 504. As illustrated, the air flow 454 flows into the aperture 508. For example, the air flow 454 generated by the air flow system 452 passes through the aperture 508, thereby driving each particle 82 through the aperture 508 and toward the particle engagement section 505 of the particle belt 504.

Additionally, at least one side panel 507 includes a side aperture 510 coupled to the air flow tube 466. In some embodiments, the at least one side panel 507 may include a barbed fitting configured to connect to the air flow tube 466 to couple/secure the air flow tube 466 to the particle belt housing 502. The air flow system 452 is configured to draw the air through the aperture 508, through the side aperture 510, and into the air flow tube 466, thereby establishing the air flow 454 that accelerates the particles 82 toward the particle engagement section 505 of the particle belt 504. In certain embodiments, both side panels may include a side aperture coupled to the air flow system and configured to draw the air toward the particle belt, and/or one or both side panels may include multiple side apertures coupled to the air flow system and configured to draw the air toward the particle belt.

Figure 16:
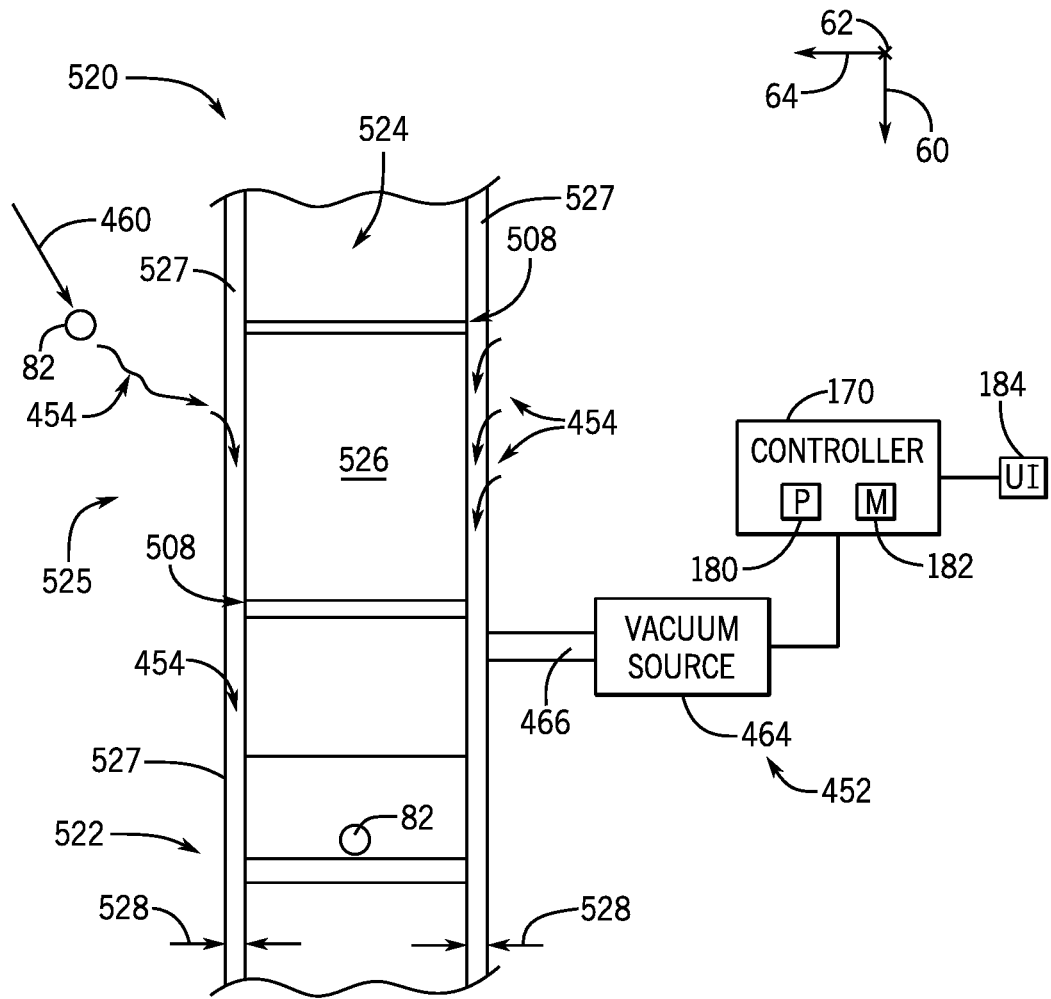
FIG. 16 is a cross-sectional view of a portion of an embodiment of a particle delivery system, which may be employed within the row unit of FIG. 2, having an air flow system and a particle belt disposed within a particle belt housing, in accordance with an aspect of the present disclosure.

FIG. 16 is a cross-sectional view of a portion of an embodiment of a particle delivery system, which may be employed within the row unit of FIG. 2, having the air flow system 452 and a particle belt assembly 520. The particle belt assembly 520 includes a particle belt housing 522 and a particle belt 524 disposed within the particle belt housing 522. The air flow system 452 of the particle delivery system is configured to establish the air flow 454 that urges each particle 82 toward a particle engagement section 525 of the particle belt 524. For example, each particle 82 may flow along the release trajectory 460 and may be driven toward an engagement point 526 of the particle engagement section 525 of the particle belt 524 by the air flow 454 generated by the air flow system 452.

As illustrated, the particle belt assembly 520 includes side panels 527 of the particle belt housing 522, and each side panel 527 is disposed on a respective lateral side of the particle belt 524 (e.g., each lateral side along the lateral axis 64). Lateral gaps 528 are formed between the side panels 527 and the particle belt 524. As illustrated, the air flow 454 flows into the gaps 528. For example, the air flow 454 established by the air flow system 452 passes through the gaps 528, thereby driving each particle 82 toward the engagement point 526 of the particle belt 504. Additionally, the air flow tube 466 is coupled to the side panel 527 at an interior portion of the particle belt 524 (e.g., the side panel 527 extends along and adjacent to an interior portion of the particle belt 524). For example, the air flow system 452 may establish the air flow 454 that flows toward the particle engagement section 525 of the particle belt 524, into the gaps 528 and the interior portion of the particle belt 524, and through the air flow tube 466.

Figure 17:
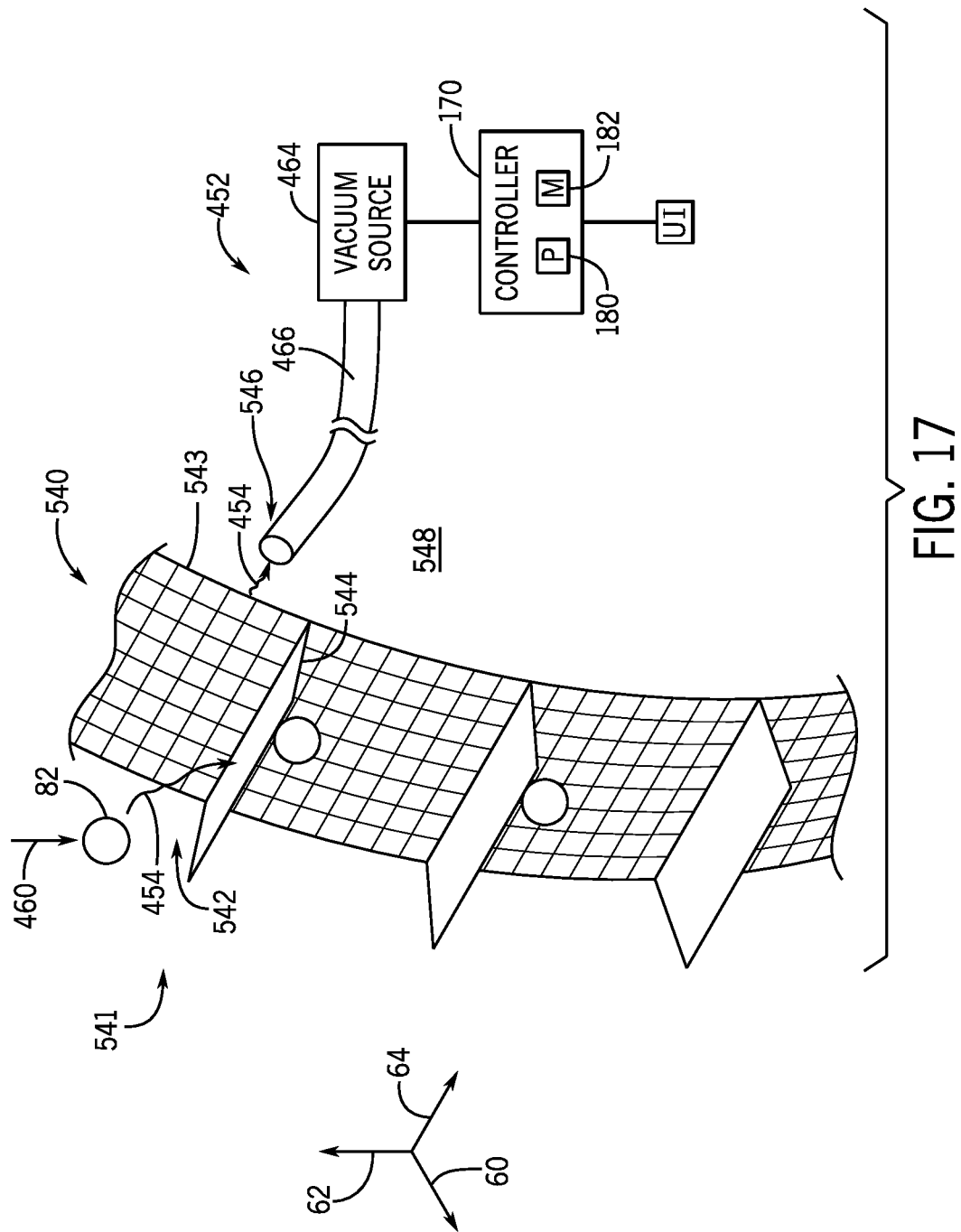
FIG. 17 is a perspective view of a portion of an embodiment of a particle delivery system, which may be employed within the row unit of FIG. 2, having a particle belt and an air flow system, in accordance with an aspect of the present disclosure.

FIG. 17 is a perspective view of a portion of an embodiment of a particle delivery system, which may be employed within the row unit of FIG. 2, having a particle belt 540 and the air flow system 452. The air flow system 452 of the particle delivery system is configured to establish the air flow 454 that urges each particle 82 toward a particle engagement section 541 of the particle belt 540. For example, each particle 82 may flow along the release trajectory 460 and may be driven toward an engagement point 542 of the particle engagement section 541 of the particle belt 540 by the air flow 454 generated by the air flow system 452.

As illustrated, the particle belt 540 includes a base 543 and flights 544 coupled to the base 543. The base 543 is formed from a permeable material (e.g., a fabric, a mesh structure, a structure with apertures smaller than the expected minimum particle diameter, or a combination thereof) configured to enable the air flow 454 to pass through the particle belt 540. For example, an end 546 of the air flow tube 466 is disposed on an interior side/portion 548 the particle belt 540. The air flow system 452 is configured to draw the air through the base 543 of the particle belt 540 and into the air flow tube 466, thereby establishing the air flow 454 that accelerates the particles 82 toward the particle engagement section 541 of the particle belt 540 (e.g., toward the engagement point 542 of the particle engagement section 541).

In certain embodiments, the air flow system may be disposed within the interior portion of the particle belt housing. Additionally, the particle belt housing of the particle delivery system may include vents. The air flow system (e.g., the vacuum source of the air flow system) may be configured to draw air through the particle belt, through one or more apertures within the particle belt housing, through a lateral gap between the particle belt and the particle belt housing, or a combination thereof. In addition, the air may exit the interior portion of the particle belt housing via the vents.

Figure 18:
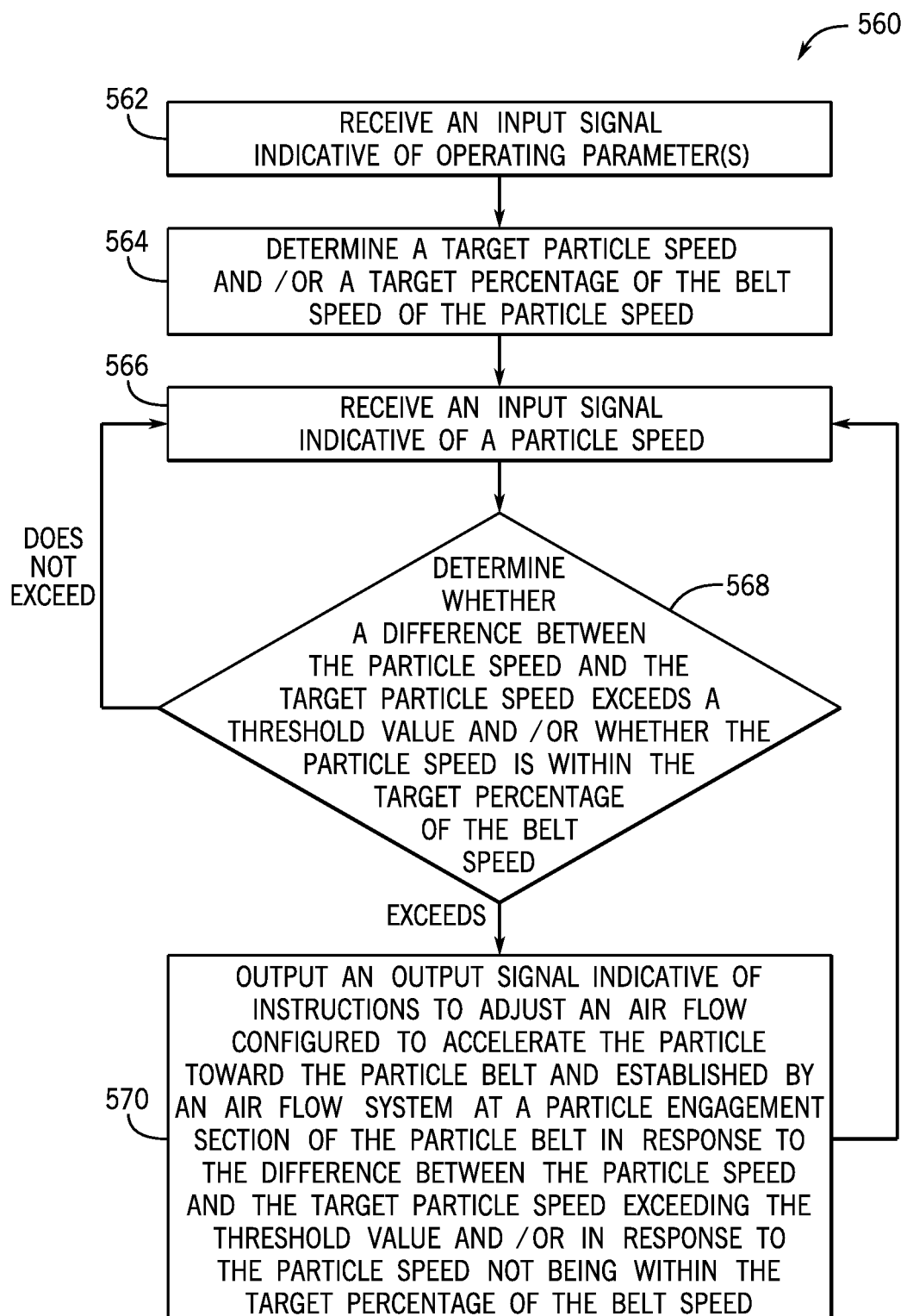
FIG. 18 is a flow diagram of an embodiment of a process for controlling a particle delivery system, in accordance with an aspect of the present disclosure.

FIG. 18 is a flow diagram of an embodiment of a process 560 for controlling the particle delivery system. For example, the process 560, or portions thereof, may be performed by the controller of the particle delivery system. The process 560 begins at block 562, in which an input signal indicative of operating parameter(s) is received. For example, the operating parameters may include the type of the particle, the ground speed of the row unit, the spacing between opposing flights of the particle belt, the length of the particle belt, the belt speed of the particle belt, or a combination thereof. The input signal may be received via the user interface communicatively coupled to the controller, may be stored in the memory of the controller, may be received via sensors of the row unit and/or the agricultural implement, may be received from a transceiver, or a combination thereof.

At block 564, the target particle speed and/or the target percentage of the belt speed of the particle belt is determined. For example, the controller may determine the target particle speed and/or the target percentage of the belt speed based on the type of the particles, the size of the particles, the ground speed of the row unit, the spacing between opposing flights of the particle belt, the length of the particle belt, or a combination thereof.

At block 566, an input signal indicative of the particle speed of each particle at the particle engagement section of the particle belt (e.g., at the engagement point) is received. For example, the controller may receive the input signal indicative of the particle speed from the particle sensor disposed generally between the particle metering and singulation unit and the particle belt and generally along the release trajectory. In certain embodiments, the controller may receive multiple input signals from the particle sensor, in which each input signal is indicative of a particle speed of a respective particle. The controller may determine an average of the multiple particle speeds to determine the average particle speed of the particles at the particle belt. As such, the controller may account for variance among the particle speeds of multiple particles passing along the release trajectory to reduce excessive control actions (e.g., adjustments to the air flow toward the particle engagement section of the particle belt).

At block 568, a determination of whether a difference between the particle speed and the target particle speed exceeds a threshold value and/or whether the particle speed is within the target percentage of the belt speed is made (e.g., by the controller). Additionally, a determination of whether the particle speed is less than or greater than the target particle speed and/or less than or greater than the belt speed is made (e.g., by the controller). The threshold value may be determined based on the type of the particles, the size of the particles, the ground speed of the row unit, the spacing between opposing flights of the particle belt, the length of the particle belt, or a combination thereof. In response to the difference exceeding the threshold value and/or the particle speed not being within the target percentage of the belt speed, the process 560 proceeds to block 570. In response to the difference not exceeding the threshold value and/or the particle speed being within the target percentage of the belt speed, the process 560 returns to block 566 and receives the next input signal indicative of the particle speed.

At block 570, in response to the difference between the particle speed and the target particle speed exceeding the threshold value and/or in response to the particle speed not being within the target percentage of the belt speed, an output signal indicative of instructions to adjust the air flow provided by the air flow system toward the particle belt of the particle delivery system to control the force applied to the particle. For example, the controller may output an output signal indicative of instructions to increase the air flow provided by the air flow system based on a determination that the particle speed at the particle belt is less than the target particle speed and the difference between the particle speed and the target particle speed exceeds the threshold value. Additionally or alternatively, the controller may output the output signal indicative of instructions to increase the air flow provided by the air flow system based on a determination that the particle speed at the particle belt is less than the belt speed and is not within the target percentage of the belt speed. Further, the controller may output an output signal indicative of instructions to decrease the air flow provided by the air flow system based on a determination that the particle speed at the particle belt is greater than the target particle speed and the difference between the particle speed and the target particle speed exceeds the threshold value. Additionally or alternatively, the controller may output the output signal indicative of instructions to decrease the air flow provided by the air flow system based on a determination that the particle speed at the particle belt is greater than the belt speed and is not within the target percentage of the belt speed.

After completing block 570, the process 560 returns to block 566 and receives the next input signal indicative of the particle speed of the particle at the particle engagement section of the particle belt. The next determination is made of whether the difference between the particle speed and the target particle speed exceeds the threshold value and/or whether the particle speed is within the target percentage of the belt speed (e.g., block 568), and the air flow provided by the air flow system is adjusted in response to the determination(s). As such, blocks 566-570 of the process 560 may be iteratively performed (e.g., by the controller of the particle delivery system and/or by another suitable controller) to facilitate transfer of the particles from the particle metering and singulation unit to the particle belt. In some embodiments, certain blocks of the blocks 562-570 may be omitted from the process 560 and/or the order of the blocks 562-570 may be different.

Figure 19:
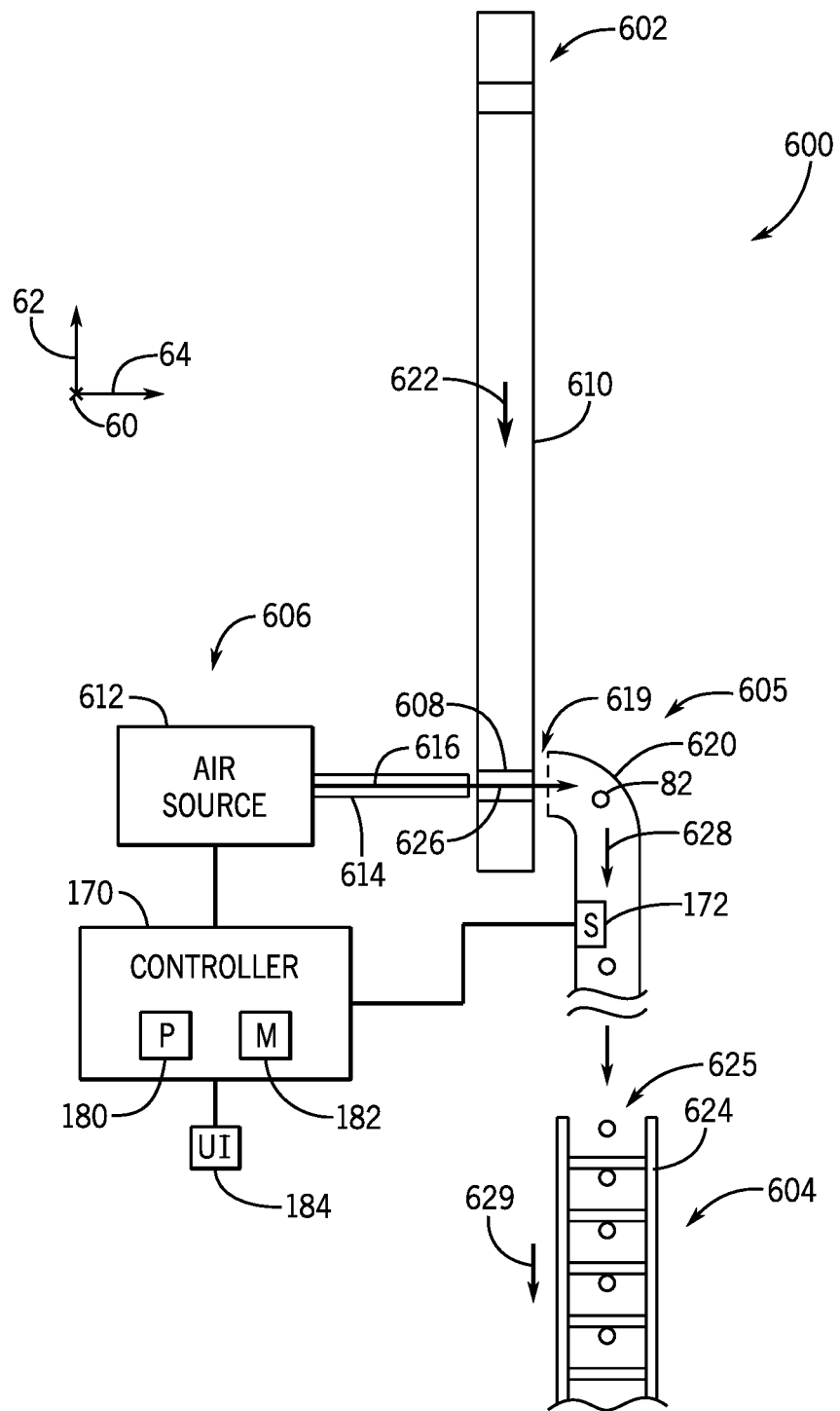
FIG. 19 is a cross-sectional view of an embodiment of a particle delivery system that may be employed within the row unit of FIG. 2, in accordance with an aspect of the present disclosure.

FIG. 19 is a cross-sectional view of an embodiment of a particle delivery system 600 that may be employed within the row unit of FIG. 2. The particle delivery system 600 includes a particle metering and singulation unit 602 configured to meter and transfer the particles 82 from a particle storage area toward a particle belt assembly 604 at a particle transfer section 605 of the particle delivery system 600. Additionally, the particle delivery system 600 includes a particle removal system 606 configured to remove each particle 82 from a respective aperture 608 of a disc 610 of the particle metering and singulation unit 602.

As illustrated, the particle removal system 606 includes an air source 612 (e.g., an air pump, a fan, a blower, etc.) and an air flow tube 614 coupled to the air source 612. The particle removal system 606 is configured to establish an air flow 616 through the air flow tube 614 and through a respective aperture 608, thereby ejecting the particle 82 from the aperture 608 at a release point 619 of the particle metering and singulation unit 602 and driving the particle 82 into a particle tube 620 of the particle delivery system 600. For example, as the disc 610 rotates, as indicated by arrow 622, the air flow 616 may exit the air flow tube 614 and eject each particle 82 from a respective aperture 608 in response to alignment of the respective aperture 608 with the air flow tube 614. In certain embodiments, the air flow 616 may be pulsed and/or the air flow 616 may be cyclically interrupted (e.g., by a valve), such that the air flow 616 is only provided by the particle removal system 606 in response to alignment of each aperture 608 with the air flow tube 614. The pulsed air flow 616 may conserve energy, because the air source 612 would only the air flow 616 while the aperture 608 is aligned with the air flow tube 614.

The particle tube 620 is configured to direct the particles 82 from the release point 619 toward a particle engagement section 625 of the particle belt 624. For example, the particle tube 620 is curved such that the particle tube 620 is configured to redirect the particles 82 flowing along a release trajectory 626 to an altered trajectory 628 toward the particle engagement section 625 of the particle belt 624. In other embodiments, the particle tube may be shaped different and configured to redirect the particles from the release point toward the particle engagement section. In certain embodiments, the particle tube may be omitted, and the particles may be pushed directly into the particle belt. Additionally or alternatively, the particle belt may be disposed to the side of and/or parallel to the disc, such that the particles are pushed directly between flights of the particle belt. In some embodiments, the disc and the particle belt may be disposed at angle of ninety degrees relative to one another, such that the particles pushed/blown out of the apertures of the disc are directed between flights of the particle belt and along a travel path of the particle belt to facilitate transfer of the particle to the particle belt and acceleration of the particles by the particle belt. The particle belt 624 is configured to rotate, as indicated by arrow 629, thereby driving the particles 82 toward the trench in soil.

To facilitate transfer of the particles 82 from the particle metering and singulation unit 602 to the particle belt 624 at the particle transfer section 605, the controller 170 of the particle delivery system 600 is configured control the speed of the particles 82 by adjusting the air flow 616 applied by the particle removal system 606 to the particles 82. For example, the controller 170 may control the particle removal system 606 to control the particle speed of the particles 82 (e.g., control the air flow 616 applied to the particles 82) at the particle engagement section 625 of the particle belt 624. The controller 170 may control the particle removal system 606 such that the particle speed of the particles 82 reaches a target particle speed and/or is within a target percentage of a belt speed of the particle belt 624. The target particle speed and/or target percentage may be determined by the controller 170 based on a type of the particles 82, a size (e.g., a nominal and/or an average size) of the particles 82, a ground speed of the row unit, a spacing between flights of the particle belt 624, a length of the particle belt 624, the belt speed of the particle belt 624, or a combination thereof. The target particle speed may be any suitable particle speed, such as one kph, two kph, three kph, four kph, five kph, seven kph, ten kph, fifteen kph, twenty kph, between one kph and twenty kph, between five kph and fifteen kph, etc.

To control the air flow 616 applied to the particles 82 and, thus, the particle speed of the particles 82 at the particle engagement section 625 of the particle belt 624, the controller 170 may receive an input signal indicative of the particle speed of the particles 82 at the particle engagement section 625 of the particle belt 624. For example, the controller 170 may receive the input signal from the particle sensor 172 of the particle delivery system 600 disposed within the particle tube 620 adjacent to the particle belt 624. The controller 170 may also receive an input signal indicative of the belt speed of the particle belt 624, and/or may determine the belt speed of the particle belt 624. In certain embodiments, the particle delivery system may include the belt sensor configured to output the input signal indicative of the belt speed of the particle belt. The controller 170 may set the belt speed of the particle belt 624 (e.g., output an output signal indicative of instructions to adjust the belt speed of the particle belt 624 to a target belt speed) based on the type of the particles 82, the size (e.g., the nominal and/or the average size) of the particles 82, the ground speed of the row unit, a spacing between flights of the particle belt 624, a length of the particle belt 624, or a combination thereof. The controller 170 may determine the target particle speed at least partially based on the set belt speed of the particle belt 624 and/or based on feedback from the belt sensor.

The controller 170 may compare the particle speed of the particles 82 to the belt speed of the particle belt 624 to determine whether the particle speed is within a target percentage of the belt speed of the particle belt 624. Based on a determination that the particle speed is not within the target percentage of the belt speed of the particle belt 624, the controller 170 may output an output signal indicative of instructions to adjust the air flow 616 applied to the particles 82 by the particle removal system 606. For example, based on a determination that the particle speed is less than the belt speed and is not within the target percentage of the belt speed, the controller 170 may output the output signal to the particle removal system 606 indicative of instructions to increase the air flow 616 applied to the particles 82 (e.g., output the output signal to the air source 612 indicative of instructions to increase the air flow 616). The increase in the air flow 616 applied by the particle removal system 606 may increase the particle speed of each particle 82 at the particle engagement section 625 of the particle belt 624, such that the particle speed may be within the target percentage of the belt speed of the particle belt 624.

Based on a determination that the particle speed is greater than the belt speed and the particle speed is not within the target percentage of the belt speed, the controller 170 may output the output signal to the particle removal system 606 indicative of instructions to decrease the air flow 616 applied to the particles 82. The decrease in the air flow 616 applied by the particle removal system 606 may decrease the particle speed of the particles 82 at the particle engagement section 625 of the particle belt 624, such that the particle speed may be within the target percentage of the belt speed of the particle belt 624.

Additionally or alternatively, in certain embodiments, the controller 170 may determine whether a difference between the particle speed of the particles 82 at the particle engagement section 625 of the particle belt 624 and the target particle speed exceeds a threshold value. Based on a determination that the difference between the particle speed and the target particle speed exceeds the threshold value, the controller 170 may adjust the air flow 616 applied by the particle removal system 606 to the particles 82, such that the difference between the particle speed and the target particle speed does not exceed the threshold value. For example, based on the particle speed being less than the target particle speed and the difference exceeding the threshold value, the controller 170 may increase the air flow 616 applied by the particle removal system 606 to the particles 82. Based on the particle speed being greater than the target particle speed and the difference exceeding the threshold value, the controller 170 may decrease the air flow 616 applied by the particle removal system 606 to the particles 82. The controller 170 may control the air flow 616 provided by the particle removal system 606 such that the particle speed reaches the target particle speed (e.g., is within a threshold range of the target particle speed, where the threshold range is equal to the target particle speed plus or minus the threshold value).

Figure 20:
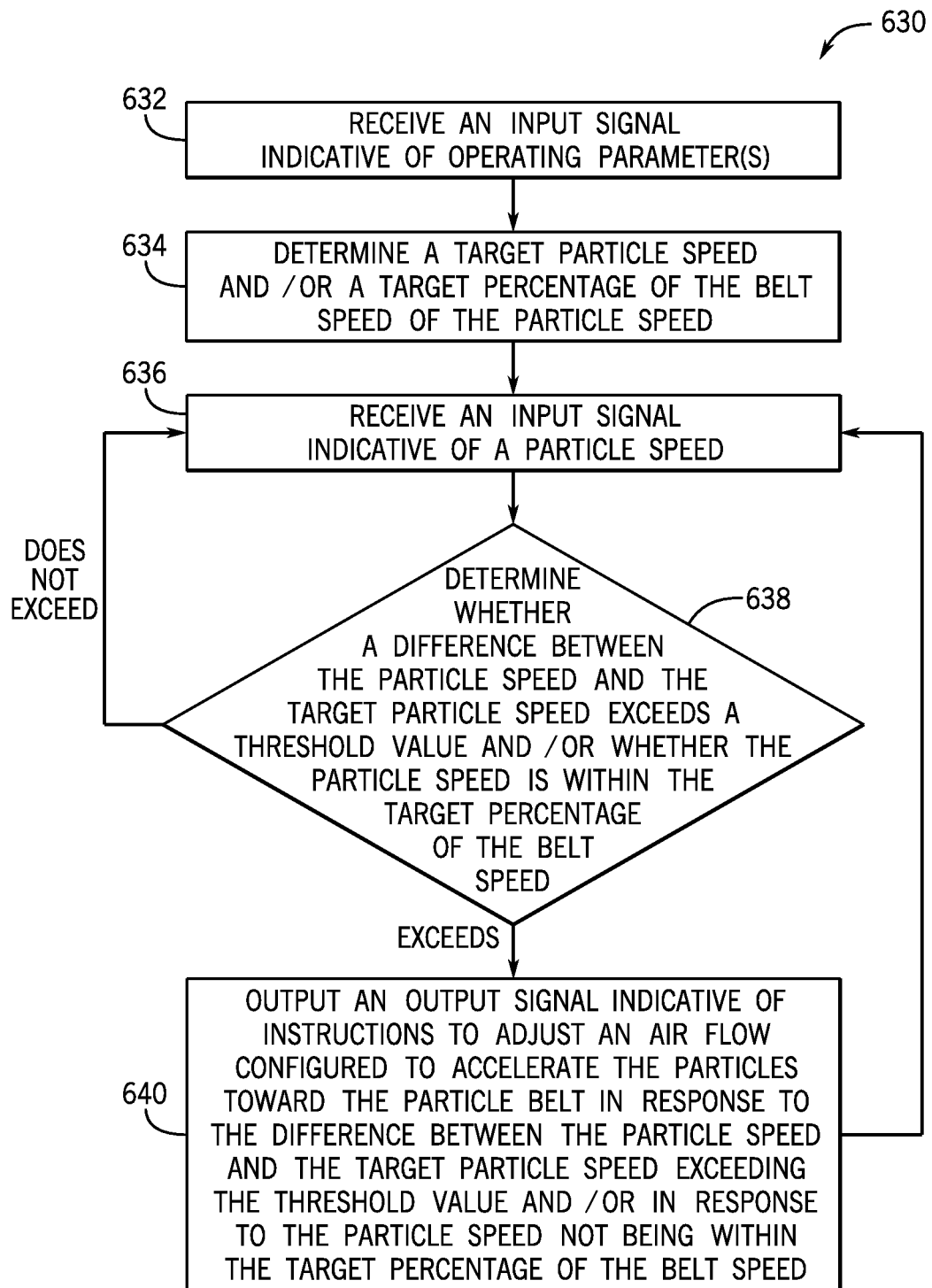
FIG. 20 is a flow diagram of an embodiment of a process for controlling a particle delivery system, in accordance with an aspect of the present disclosure.

FIG. 20 is a flow diagram of an embodiment of a process 630 for controlling the particle delivery system. For example, the process 630, or portions thereof, may be performed by the controller of the particle delivery system. The process 630 begins at block 632, in which an input signal indicative of operating parameter(s) is received. For example, the operating parameters may include the type of the particle, the ground speed of the row unit, the spacing between opposing flights of the particle belt, the length of the particle belt, the belt speed of the particle belt, or a combination thereof. The input signal may be received via the user interface communicatively coupled to the controller, may be stored in the memory of the controller, may be received via sensors of the row unit and/or the agricultural implement, may be received from a transceiver, or a combination thereof.

At block 634, the target particle speed and/or the target percentage of the belt speed of the particle belt is determined. For example, the controller may determine the target particle speed and/or the target percentage of the belt speed based on the type of the particles, the size of the particles, the ground speed of the row unit, the spacing between opposing flights of the particle belt, the length of the particle belt, or a combination thereof.

At block 636, an input signal indicative of the particle speed of each particle at the particle engagement section of the particle belt is received. For example, the controller may receive the input signal indicative of the particle speed from the particle sensor disposed generally between the particle metering and singulation unit and the particle belt and generally along the flow path. In certain embodiments, the controller may receive multiple input signals from the particle sensor, in which each input signal is indicative of a particle speed of a respective particle. The controller may determine an average of the multiple particle speeds to determine the average particle speed of the particles at the particle belt. As such, the controller may account for variance among the particle speeds of multiple particles passing along the flow path to reduce excessive control actions (e.g., adjustments to the adjustments to the air flow applied by the particle removal system).

At block 638, a determination of whether a difference between the particle speed and the target particle speed exceeds a threshold value and/or whether the particle speed is within the target percentage of the belt speed is made (e.g., by the controller). Additionally, a determination of whether the particle speed is less than or greater than the target particle speed and/or less than or greater than the belt speed is made (e.g., by the controller). The threshold value may be determined based on the type of the particles, the size of the particles, the ground speed of the row unit, the spacing between opposing flights of the particle belt, the length of the particle belt, or a combination thereof. In response to the difference exceeding the threshold value and/or the particle speed not being within the target percentage of the belt speed, the process 630 proceeds to block 640. In response to the difference not exceeding the threshold value and/or the particle speed being within the target percentage of the belt speed, the process 630 returns to block 636 and receives the next input signal indicative of the particle speed.

At block 640, in response to the difference between the particle speed and the target particle speed exceeding the threshold value and/or in response to the particle speed not being within the target percentage of the belt speed, an output signal indicative of instructions to adjust the air flow applied by the particle removal system to the particles at the apertures of the particle metering and singulation unit. For example, the controller may output an output signal indicative of instructions to increase the air flow applied by the particle removal system to the particles based on a determination that the particle speed at the particle belt is less than the target particle speed and the difference between the particle speed and the target particle speed exceeds the threshold value. Additionally or alternatively, the controller may output the output signal indicative of instructions to increase the air flow applied by the particle removal system to the particles based on a determination that the particle speed at the particle belt is less than the belt speed and is not within the target percentage of the belt speed. Further, the controller may output an output signal indicative of instructions to decrease the air flow applied by the particle removal system to the particles based on a determination that the particle speed at the particle belt is greater than the target particle speed and the difference between the particle speed and the target particle speed exceeds the threshold value. Additionally or alternatively, the controller may output the output signal indicative of instructions to decrease the air flow applied by the particle removal system to the particles based on a determination that the particle speed at the particle belt is greater than the belt speed and is not within the target percentage of the belt speed.

After completing block 640, the process 630 returns to block 636 and receives the next input signal indicative of the particle speed of the particle at the particle engagement section of the particle belt. The next determination is made of whether the difference between the particle speed and the target particle speed exceeds the threshold value and/or whether the particle speed is within the target percentage of the belt speed (e.g., block 638), and the air flow applied by the particle removal system to the particles is adjusted in response to the determination(s). As such, blocks 636-640 of the process 630 may be iteratively performed (e.g., by the controller of the particle delivery system and/or by another suitable controller) to facilitate transfer of the particles from the particle metering and singulation unit to the particle belt. In some embodiments, certain blocks of the blocks 632-640 may be omitted from the process 630 and/or the order of the blocks 632-640 may be different.

Figure 21:
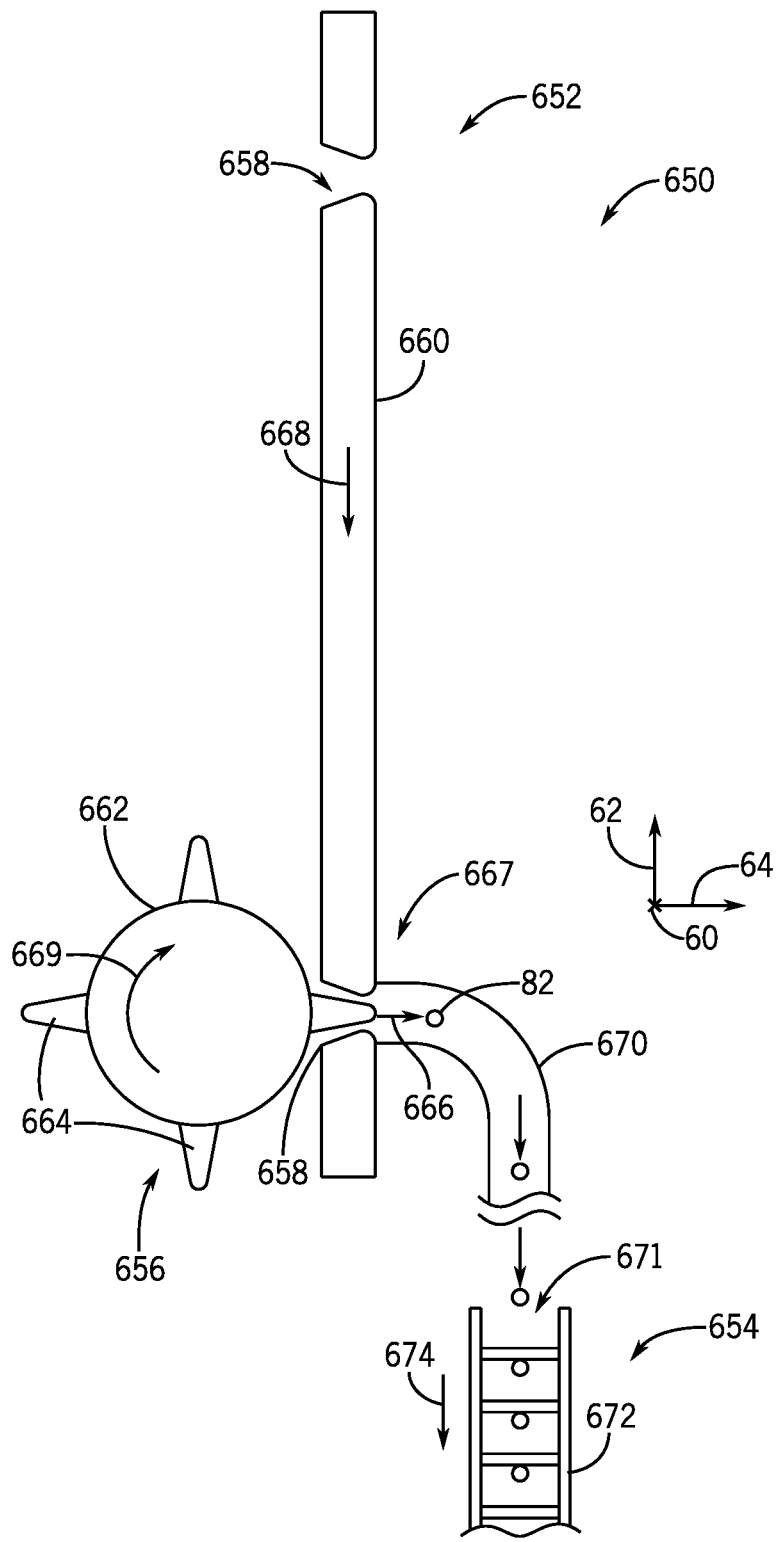
FIG. 21 is a cross-sectional view of an embodiment of a particle delivery system that may be employed within the row unit of FIG. 2, in accordance with an aspect of the present disclosure.

FIG. 21 is a cross-sectional view of an embodiment of a particle delivery system 650 that may be employed within the row unit of FIG. 2. The particle delivery system 650 includes a particle metering and singulation unit 652 configured to meter the particles 82 from a particle storage area toward a particle belt assembly 654. Additionally, the particle delivery system 650 includes a particle removal system 656 configured to remove the particles 82 from apertures 658 of a disc 660 of the particle metering and singulation unit 652.

As illustrated, the particle removal system 656 includes a wheel 662 having pegs 664 extending radially outward from a central portion of the wheel. The wheel 662 is configured to rotate generally about the longitudinal axis 60, and the pegs 664 are configured to engage the apertures 658 to drive the particles 82 out of the apertures 658, as indicated by arrow 666, at a release point 667 of the particle metering and singulation unit 652. For example, as the disc 660 rotates, as indicated by arrow 668, the wheel 662 may rotate, as indicated by arrow 669, to cause the pegs 664 to move into and out of respective apertures 658. The pegs 664 are configured to drive the particles 82 out of the apertures as the pegs move into the apertures 658. After being separated from the disc 660, each particle 82 may flow through a particle tube 670 to a particle engagement section 671 of a particle belt 672 of the particle belt assembly 654. The particle belt 672 is configured to rotate, as indicated by arrow 674, to transfer the particles 82 to the trench in soil.

Figure 22:
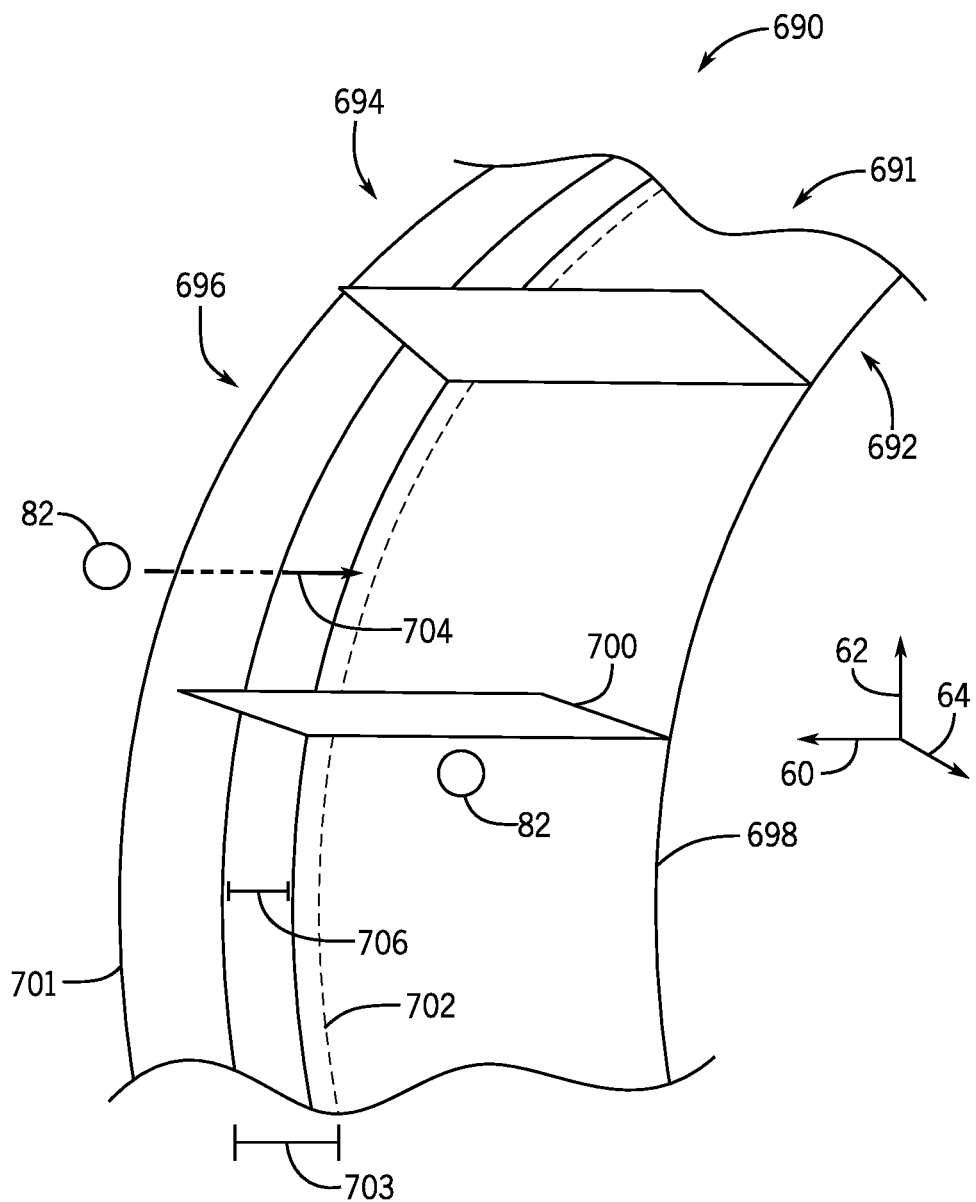
FIG. 22 is a perspective view of a portion of an embodiment of a particle delivery system, which may be employed within the row unit of FIG. 2, having a particle belt and a particle belt housing, in accordance with an aspect of the present disclosure.

FIG. 22 is a perspective view of a portion of an embodiment of a particle delivery system 690, which may be employed within the row unit of FIG. 2, having a particle belt assembly 691. The particle belt assembly 691 includes a particle belt 692 and a particle belt housing 694. As illustrated, the particle belt housing 694 includes a side panel 696 disposed laterally adjacent to the particle belt 692. In certain embodiments, the particle belt housing includes a side panel disposed generally opposite of the illustrated side panel along the lateral axis 64. The particle belt 692 includes a base 698 and flights 700 extending from the base 698. The side panel 696 of the particle belt housing 694 includes a first panel portion 701 and a second panel portion 702. The second panel portion 702 is positioned behind the particle belt 692 in the illustrated embodiment. Additionally, a gap 703 is formed between the first panel portion 701 and the second panel portion 702 and is configured to enable a flow 704 of the particles 82 into the particle belt housing 694 and onto the particle belt 692. For example, the particles 82 may flow from a particle metering and singulation unit and/or through a particle tube to the particle belt assembly 691. The particles 82 may enter the particle belt housing 694 through the gap 703 and move to a position on the base 698 of the particle belt 692 between adjacent flights 700, as illustrated.

In certain embodiments, the particles 82 may accelerate radially outwardly from the base 698 and along the flights 700 as the particle belt 692 rotates. For example, a centrifugal force on the particles 82 (e.g., due to the weight of the particles 82) as the particles 82 rotate around an end portion of the particle belt 692 may cause the particles 82 to accelerate radially outwardly. The radial acceleration of the particles 82 may facilitate depositing the particles 82 into the trench by increasing the speed of the particles 82 at an outlet of the particle belt housing 694 (e.g., adjacent to the end portion of the particle belt 692), thereby reducing a difference between the particle speed of the particles 82 and a ground speed of the row unit.

Figure 23:
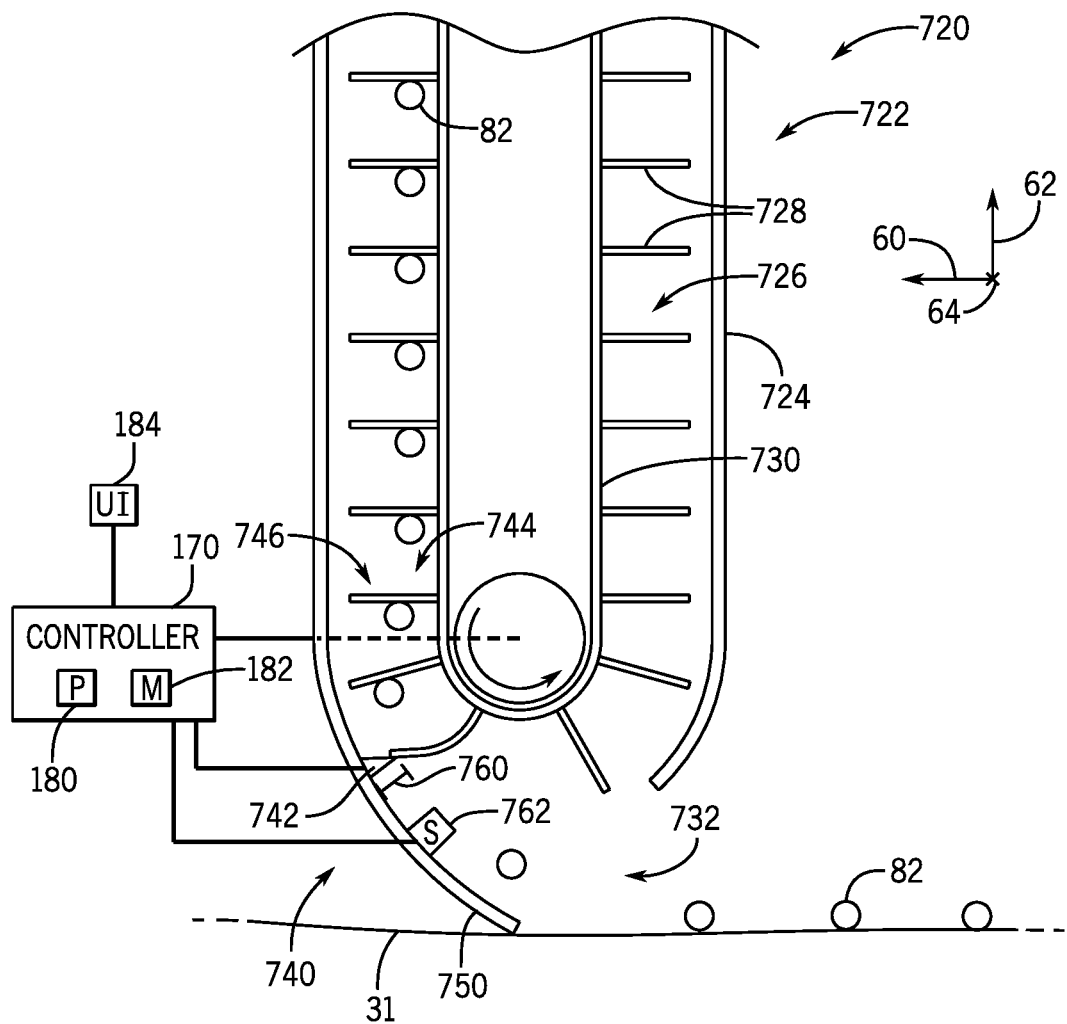
FIG. 23 is a cross-sectional view of a portion of an embodiment of a particle delivery system that may be employed within the row unit of FIG. 2, in accordance with an aspect of the present disclosure.

FIG. 23 is a cross-sectional view of a portion of an embodiment of a particle delivery system 720 that may be employed within the row unit of FIG. 2. The particle delivery system 720 includes a particle belt assembly 722 configured to receive the particles 82 from a particle metering and singulation unit. In certain embodiments, the particle delivery system 720 may include the particle metering and singulation unit. The particle belt assembly 722 includes a particle belt housing 724 and a particle belt 726 disposed within the particle belt housing 724. The particle belt 726 is configured to rotate to transfer and accelerate the particles 82 received from the particle metering and singulation unit (e.g., at a particle transfer section of the particle delivery system 720) toward the trench 31. The particle belt 726 includes a base 730 and flights 728 extending outwardly from the base. The particle belt 726 may receive each particle 82 between a respective pair of opposing flights 728 (e.g., at an engagement point of a particle engagement section of the particle belt 726). The particles 82 are expelled from a particle exit section 732 of the particle belt 726 toward a trench 31 in soil.

The particle delivery system 720 includes a flex system 740 configured to selectively flex (e.g., bend and/or move) each flight 728 as the flight 728 passes the flex system 740. As the flight 728 disengages the flex system 740, the flight substantially returns to an original state, thereby accelerating the particle 82 from the particle exit section 732 of the particle belt 726 and toward the trench 31. As such, the flights 728 are configured to temporarily flex. The acceleration of the particle 82 reduces a difference between the particle speed of the particle 82 and a ground speed of the row unit. The flex system 740 includes a protrusion 742 coupled (e.g., movably coupled) to the particle belt housing 724 and configured to contact each flight 728. As illustrated, each flight 728 includes a first end portion 744 coupled to/interfacing with the base 730 and a second end portion 746 disposed substantially opposite the first end portion 744 and configured to contact the protrusion 742. As the protrusion 742 contacts the second end portion 746, the flight 728 is driven to flex/bend. For example, each flight 728 and/or the base 730 of the particle belt 726 may be formed from a resilient and flexible material (e.g., rubber, plastic, fabric, other materials, or a combination thereof) that enables the flight 728 to flex in response to contact with the protrusion. In certain embodiments, the second end portion 746 may be configured to flex between zero degrees and thirty degrees, between five degrees and twenty-five degrees, between ten degrees and twenty degrees, and/or other suitable amount relative to the first end portion 744 in response to contact between the flight 728 and the protrusion 742.

As the flight 728 disengages the protrusion 742, the second end portion 746 substantially returns to its previous (e.g., original) position relative to the first end portion 744. As a result, the flight 728 applies a force to the particle 82 to accelerate the particle 82, thereby increasing the particle speed of the particle 82 relative to the row unit as the particle 82 is expelled from the particle exit section 732 and out of the particle belt housing 724. The increased particle speed may reduce the particle speed of the particle 82 relative to the soil, thereby enabling the row unit to travel faster than traditional embodiments. The particle belt housing 724 includes a housing flange 750 configured to extend generally parallel to the trench 31 and to at least partially guide the particle 82 toward the trench 31. For example, each particle 82 may contact the housing flange 750 and may be directed along the trench 31, which may enable the particle delivery system to accurately deposit each particle 82 into the trench 31 at the particle speed described above. In certain embodiments, the housing flange 750 may be omitted from the particle delivery system 720.

As illustrated, the protrusion 742 extends a length 760 from the particle belt housing 724 toward the base 730 of the particle belt 726 (e.g., the length 760 extends radially inwardly from the particle belt housing 724 toward the base 730 of the particle belt 726). The length 760 may be adjustable to control the force applied by the flight 728 to the particle 82, thereby controlling a particle exit speed of the particle 82 expelled from the particle exit section 732 of the particle belt 726. For example, to generally increase the force/particle exit speed, the length 760 may be increased. To generally decrease the force/particle exit speed, the length 760 may be decreased.

To facilitate accelerating the particles 82 to a target particle exit speed, the controller 170 of the particle delivery system 720 is configured to control the flex system 740. For example, the controller 170 may control the length 760 that the protrusion 742 of the flex system 740 extends into the interior of the particle belt housing 724. For example, the controller 170 may receive an input signal (e.g., a sensor signal) indicative of the particle exit speed adjacent to the particle exit section 732 from a particle sensor 762 disposed generally adjacent to the particle exit section 732. The controller 170 may also receive an input signal indicative of the belt speed of the particle belt 726, and/or the controller 170 may determine the belt speed of the particle belt 726. In certain embodiments, the particle delivery system may include the belt sensor configured to output the input signal indicative of the belt speed of the particle belt. The controller 170 may set the belt speed of the particle belt 726 (e.g., output an output signal indicative of instructions to adjust the belt speed of the particle belt 726 to a target belt speed) based on the type of the particles 82, the size (e.g., the nominal and/or the average size) of the particles 82, the ground speed of the row unit, a spacing between the flights 728 of the particle belt 726, a length of the particle belt 726, or a combination thereof. The controller 170 may determine the target particle exit speed at least partially based on the set belt speed of the particle belt 392 and/or based on feedback from the belt sensor. In certain embodiments, the controller 170 may determine other information related to the particles 82 based on feedback from the sensor 762, such as skips (e.g., the particle 82 not being present during an expected time period), multiple particles 82 (e.g., multiple particles 82 being present when only a single particle 82 is expected), an amount of particles 82 deposited over a given area (e.g., an amount of particles 82 deposited per acre), and other information related to the particles 82. In some embodiments, the controller 170 may control the particle delivery system based on such determinations.

The controller 170 may compare the particle exit speed of each particle 82 to a target particle exit speed to determine whether the particle exit speed is less than or greater than the target particle exit speed and/or whether a difference between the particle exit speed and the target particle exit speed is greater than a threshold value. In response to a determination that the particle exit speed is less than the target particle exit speed and that the difference between the particle exit speed and the target particle exit speed is greater than the threshold value, the controller 170 may output an output signal indicative of instructions to increase the length 760 of the protrusion 742 (e.g., to extend the protrusion 742 toward the base 730 of the particle belt 726). The increase in the length 760 of the protrusion 742 may increase the flexing of the flight 728, which may increase the particle exit speed. In response to a determination that the particle exit speed is greater than the target particle exit speed and that the difference between the particle exit speed and the target particle exit speed is greater than the threshold value, the controller 170 may output an output signal indicative of instructions to decrease the length 760 of the protrusion 742 (e.g., to retract the protrusion 742 away from the base 730 of the particle belt 726). The decrease in the length 760 of the protrusion 742 may decrease the flexing of the flight 728, which may decrease the particle exit speed.

Figure 24:
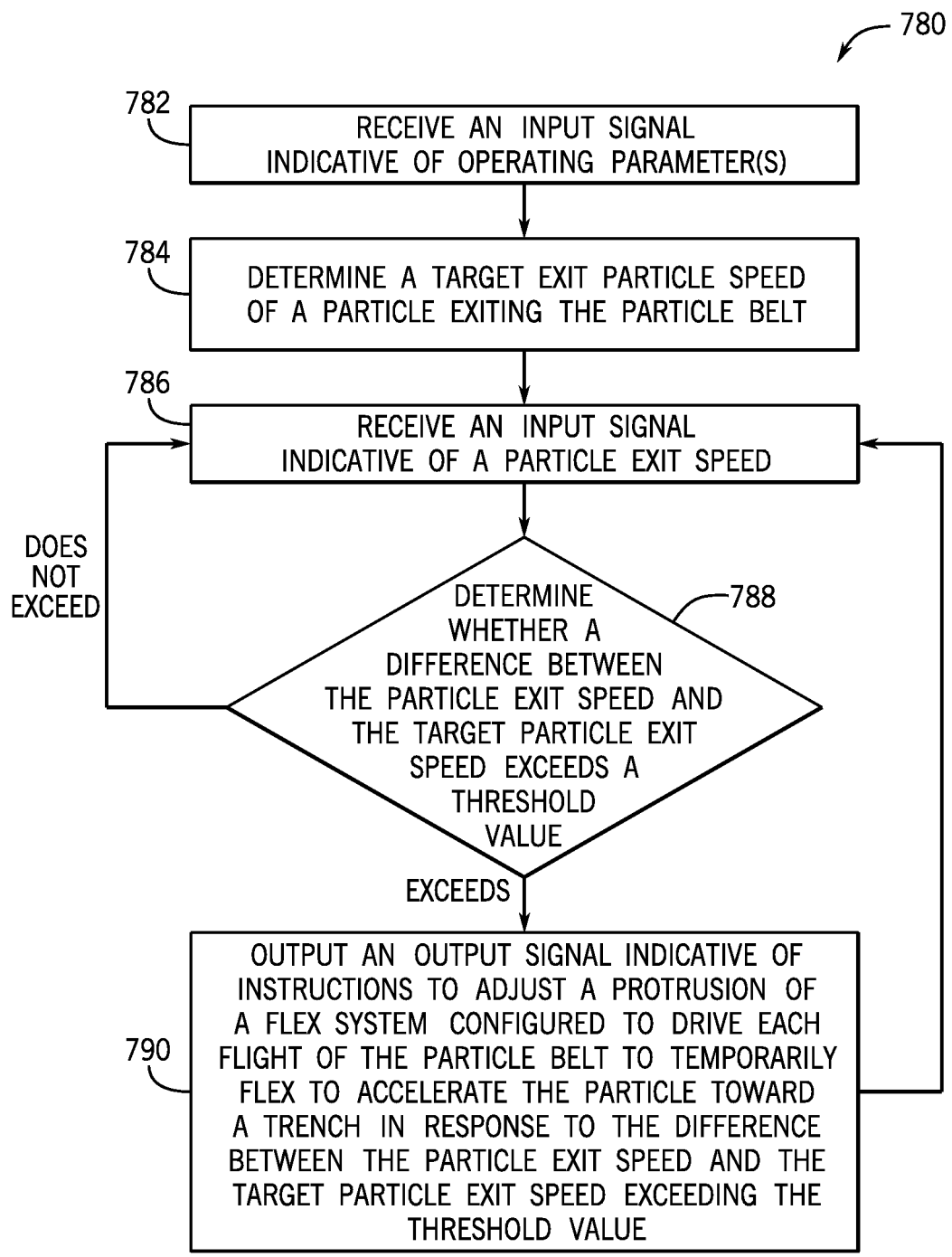
FIG. 24 is a flow diagram of an embodiment of a process for controlling a particle delivery system, in accordance with an aspect of the present disclosure.

FIG. 24 is a flow diagram of an embodiment of a process 780 for controlling the particle delivery system. For example, the process 780, or portions thereof, may be performed by the controller of the particle delivery system. The process 780 begins at block 782, in which an input signal indicative of operating parameter(s) is received. For example, the operating parameters may include the type of the particle, the ground speed of the row unit, the spacing between opposing flights of the particle belt, the length of the particle belt, the belt speed of the particle belt, or a combination thereof. The input signal may be received via the user interface communicatively coupled to the controller, may be stored in the memory of the controller, may be received via sensors of the row unit and/or the agricultural implement, may be received from a transceiver, or a combination thereof.

At block 784, the target particle exit speed of the particles is determined. For example, the controller may determine the target particle exit speed based on the type of the particles, the size of the particles, the ground speed of the row unit, the spacing between opposing flights of the particle belt, the length of the particle belt, or a combination thereof. The target particle exit speed may be any suitable particle speed, such as one kph, two kph, three kph, four kph, five kph, seven kph, ten kph, fifteen kph, twenty kph, between one kph and twenty kph, between five kph and fifteen kph, etc.

At block 786, an input signal indicative of the particle exit speed of each particle expelled from the particle exit section of the particle belt is received. For example, the controller may receive the input signal indicative of the particle exit speed from the particle sensor disposed adjacent to the particle exit section. In certain embodiments, the controller may receive multiple input signals from the particle sensor, in which each input signal is indicative of a particle exit speed of a respective particle. The controller may determine an average of the multiple particle exit speeds to determine an average particle exit speed of the particles expelled from the particle exit section. As such, the controller may account for variance among the particle exit speeds of multiple particles passing along the flow path to reduce excessive control actions (e.g., adjustments to the length of the protrusion of the flex system).

At block 788, a determination of whether the difference between the particle exit speed and the target particle exit speed exceeds the threshold value is made (e.g., by the controller). Additionally, a determination of whether the particle exit speed is less than or greater than the target particle exit speed is made (e.g., by the controller). The threshold value may be determined based on the type of the particles, the size of the particles, the ground speed of the row unit, the spacing between opposing flights of the particle belt, the length of the particle belt, or a combination thereof. In response to the difference exceeding the threshold value, the process 780 proceeds to block 790. In response to the difference not exceeding the threshold value, the process 780 returns to block 786 and receives the next input signal indicative of the particle exit speed.

At block 790, in response to the difference between the particle exit speed and the target particle exit speed exceeding the threshold value, an output signal indicative of instructions to adjust the length of the protrusion of the flex system is provided. For example, the controller may output an output signal indicative of instructions to increase the length of the protrusion based on a determination that the particle speed is less than the target particle speed and the difference between the particle speed and the target particle speed exceeds the threshold value. Additionally or alternatively, the controller may output an output signal indicative of instructions to decrease the length of the protrusion based on a determination that the particle exit speed is greater than the target particle exit speed and the difference between the particle exit speed and the target particle exit speed exceeds the threshold value.

After completing block 790, the process 780 returns to block 786 and receives the next input signal indicative of the particle exit speed of the particles expelled from the particle exit section of the particle belt. The next determination is made of whether the difference between the particle exit speed and the target particle exit speed exceeds the threshold value (e.g., block 788), and the length of the protrusion of the flex system is adjusted in response to the determination(s) (e.g., block 790). As such, blocks 786-790 of the process 780 may be iteratively performed (e.g., by the controller of the particle delivery system and/or by another suitable controller) to facilitate delivery of the particles from the particle belt toward the trench in the soil. In some embodiments, certain blocks of the blocks 342-350 may be omitted from the process 340 and/or the order of the blocks 342-350 may be different.

Figure 25:
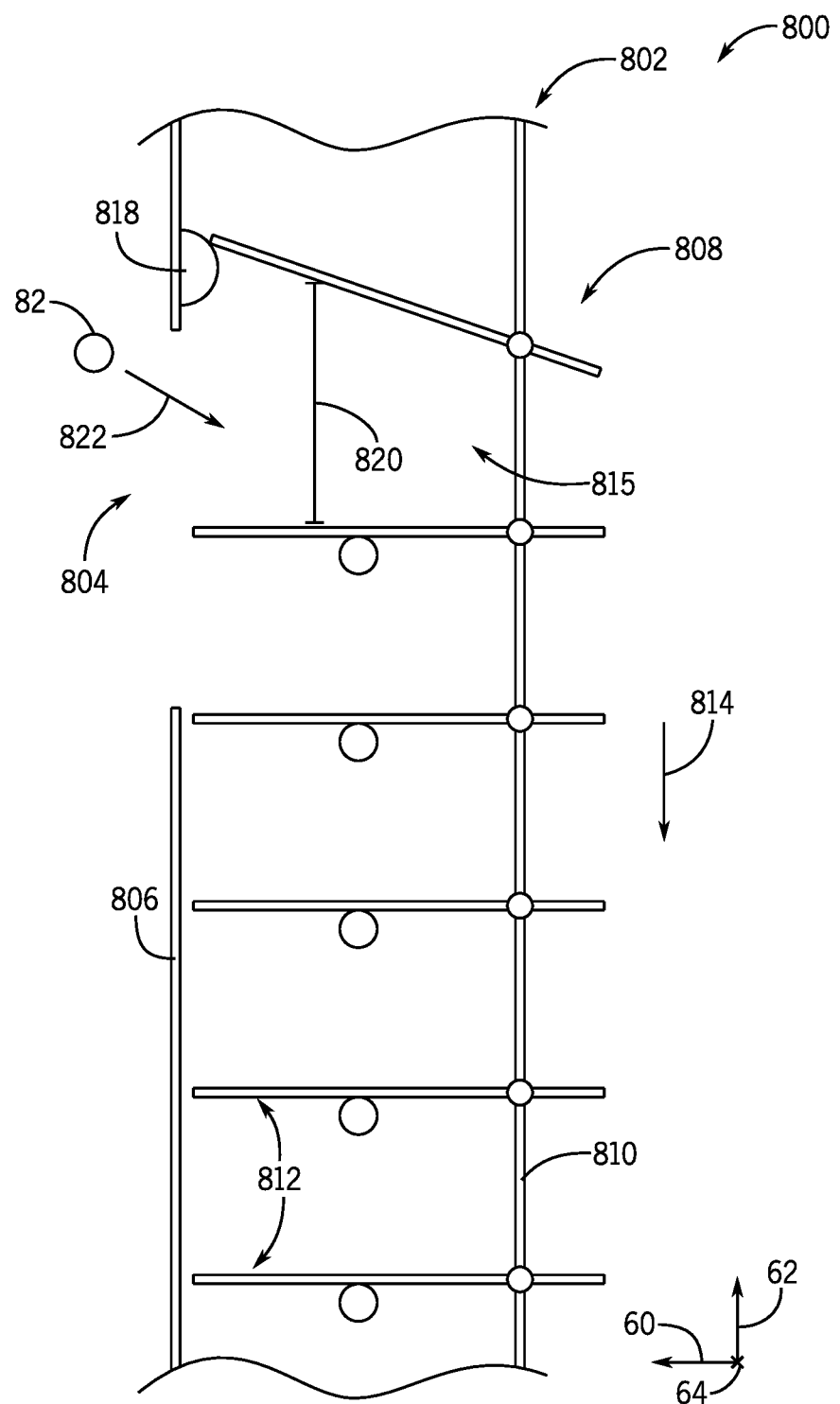
FIG. 25 is a cross-sectional view of an embodiment of a particle transfer section of a particle delivery system that may be employed within the row unit of FIG. 2, in accordance with an aspect of the present disclosure.

FIG. 25 is a cross-sectional view of an embodiment of a particle transfer section 804 of a particle delivery system 800 that may be employed within the row unit of FIG. 2. The particle delivery system 800 includes a particle belt assembly 802. At the particle transfer section 804, the particle belt assembly 802 is configured to receive the particles 82 from a particle metering and singulation unit. In certain embodiments, the particle delivery system 800 includes the particle metering and singulation unit. The particle belt assembly 802 includes a particle belt housing 806 and a particle belt 808 disposed within the particle belt housing 806. The particle belt 808 includes a base 810 and flights 812 coupled to the base 810. Each pair of opposing flights 812 is configured to receive a respective particle 82 and to move the respective particle 82 downwardly in a direction 814, to transfer the particle 82 from the particle transfer section 804 toward the trench in the soil. For example, the particle belt 808 is configured to receive the particle 82 at a particle engagement section 815 of the particle belt 808 and of the particle transfer section 804.

As illustrated, each flight 812 is pivotally coupled to the base 810 at a pivot point 816. A protrusion 818 coupled to the particle belt housing 806 is configured to engage each flight 812 as the flights 812 move in the direction 814. Contact between the protrusion 818 and the flight 812 drives the flight 812 to pivot/rotate about the pivot point 816. The pivoting motion of each flight 812 increases a gap 820 between opposing flights 812 at the particle transfer section 804, thereby facilitating transfer of the particles 82 onto the particle belt 808. After passing by the protrusion 818 and after pivoting, the flight 812 is configured to return to its original position. Additionally, each flight 812 is generally biased to the original position such that the flight 812 is configured to be disposed in the original position when not contacting the protrusion 818 or pivoting as a result of contacting the protrusion 818. In certain embodiments, the flights of the particle belt may be flexibly coupled to the base and not configured to pivot relative to the base. For example, the protrusion may cause the flights to flex to increase the gap between opposing flights. After contacting the protrusion, the flexible flights may return to their original position.

Figure 26:
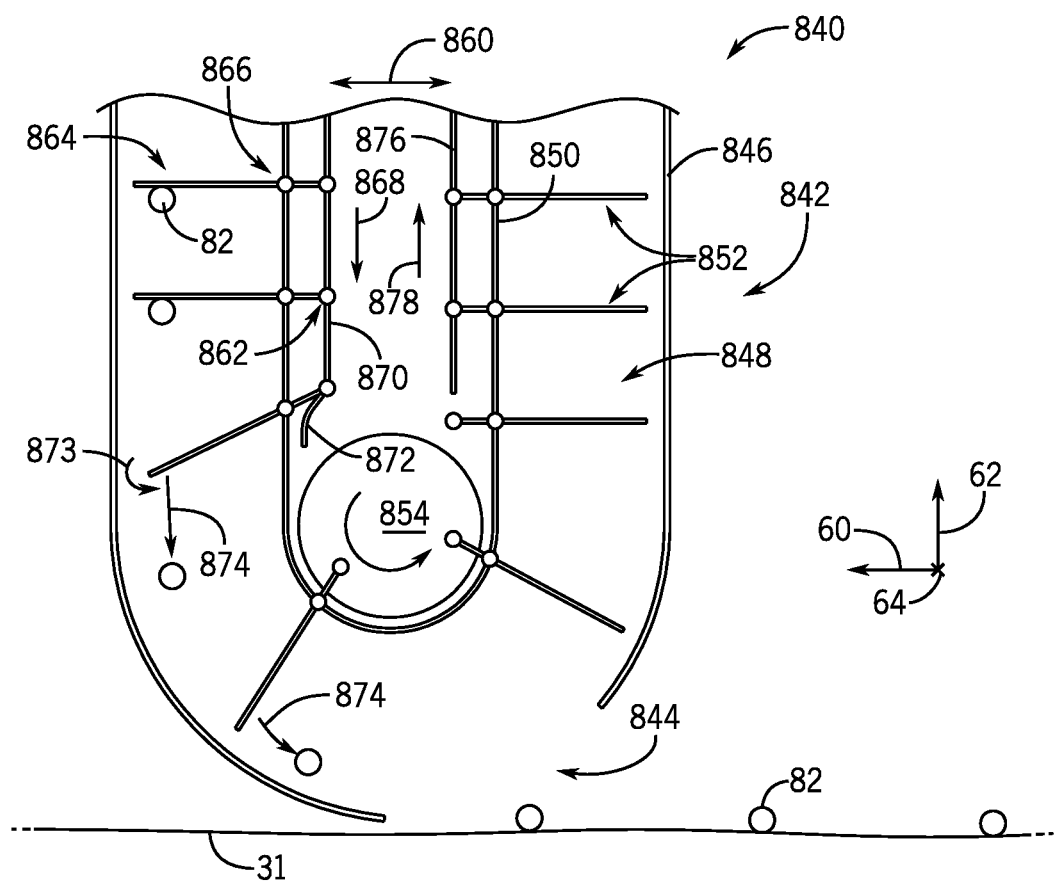
FIG. 26 is a cross-sectional view of an embodiment of a particle exit section of a particle delivery system that may be employed within the row unit of FIG. 2, in accordance with an aspect of the present disclosure.

FIG. 26 is a cross-sectional view of an embodiment of a particle exit section 844 of a particle delivery system 840 that may be employed within the row unit of FIG. 2. The particle delivery system 840 includes a particle belt assembly 842. At the particle exit section 844, the particle belt assembly 842 is configured to deliver the particles 82 to the trench 31 in the soil. The particle belt assembly 842 includes a particle belt housing 846 and a particle belt 848 disposed within the particle belt housing 846. The particle belt 848 includes a base 850 and flights 852 coupled (e.g., pivotally coupled) to the base 850. Each pair of opposing flights 852 is configured to receive a respective particle 82 and to move the particle 82 downwardly to the particle exit section 844. As illustrated, the particle belt assembly 842 expels the particle 82 toward the trench 31 at the particle exit section 844. For example, a wheel 854 of the particle delivery system 840 is coupled to the base 850 and is configured to drive/enable the particle belt 848 to turn/rotate.

As illustrated, the particle delivery system 840 includes a flight track 860 disposed within the particle belt housing 846. Each flight 852 has a first end portion 862 moveably coupled to the flight track 860, a second end portion 864 disposed substantially opposite the first end portion 862, and a pivot point 866 pivotally coupling the flight 852 to the base 850. The pivot point 866 is disposed between the first end portion 862 and the second end portion 864 of the flight 852. As the base 850 of the particle belt 848 moves the flights 852 in a direction 868, the first end portion 862 of each flight 852 moves along and follows the flight track 860. The flight track 860 includes a straight portion 870 extending generally parallel to the base 850 and a curved portion 872 extending from the straight portion 870 generally toward the base 850. As the flights 852 move generally downwardly in the direction 868, the first end portion 862 of each flight 852 moves along the straight portion 870 of the flight track 860. At the curved portion 872 of the flight track 860, the first end portion 862 of each flight 852 moves generally toward the base 850, thereby driving the flight 852 to pivot about the respective pivot point 866. The pivoting motion of the flight 852 may cause the second end portion 864 of the flight 852 to rotate/move in a direction 873, thereby driving the particle 82 to accelerate in the direction 874. As a result, the particle exit speed of the particle 82 is increased. After the flight 852 accelerates the particle 82 in the direction 874, the first end portion 862 of the flight 852 may exit the curved portion 872 of the flight track 860. After passing through the particle exit section 844, the first end portion 862 of each flight 852 may return to a second straight portion 876 of the flight track 860 disposed generally opposite the first straight portion 870 along the generally along the vertical axis 62 and may move generally upwardly in a direction 878. The acceleration of the particles 82 at the particle exit section 844, via the pivoting motion of the flights 852, may facilitate depositing the particles 82 toward the trench 31 in the soil. For example, the acceleration of the particles 82 may reduce a difference between the particle speed of the particles 82 and a ground speed of the row unit having the particle delivery system 840, thereby enabling the row unit to travel faster than embodiments lacking the particle delivery system 840.

In certain embodiments, the flight track may extend along the end portion of the particle belt such that the flights remain coupled to the flight track while moving along the end portion of the particle belt. For example, the flight track may include a curved portion that causes the flights to pivot relative to the base of the particle belt as the flights move around the curved portion. Additionally or alternatively, the flight track may be integrally formed within the particle belt housing of the particle belt assembly. In some embodiments, the pivot joints between the flights and the base of the particle belt may be a flexible connection, such that the flights may be configured to flex while moving along the flight track to accelerate the particles through the particle exit section.

Figure 27:
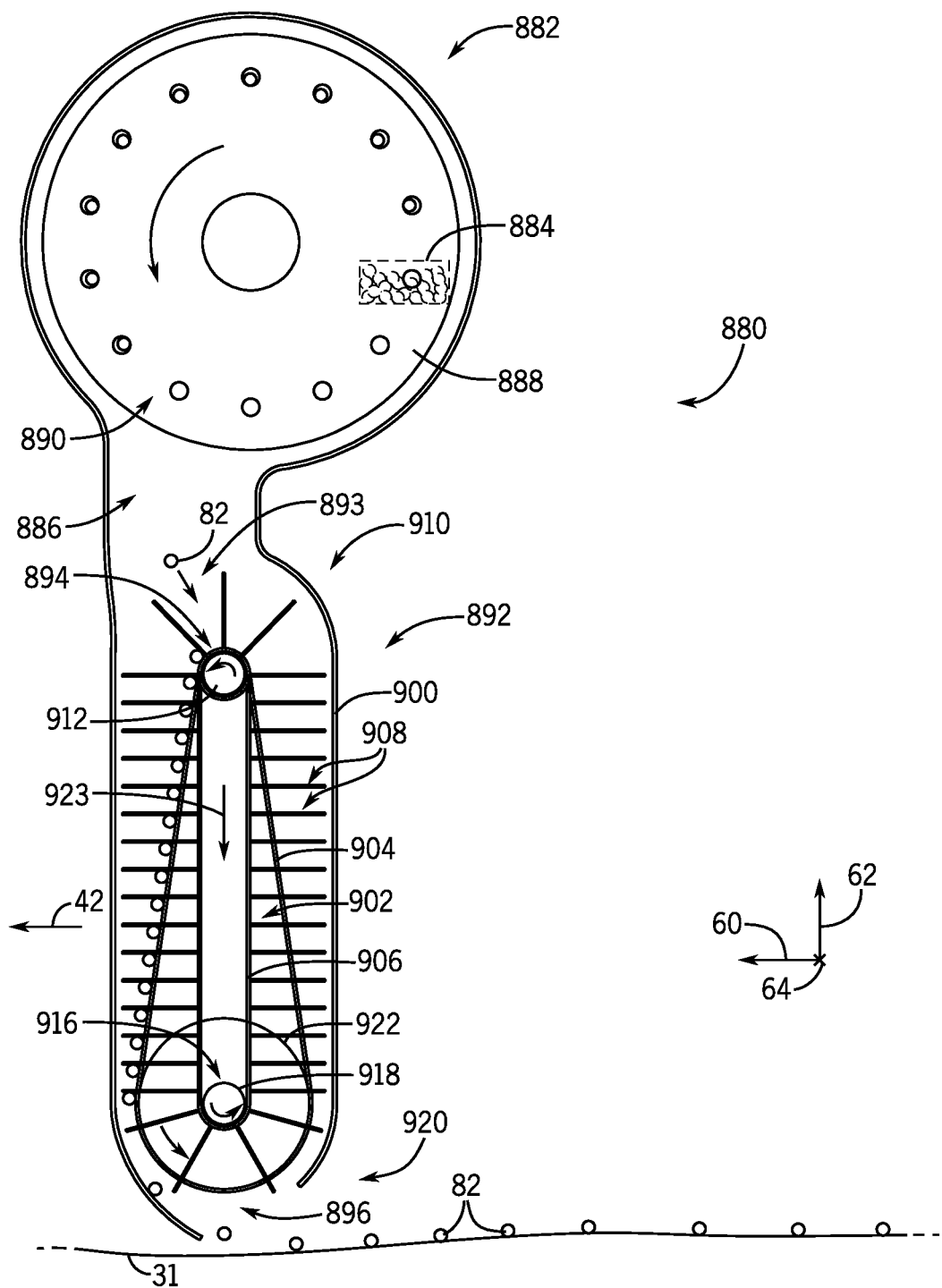
FIG. 27 is a cross-sectional view of an embodiment of a particle delivery system that may be employed within the row unit of FIG. 2, in accordance with an aspect of the present disclosure.

FIG. 27 is a cross-sectional view of an embodiment of a particle delivery system 880 that may be employed within the row unit of FIG. 2. The particle delivery system 880 includes a particle metering and singulation unit 882 configured to meter and transfer the particles 82 from a particle storage area 884 toward a particle transfer section 886 of the particle delivery system 880. At the particle transfer section 886, a disc 888 of the particle metering and singulation unit 882 is configured to release the particles 82 (e.g., at a release point 890 of the particle metering and singulation unit 882 and of the particle transfer section 886) toward a particle belt assembly 892. The particle belt assembly 892 includes a particle engagement section 893 configured to receive the particles 82 (e.g., at an engagement point 894 of the particle belt assembly 892 and of the particle engagement section 983) and a particle exit section 896 configured to expel the particles 82 toward the trench 31 in soil.

The particle belt assembly 892 includes a particle belt housing 900, an inner particle belt 902 (e.g., a first particle belt), and an outer particle belt 904 (e.g., a second particle belt). As illustrated, the inner particle belt 902 and the outer particle belt 904 are disposed within the particle belt housing 900. The inner particle belt 902 includes a base 906 and flights 908 extending from the base 906. The flights 908 are configured to extend through the outer particle belt 904. For example, as described in greater detail below, the outer particle belt 904 may include apertures through which the flights 908 extend. At an end portion 910 of the particle belt assembly 892, the inner particle belt 902 and the outer particle belt 904 are engaged with a first wheel 912 configured to drive/enable the inner particle belt 902 and the outer particle belt 904 to turn/rotate. Additionally, the inner particle belt 902 is engaged with a second wheel 918 at an end portion 916 of inner particle belt, and the outer particle belt 904 is engaged with a third wheel 922 at an end portion 920 of the outer particle belt. In certain embodiments, the second wheel 918 and the third wheel 922 may be non-rotatably coupled to one another. The inner particle belt 902 and the outer particle belt 904 form the particle engagement section 893 of the particle belt assembly 892 at the end portion 910 of the particle belt assembly 892 configured to receive the particles 82 from the particle metering and singulation unit 882. Additionally, the inner particle belt 902 and the outer particle belt 904 form the particle exit section 896 of the particle belt assembly 892 configured to expel the particles 82 toward the trench 31. In certain embodiments, only the inner particle belt or the outer particle belt may include the particle engagement section and/or the particle exit section. The first wheel 912, the second wheel 918, and the third wheel 922 may include gear(s), pulley(s), other suitable systems configured to engage with and drive rotation of the particle belts, or a combination thereof. In certain embodiments, the flights 908 of the inner particle belt 902 may be rigid, and the outer particle belt 904 may be configured to stretch at areas between the apertures, such that the flights 908 cause the outer particle belt 904 to stretch at the areas between the apertures at the end portion 920.

Each pair of opposing flights 908 of the inner particle belt 902 is configured to receive a respective particle 82 at the particle engagement section 893 (e.g., at the engagement point 894) of the particle belt assembly 892, and the inner particle belt 902 is configured to rotate to transfer the particle 82 from the particle engagement section 893 toward the particle exit section 896. At the particle engagement section 893 (e.g., at the engagement point 894), each particle 82 may be received by opposing flights 908, such that the particle 82 is positioned adjacent to the outer particle belt 904. As each flight 908 drives a respective particle 82 to move downwardly in a direction 923 from the end portion 910 toward the trench 31, the outer particle belt 904 drives the particles 82 outwardly away from the base 906 of the inner particle belt 902 and toward the particle belt housing 900. As illustrated, the third wheel 922 coupled to the outer particle belt 904 is larger than the second wheel 918 coupled to the inner particle belt 902 (e.g., a diameter of the third wheel 922 is larger than a diameter of the second wheel 918). The third wheel 922 is configured to cause the outer particle belt 904 to move outwardly along the flights 908 away from the base 906 to drive the particles 82 outwardly along the flights 908. The outward movement of the particles 82 caused by the outer particle belt 904 is configured to facilitate deposition of the particles 82 toward the trench 31 by accelerating the particles 82. For example, while disposed along the flights 908 adjacent to the particle belt housing 900 and while rotating around the end portions 916 and 920 of the inner particle belt 902 and the outer particle belt 904, respectively, an acceleration of the particles 82 may be greater than while the particles 82 are disposed adjacent to the base 906 of the inner particle belt 902. The acceleration of the particles 82 by the particle delivery system 880 may facilitate depositing the particles 82 toward the trench 31 in the soil. For example, the acceleration of the particles 82 may reduce a difference between the particle speed of the particles 82 and a ground speed of the row unit having the particle delivery system 880, thereby enabling the row unit to travel faster than embodiments lacking the particle delivery system 880. The particle delivery system 880 may accelerate each particle 82 to a target particle exit speed, such as one kph, two kph, three kph, four kph, five kph, seven kph, ten kph, fifteen kph, twenty kph, between one kph and twenty kph, between five kph and fifteen kph, etc.

In certain embodiments, the particle delivery system 880 may include the controller configured to control a belt speed of the inner particle belt 902 and/or the outer particle belt 904, such that the particle exit speed reaches the target particle exit speed. For example, the controller may receive a sensor signal indicative of the particle exit speed, may compare the particle exit speed to the target particle exit speed, and may control motor(s) configured to drive rotation of the first wheel 912, the second wheel 918, and/or the third wheel 922 based on a difference between the particle exit speed and the target particle exit speed exceeding a threshold value.

FIG. 28 is a top cross-sectional view of the inner particle belt 902 coupled to the second wheel 918 and the outer particle belt 904 coupled to the third wheel 922 of the particle delivery system of FIG. 27. As illustrated, the third wheel 922 includes wheel portions 924 and 926, and the second wheel 918 is disposed adjacent to the wheel portions 924 and 926 (e.g., along the lateral axis 64). In certain embodiments, the second wheel 918 may be coupled to the third wheel 922, and/or the second wheel 918 and the third wheel 922 may share a common drive shaft. The outer particle belt 904 is configured to move each particle 82 along the flights 908 from a first end portion 928 of each flight 908 toward a second end portion 930 of each flight 908 (e.g., along the longitudinal axis 60) to increase the particle speed of each particle 82, thereby facilitating deposition of the particle 82 to the trench in the soil.

FIG. 29 is a front view of the outer particle belt 904 of the particle delivery system of FIG. 27. The outer particle belt 904 includes a base 940 and apertures 942 formed within the base 940. The flights of the inner particle belt are configured to extend through the apertures 942 of the outer particle belt 904. For example, at the end portion 910 of the outer particle belt 904, the base 940 may be disposed adjacent to the base of the inner particle belt. As the inner particle belt 902 and the outer particle belt 904 rotate, the flights initially disposed at the end portion 910 move downwardly toward the end portion 920 of the inner particle belt 902 and the outer particle belt 904 and the trench in the soil. In addition, the base 940 moves outwardly along the flights to drive the particle positioned between opposing flights outwardly.

As illustrated, an area 944 between each pair of apertures 942 is configured to stretch (e.g., extend in length along the longitudinal axis 60 and/or along the vertical axis 62) as the area 944 moves downwardly from the end portion 910 toward the end portion 920. For example, a portion 946 of the base 940 adjacent to and/or surrounding each aperture 942 may be significantly more rigid than the area 944, such that the portion 946 does not stretch (e.g., while the area 944 does stretch). Additionally, as described above, the flight of the inner particle belt may be substantially rigid. As such, as each aperture 942 and the flight extending through the aperture 942 move downwardly toward the end portion 920 and toward the trench in soil, the area 944 may stretch relative to the apertures 942 and the portions 946, and the outer particle belt 904 may move outwardly along the flight (e.g., from the first end portion toward the second end portion of the flight) to drive the particles outwardly along the flight.

Figure 30:
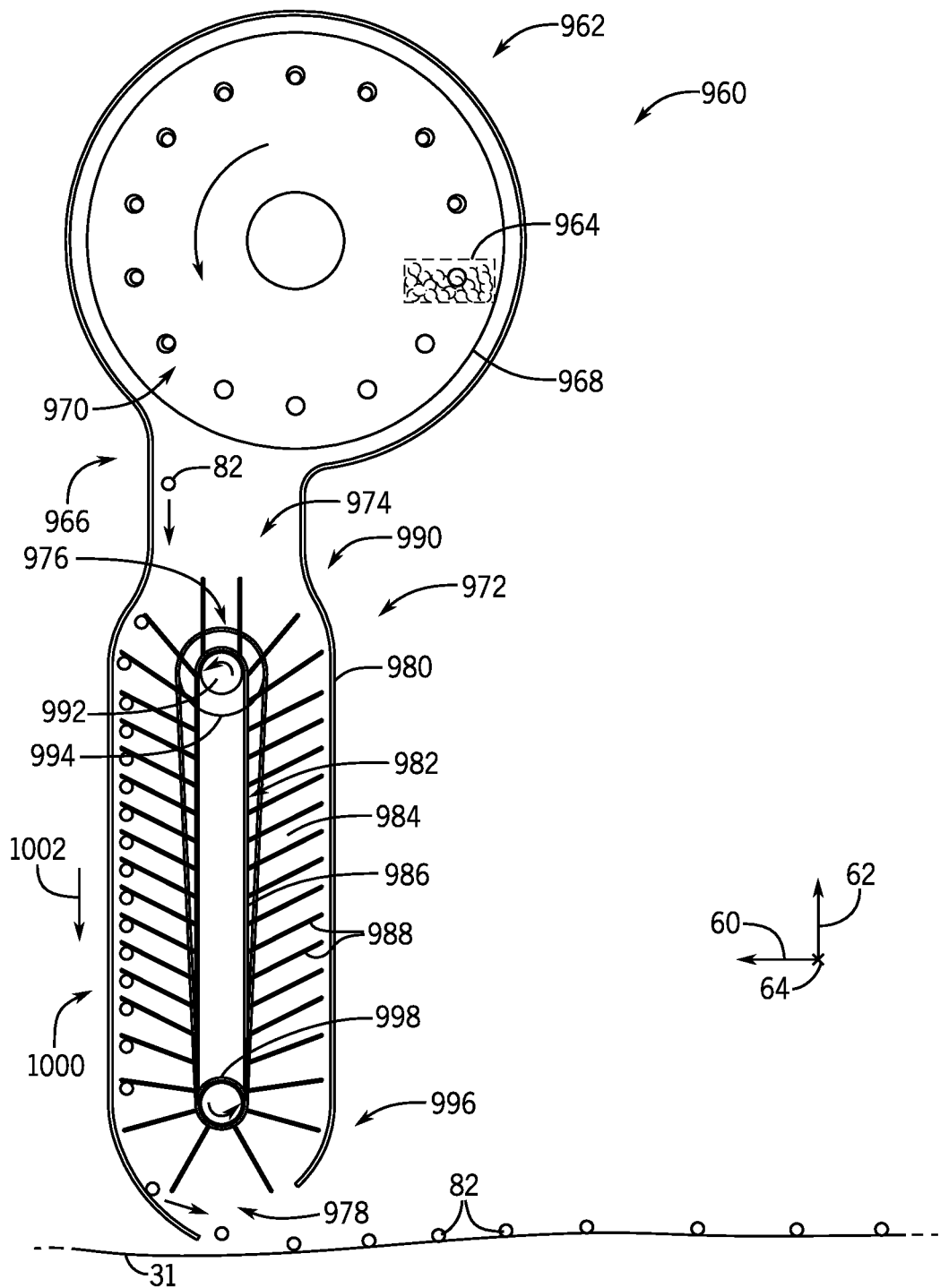
FIG. 30 is a cross-sectional view of an embodiment of a particle delivery system that may be employed within the row unit of FIG. 2, in accordance with an aspect of the present disclosure.

FIG. 30 is a cross-sectional view of an embodiment of a particle delivery system 960 that may be employed within the row unit of FIG. 2. The particle delivery system 960 includes a particle metering and singulation unit 962 configured to meter and transfer the particles 82 from a particle storage area 964 toward a particle transfer section 966 of the particle delivery system 960. At the particle transfer section 966, a disc 968 of the particle metering and singulation unit 962 is configured to release the particles 82 (e.g., at a release point 970 of the particle metering and singulation unit 962 and of the particle transfer section 966) toward a particle belt assembly 972. The particle belt assembly 972 includes a particle engagement section 974 configured to receive the particles 82 (e.g., at an engagement point 976 of the particle belt assembly 972 and of the particle engagement section 974) and a particle exit section 978 configured to expel the particles 82 toward the trench 31 in soil.

The particle belt assembly 972 includes a particle belt housing 980, an inner particle belt 982 (e.g., a first particle belt), and an outer particle belt 984 (e.g., a second particle belt). As illustrated, the inner particle belt 982 and the outer particle belt 984 are disposed within the particle belt housing 980. The inner particle belt 982 includes a base 986 and flights 988 extending from the base 986. The flights 988 are configured to extend through the outer particle belt 984. For example, as described in greater detail below, the outer particle belt 984 may include apertures through which the flights 988 extend. At an end portion 990 of the particle belt assembly 972, the inner particle belt 982 is engaged with a first wheel 992 configured to drive/enable the inner particle belt 982 to turn/rotate, and the outer particle belt 984 is engaged with a second wheel 994 configured to drive/enable the outer particle belt 984 to turn/rotate. In some embodiments, the second wheel 994 may include two wheel portions with one wheel portion disposed on each lateral side of the first wheel 992 and engaged with the outer particle belt 984. In certain embodiments, the first wheel 992 and the second wheel 994 may be non-rotatably coupled to one another. Additionally, at an end portion 996 of the particle belt assembly 972 (e.g., of the inner particle belt 982 and of the outer particle belt 984), the inner particle belt 982 and the outer particle belt 984 are engaged with a third wheel 998. The inner particle belt 982 and the outer particle belt 984 form the particle engagement section 974 of the particle belt assembly 972 at the end portion 990 of the particle belt assembly 972 configured to receive the particles 82 from the particle metering and singulation unit 962. Additionally, the inner particle belt 982 and the outer particle belt 984 form the particle exit section 978 of the particle belt assembly 972 configured to expel the particles 82 toward the trench 31. In certain embodiments, only the inner particle belt or the outer particle belt may include the particle engagement section and/or the particle exit section. The first wheel 992, the second wheel 994, and the third wheel 998 may include gear(s), pulley(s), other suitable systems configured to engage with and drive rotation of the particle belts, or a combination thereof.

Each pair of opposing flights 988 of the inner particle belt 982 is configured to receive a respective particle 82 at the particle engagement section 974 (e.g., at the engagement point 976) of the particle belt assembly 970, and the inner particle belt 982 is configured to rotate to transfer the particle 82 from the particle engagement section 974 toward the particle exit section 978. At the particle engagement section 974 (e.g., at the engagement point 976), each particle 82 may be received by opposing flights 988, such that the particle 82 is positioned adjacent to the outer particle belt 984. As illustrated, the second wheel 994 coupled to the outer particle belt 984 is larger than the first wheel 994 coupled to the inner particle belt 982 (e.g., a diameter of the second wheel 994 is larger than a diameter of the first wheel 994). The second wheel 994 is configured to cause the outer particle belt 984 to move outwardly along the flights 988 away from the base 986 at the particle engagement section 974, which may cause rotation of the flights 988 relative to the base 986. For example, as described in greater detail below in reference to FIG. 31 and in reference to a section 1000 of the particle delivery system 960, as the inner particle belt 982 and the outer particle 984 rotate, the outer particle 984 drives the flights 988 moving downwardly (e.g., generally in a direction 1000) to rotate relative to the base 986 of the inner particle belt 982, thereby driving the particles 82 downwardly toward the trench 31 and facilitating deposition of the particles 82 toward the trench 31 (e.g., rotation of the flights 988 relative to the base 986 may cause the particles 82 to accelerate radially outwardly toward the particle belt housing 980). The acceleration of the particles 82 may reduce a difference between the particle exit speed of the particles 82 and a ground speed of the row unit having the particle delivery system 960, thereby enabling the row unit to travel faster than embodiments lacking the particle delivery system 960. The particle delivery system 960 may accelerate each particle 82 to a target particle exit speed, such as one kph, two kph, three kph, four kph, five kph, seven kph, ten kph, fifteen kph, twenty kph, between one kph and twenty kph, between five kph and fifteen kph, etc.

In certain embodiments, the particle delivery system 960 may include the controller configured to control a belt speed of the inner particle belt 982 and/or the outer particle belt 984, such that the particle exit speed reaches the target particle exit speed. For example, the controller may receive a sensor signal indicative of the particle exit speed, may compare the particle exit speed to the target particle exit speed, and may control motor(s) configured to drive rotation of the first wheel 992, the second wheel 994, and/or the third wheel 998 based on a difference between the particle exit speed and the target particle exit speed exceeding a threshold value.

Figure 31:
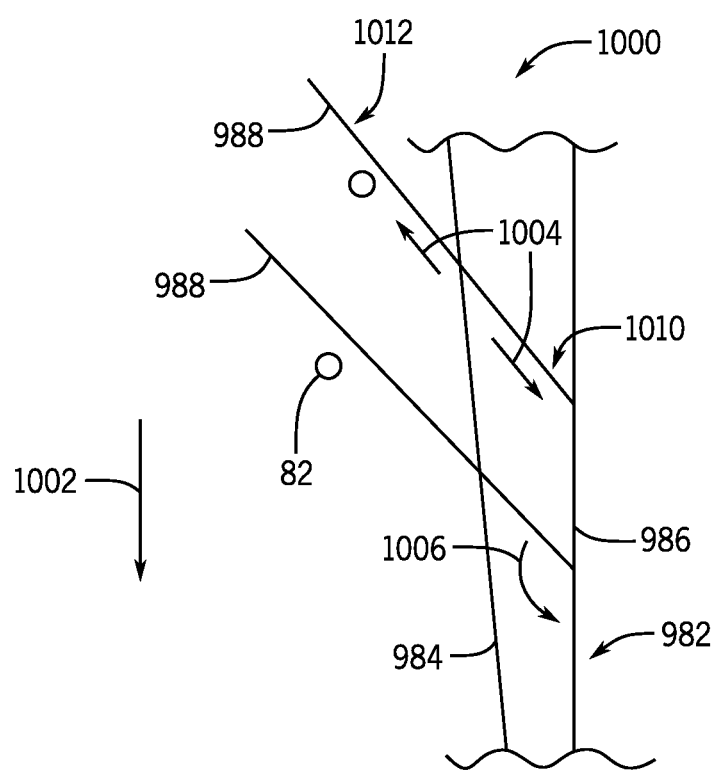
FIG. 31 is a cross-sectional view of an inner particle belt and an outer particle belt of the particle delivery system of FIG. 30, in accordance with an aspect of the present disclosure.

FIG. 31 is a cross-sectional view of the section 1000 of the particle delivery system of FIG. 30. As the inner particle belt 982 and the outer particle belt 984 rotate downwardly in the direction 1002, the outer particle belt 984 is configured to move along the flights 988 of the inner particle belt 982, as indicated by arrows 1004 due at least partially to the third wheel coupled to the inner particle belt 982 and to the outer particle belt 984 having a smaller diameter than the second wheel coupled to the outer particle belt 984. Movement of the outer particle belt 984 along the flight 988 drives rotation of the flight 988 relative to the base 986, as indicated by arrow 1006. Rotation of the flight 988 accelerates the particle 82 downwardly in the direction 1002.

In certain embodiments, to enable rotation of the flights 988 relative to the base 986, each flight 988 may be pivotally coupled to the base 986 at a first end portion 1010, and the flight 988 may be substantially rigid, such that the entire flight 988 rotates relative to the base 986 via a pivot point between the first end portion 1010 and the base 986 (e.g., as the outer particle belt 984 moves along the flight 988). In some embodiments, each flight 988 may be configured to flex to enable rotation of the flights 988 relative to the base 986. For example, the first end portion 1010 may be rigidly coupled to the base 986, and the flight 988 may be flexible, such that a second end portion 1012 of the flight 988 disposed generally opposite the first end portion 1010 is configured to rotate relative to the first end portion 1010 and relative to the base 986. Rotation of the second end portion 1012 may drive acceleration of the particle 82 in contact with the second end portion 1012 and/or with the flight 988 generally. As illustrated, each flight 988 is coupled to the base 986 at the first end portion 1010, which is an extreme end of the flight 988. In certain embodiments, each flight may be coupled to the base of the inner particle belt at an interior portion of the flight, such that the first end portion of the flight include the extreme end of the flight and the interior portion of the flight.

The embodiments of a particle delivery system described herein may facilitate deposition of particles to a trench in soil. The particle delivery system may be configured to accelerate the particles downwardly toward and along the trench and to provide particular spacings between the particles along the trench. For example, the particle delivery system may include a particle metering and singulation unit configured to provide the particular spacings between particles. Additionally or alternatively, the particle delivery system may include a particle belt configured to accelerate the particles downwardly toward the trench. An acceleration of the particles caused by the particle belt (e.g., an acceleration of particles moved by the particle belt) may generally be faster than an acceleration caused by gravity. As such, the particle belt may enable the row unit to travel faster than traditional systems relying only on gravity to accelerate particles (e.g., seeds) for delivery to soil.

In certain embodiments, the particle metering and singulation unit, the particle belt, or portions thereof may be adjustable and/or controllable. For example, a controller of the particle delivery system may adjust the particle metering and singulation unit, the particle belt, or the portions thereof, to achieve a target particle speed of the particles at a particle engagement section of the particle belt and/or a target particle exit speed of the particles flowing through a particle exit section of the particle delivery system. In certain embodiments, the controller may be configured to adjust the particle metering and singulation unit, the particle belt, or the portions thereof, to adjust the particle speed to be within a target percentage of a belt speed of the particle belt. As such, the controller, and the particle delivery system generally, may be configured to facilitate transfer of the particles from the particle metering and singulation unit to the particle belt and from the particle belt to the trench in soil by reducing a difference between the particle speed of the particles deposited to the trench in soil and a ground speed of the row unit having the particle delivery system.

As described herein, the disc having the apertures configured to receive the particles (e.g., the disc of FIG. 3, FIG. 4, FIG. 9, FIG. 11, FIG. 12, FIG. 14, FIG. 19, FIG. 21, FIG. 27, or FIG. 30) may be any suitable shape configured to rotate/move to transfer the particles to the release point of the disc. For example, the disc may be generally flat, may have a curved portion and a flat portion, may be entirely curved, may be a drum, or may include other suitable shapes, geometries, and/or configurations. In certain embodiments, an inner portion of the disc may curved/raised related to an outer portion of the disc having the apertures (e.g., the disc may be generally bowl-shaped), such that the particles may be directed toward the apertures (e.g., away from the raised inner portion and/or toward the flat outer portion) as the disc rotates. In some embodiments, the disc may be a drum having the apertures disposed along an outer portion and/or an exterior of the drum.

Additionally, features of certain embodiments of the particle delivery systems described herein may be combined with features of other embodiments. For example, the vacuum source of FIG. 3 that is configured to draw the particles into apertures of the particle metering and singulation unit may be included with the particle metering and singulation of FIGS. 4, 7, 9, 11, 12, 14, 19, 21, 27, and 30. Additionally or alternatively, the vacuum passage of FIGS. 3 and 4 may be included with the particle metering and singulation unit of FIGS. 7, 9, 11, 12, 14, 19, 21, 27, and 30. In certain embodiments, the particle belt assembly and/or the particle belt housing of FIG. 4 that may be configured to move along the track may be included in the particle delivery systems of FIGS. 9, 11, 12, 14, 19, 21, 23, 26, and 27. The angled flights of FIG. 6 may be included in the particle belt of the particle delivery systems of FIGS. 4, 9, 11, 12, 14, 19, 21, 23, 26, and 27. In some embodiments, the particle tube 222 of FIG. 7 may be included in the particle delivery systems of FIGS. 4, 9, 11, 12, 14, 19, 21, 23, 27, and 30. The angled particle tube and/or the particle transfer unit of FIG. 8 may be included in the particle delivery systems of FIGS. 4, 9, 11, 12, 14, 19, 21, 23, 27, and 30. Additionally or alternatively, the angled particle belt assembly of FIG. 9 may be included in the particle delivery systems of FIGS. 4, 11, 12, 14, 19, 21, 23, 27, and 30. The particle removal systems of FIGS. 11 and 12 may be included in the particle delivery systems of FIGS. 4, 9, 14, 23, 27, and 30. In certain embodiments, the air flow system generally described in FIGS. 14-18 may be included in the particle delivery systems of FIGS. 4, 11, 12, 19, 21, 23, 27, and 30. The particle removal systems of FIGS. 19 and/or 21 may be included in the particle delivery systems of FIGS. 4, 9, 11, 12, 14, 27, and 30. The particle delivery system having the gap in the particle belt housing, as generally described in FIG. 22, may be included in the particle delivery systems of FIGS. 4, 9, 11, 12, 14, 27, and 30. The flex system of the particle delivery system of FIG. 23 may be included in the particle delivery systems of FIGS. 4, 9, 11, 12, 14, 19, 21, and 27. In some embodiments, the particle transfer section of the particle delivery system of FIG. 25 may be included in the particle delivery systems of FIGS. 4, 9, 11, 12, 14, 19, 21, 27, and 30. The flight track of the particle delivery system of FIG. 26 may be included in the particle delivery systems of FIGS. 4, 9, 11, 12, 14, 19, 21, and 27. The particle delivery system generally described in FIGS. 27-31 including the inner and outer particle belts or first and second particle belts may be included in the particle delivery systems of FIGS. 4, 9, 11, 12, 14, 19, 21, and 27. Additionally or alternatively, the embodiments of the particle delivery systems described herein, or portions thereof, may be combined in other suitable manners.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A particle delivery system of an agricultural row unit, comprising:
   a particle belt having a particle engagement section configured to receive a particle from a particle metering and singulation unit and a particle exit section configured to expel the particle toward a trench in soil; and
   an air flow system configured to establish an air flow toward the particle engagement section of the particle belt to accelerate the particle toward the particle belt, such that a particle speed of the particle reaches a target particle speed, is within a target percentage of a belt speed of the particle belt, or both, as the particle reaches the particle engagement section of the particle belt, wherein the air flow toward the particle engagement section is a substantial portion of a total air flow established by the air flow system relative to other sections of the particle belt.

2. The particle delivery system of claim 1, comprising a particle belt housing, wherein the particle belt is disposed within the particle belt housing, the particle belt housing comprises a panel disposed on each lateral side of the particle belt, and the panels form an aperture adjacent to the particle engagement section of the particle belt configured to receive the particle into the particle belt housing toward the particle engagement section of the particle belt.

3. The particle delivery system of claim 2, wherein the air flow system is configured to establish the air flow through the aperture and toward the particle belt to direct the particle toward the particle engagement section of the particle belt.

4. The particle delivery system of claim 2, wherein a gap is formed between at least one panel of the particle belt housing and the particle belt, and the air flow system is configured to establish the air flow through the aperture and through the gap to direct the particle toward the particle engagement section of the particle belt.

5. The particle delivery system of claim 2, wherein a side aperture is formed in at least one panel of the particle belt housing, and the air flow system is configured to establish the air flow through the aperture and through the side aperture to direct the particle toward the particle engagement section of the particle belt.

6. The particle delivery system of claim 1, wherein the particle belt comprises a base and a plurality of flights extending outwardly from the base.

7. The particle delivery system of claim 6, wherein the base is formed from a permeable material configured to enable the air flow to pass through the base, and the air flow system is configured to establish the air flow through the base to direct the particle toward the particle engagement section of the particle belt.

8. The particle delivery system of claim 1, comprising a particle tube extending between the particle metering and singulation unit and the particle engagement section of the particle belt, wherein the particle tube comprises a first end configured to be disposed at the particle metering and singulation unit and a second end disposed at the particle belt, and the air flow system is configured to provide the air flow through the particle tube to establish the air flow toward the particle belt at the particle engagement section of the particle belt to direct the particle toward the particle belt.

9. The particle delivery system of claim 1, wherein the substantial portion of the total air flow is at least seventy-five percent of the total air flow.

10. A particle delivery system of an agricultural row unit, comprising:
    a particle metering and singulation unit configured to meter a plurality of particles from a particle storage area;
    a particle belt having a particle engagement section configured to receive the plurality of particles from the particle metering and singulation unit and a particle exit section configured to expel the plurality of particles toward a trench in soil; and
    an air flow system configured to establish an air flow toward the particle engagement section of the particle belt to accelerate each particle of the plurality of particles toward the particle belt, such that a particle speed of the particle reaches a target particle speed, is within a target percentage of a belt speed of the particle belt, or both, as the particle reaches the particle engagement section of the particle belt, wherein the air flow toward the particle engagement section is a substantial portion of a total air flow established by the air flow system relative to other sections of the particle belt.

11. The particle delivery system of claim 10, comprising a controller comprising a memory and a processor, wherein the controller is configured to receive an input signal indicative of the particle speed of each particle of the plurality of particles at the particle engagement section of the particle belt and to output an output signal indicative of instructions to adjust the air flow established by the air flow system, such that the particle speed reaches the target particle speed, is within the target percentage of the belt speed of the particle belt, or both, as the particle reaches the particle engagement section of the particle belt.

12. The particle delivery system of claim 11, wherein the controller is configured to determine the target particle speed, the target percentage, or both, based on a type of the plurality of particles, a ground speed of the agricultural row unit, a spacing between flights of the particle belt, a length of the particle belt, the belt speed, or a combination thereof.

13. The particle delivery system of claim 10, wherein the particle belt housing comprises a panel disposed on each lateral side of the particle belt, the panels form an aperture adjacent to the particle engagement section of the particle belt, a side aperture is formed within at least one panel, and the air flow system is configured to establish the air flow through the aperture and through the side aperture to direct the plurality of particles toward the particle engagement section of the particle belt.

14. The particle delivery system of claim 10, wherein the particle belt comprises a base and a plurality of flights extending outwardly from the base, the base is formed from a permeable material configured to enable the air flow to pass through the base, and the air flow system is configured to establish the air flow through the base to direct the plurality of particles toward the particle engagement section of the particle belt.

15. The particle delivery system of claim 10, wherein the substantial portion of the total air flow is at least ninety percent of the total air flow.

16. A particle delivery system of an agricultural row unit, comprising:
  a particle belt having a particle engagement section configured to receive a plurality of particles from a particle metering and singulation unit and a particle exit section configured to expel the plurality of particles toward a trench in soil; and
  an air flow system configured to establish an air flow toward the particle engagement section of the particle belt to accelerate each particle of the plurality of particles toward the particle belt, wherein the air flow toward the particle engagement section is a substantial portion of a total air flow established by the air flow system relative to other sections of the particle belt; and
  a controller comprising a memory and a processor, wherein the controller is configured to:
    determine a target particle speed, a target percentage, or both, based on a type of the plurality of particles, a ground speed of the agricultural row unit, a spacing between flights of the particle belt, a length of the particle belt, a belt speed of the particle belt, or a combination thereof;
    receive an input signal indicative of a particle speed of each particle of the plurality of particles at the particle engagement section of the particle belt from a particle sensor; and
    output an output signal indicative of instructions to adjust the air flow established by the air flow system, such that the particle speed reaches the target particle speed, is within the target percentage of the belt speed of the particle belt, or both, as the particle reaches the particle engagement section of the particle belt.

17. The particle delivery system of claim 16, wherein the controller is configured to output the output signal indicative of instructions to increase a flow rate of the air flow established by the air flow system in response to determining that:
  the particle speed is less than the target particle speed and a difference between the particle speed and the target particle speed exceeds a threshold value;
  the particle speed is less than the belt speed and is not within the target percentage of the belt speed; or
  both.

18. The particle delivery system of claim 16, wherein the controller is configured to output the output signal indicative of instructions to decrease a flow rate of the air flow established by the air flow system in response to determining that:
  the particle speed is greater than the target particle speed and a difference between the particle speed and the target particle speed exceeds a threshold value;
  the particle speed is greater than the belt speed and is not within the target percentage of the belt speed; or
  both.

19. The particle delivery system of claim 16, wherein the air flow system comprises:
  a vacuum source; and
  an air flow tube coupled to the vacuum source and to a particle belt housing of the particle delivery system, wherein the particle belt is disposed within the particle belt housing.

20. The particle delivery system of claim 16, wherein the substantial portion of the total air flow is at least ninety-nine percent of the total air flow.

* * * * *